United States Patent
Aoyagi

(10) Patent No.: US 7,783,108 B2
(45) Date of Patent: Aug. 24, 2010

(54) DOCUMENT MANAGEMENT METHOD AND APPARATUS

(75) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 11/609,459

(22) Filed: Dec. 12, 2006

(65) Prior Publication Data

US 2007/0133873 A1 Jun. 14, 2007

(30) Foreign Application Priority Data

Dec. 13, 2005 (JP) ............................. 2005-359529

(51) Int. Cl.
G06K 9/34 (2006.01)
(52) U.S. Cl. ...................................... 382/176; 382/173
(58) Field of Classification Search ................. 382/173, 382/176, 181, 190, 219, 286, 309; 358/448, 358/452, 462, 537
See application file for complete search history.

(56) References Cited

U.S. PATENT DOCUMENTS 6,009,198 A * 12/1999 Syeda-Mahmood ......... 382/173
6,882,746 B1 * 4/2005 Naveen et al. .............. 382/173
6,891,966 B2 * 5/2005 Chen ......................... 382/173

FOREIGN PATENT DOCUMENTS

JP 05-037748 2/1993

* cited by examiner

Primary Examiner—Duy M Dang
(74) Attorney, Agent, or Firm—Cowan, Liebowitz & Latman, P.C.

(57) ABSTRACT

A document management apparatus acquires block information of each page, which is obtained by executing block segmentation processing for each page of document data of a first version. A matched block and a mismatched block between the first version and a second version are discriminated on the basis of the block information acquired in association with the document of the first version and block information obtained by executing block segmentation processing for each page of document data of the second version. A page is generated by laying out a block that is determined as a matched block and exists in a page containing a block determined as a mismatched block in the document data of the first version and a block that is determined as a mismatched block in the document data of the second version while maintaining the block sequence in the whole document data of the second version.

21 Claims, 47 Drawing Sheets

FIG. 4

| BLOCK NUMBER (401) | ATTRIBUTE (402) | COORDINATE X (403) | COORDINATE Y (404) | WIDTH W (405) | HEIGHT H (406) | COLOR/ MONOCHROME (407) | TEXT (408) | OTHER (409) |
|---|---|---|---|---|---|---|---|---|
| BLOCK 1 | TEXT | X1 | Y1 | W1 | H1 | MONO | YES | sheet AAA (TEXT CONTENT) |
| BLOCK 2 | TABLE | X2 | Y2 | W2 | H2 | MONO | YES | Name, Address, A, B (TEXT CONTENT) |
| BLOCK 3 | TEXT | X3 | Y3 | W3 | H3 | COLOR | YES | TEST, TEXT··· (TEXT CONTENT) |
| BLOCK 4 | IMAGE | X4 | Y4 | W4 | H4 | COLOR | NO | HISTOGRAM INFORMATION LINE IMAGE/HALFTONE IMAGE |
| BLOCK 5 | IMAGE | X5 | Y5 | W5 | H5 | COLOR | NO | HISTOGRAM INFORMATION LINE IMAGE/HALFTONE IMAGE |
| BLOCK 6 | TABLE | X6 | Y6 | W6 | H6 | COLOR | YES | Tokyo, Nagoya··· (TEXT CONTENT) |

FIG. 8A
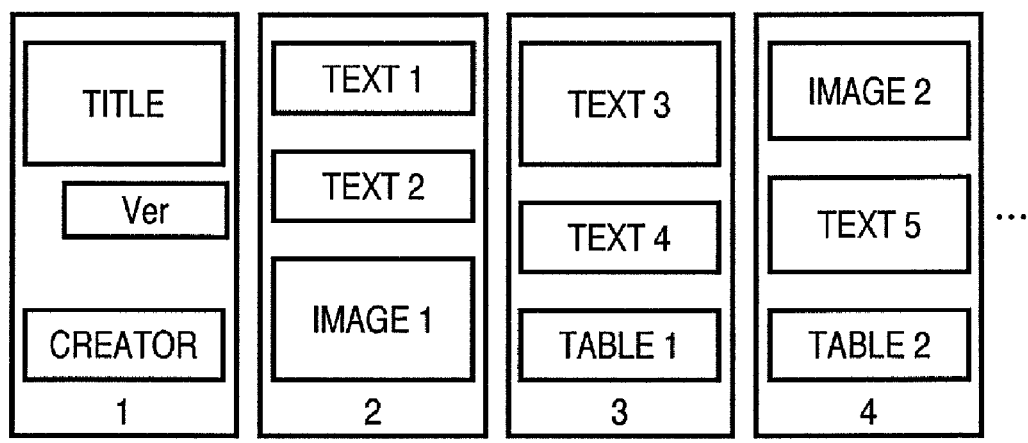
FIG. 8B
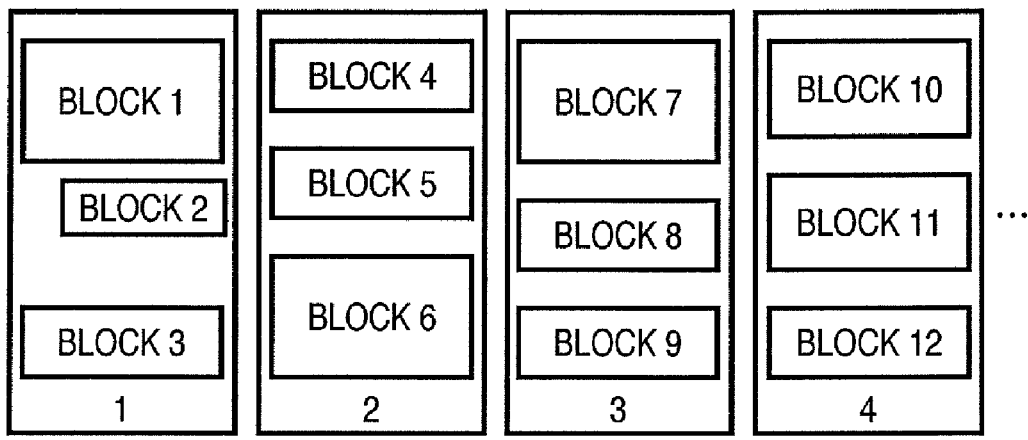

FIG. 9

| BLOCK NUMBER | PAGE NUMBER | ATTRIBUTE | COORDINATE X | COORDINATE Y | WIDTH W | HEIGHT H | COLOR/ MONOCHROME | TEXT | OTHER |
|---|---|---|---|---|---|---|---|---|---|
| BLOCK 1 | 1 | TEXT | X1 | Y1 | W1 | H1 | MONO | YES | TITLE |
| BLOCK 2 | 1 | TEXT | X2 | Y2 | W2 | H2 | MONO | YES | Ver |
| BLOCK 3 | 1 | TEXT | X3 | Y3 | W3 | H3 | COLOR | YES | CREATOR |
| BLOCK 4 | 2 | TEXT | X4 | Y4 | W4 | H4 | COLOR | YES | TEXT DATA OF TEXT 1 |
| BLOCK 5 | 2 | TEXT | X5 | Y5 | W5 | H5 | COLOR | YES | TEXT DATA OF TEXT 2 |
| BLOCK 6 | 2 | IMAGE | X6 | Y6 | W6 | H6 | COLOR | NO | HISTOGRAM INFORMATION OF IMAGE 1, LINE IMAGE/HALFTONE IMAGE |
| BLOCK 7 | 3 | TEXT | X7 | Y7 | W7 | H7 | MONO | YES | TEXT DATA OF TEXT 3 |
| BLOCK 8 | 3 | TEXT | X8 | Y8 | W8 | H8 | MONO | YES | TEXT DATA OF TEXT 4 |
| BLOCK 9 | 3 | TABLE | X9 | Y9 | W9 | H9 | COLOR | YES | TEXT DATA OF TABLE 1 |
| BLOCK 10 | 4 | IMAGE | X10 | Y10 | W10 | H10 | COLOR | NO | HISTOGRAM INFORMATION OF IMAGE 2, LINE IMAGE/HALFTONE IMAGE |
| BLOCK 11 | 4 | TEXT | X11 | Y11 | W11 | H11 | COLOR | YES | TEXT DATA OF TEXT 5 |
| BLOCK 12 | 4 | TABLE | X12 | Y12 | W12 | H12 | COLOR | YES | TEXT DATA OF TABLE 2 |

DOCUMENT Ver1.0 (PAPER DOCUMENT)

DOCUMENT Ver1.1 (ELECTRONIC DATA)

DOCUMENT Ver1.1 (ELECTRONIC DATA)

FIG. 14A

PAGE NUMBER — RESULT OF PAPER DOCUMENT SCAN

| Page | Blocks |
|---|---|
| 1 | BLOCK-01 Ver.01 |
|   | BLOCK-02 Ver.01 |
| 2 | BLOCK-03 Ver.01 |
|   | BLOCK-04 Ver.01 |
| 3 | BLOCK-05 Ver.01 |
|   | BLOCK-06 Ver.01 |
| 4 | BLOCK-07 Ver.01 |
|   | BLOCK-08 Ver.01 |
| 5 | BLOCK-09 Ver.01 |
|   | BLOCK-10 Ver.01 |
| 6 | BLOCK-11 Ver.01 |
|   | BLOCK-12 Ver.01 |
| 7 | BLOCK-13 Ver.01 |
|   | BLOCK-14 Ver.01 |

FIG. 14B

IF BLOCKS OF LATEST VERSION ARE ARRANGED IN ORDER, AND RESULT IS PRINTED OUT, ALL PAGES FROM PAGE 2 HAVE LAYOUTS DIFFERENT FROM PAPER DOCUMENT

| Page | Blocks |
|---|---|
| 1 | BLOCK-01 Ver.01 |
|   | BLOCK-02 Ver.01 |
| 2 | BLOCK-03 Ver.02 |
|   | BLOCK-04 Ver.01 |
| 3 | BLOCK-06 Ver.01 |
|   | BLOCK-06 Add-01 Ver.01 |
| 4 | BLOCK-06 Add-02 Ver.01 |
|   | BLOCK-07 Ver.01 |
| 5 | BLOCK-08 Ver.01 |
|   | BLOCK-09 Ver.01 |
| 6 | BLOCK-10 Ver.01 |
|   | BLOCK-11 Ver.01 |
| 7 | BLOCK-12 Ver.01 |
|   | BLOCK-13 Ver.01 |

PAGE COMPOSITION MISMATCH

FIG. 15A
RESULT OF PAPER DOCUMENT SCAN

| 1 | BLOCK-01 Ver.01 |
|   | BLOCK-02 Ver.01 |
| 2 | BLOCK-03 Ver.01 |
|   | BLOCK-04 Ver.01 |
| 3 | BLOCK-05 Ver.01 |
|   | BLOCK-06 Ver.01 |
| 4 | BLOCK-07 Ver.01 |
|   | BLOCK-08 Ver.01 |
| 5 | BLOCK-09 Ver.01 |
|   | BLOCK-10 Ver.01 |
| 6 | BLOCK-11 Ver.01 |
|   | BLOCK-12 Ver.01 |
| 7 | BLOCK-13 Ver.01 |
|   | BLOCK-14 Ver.01 |
⋮

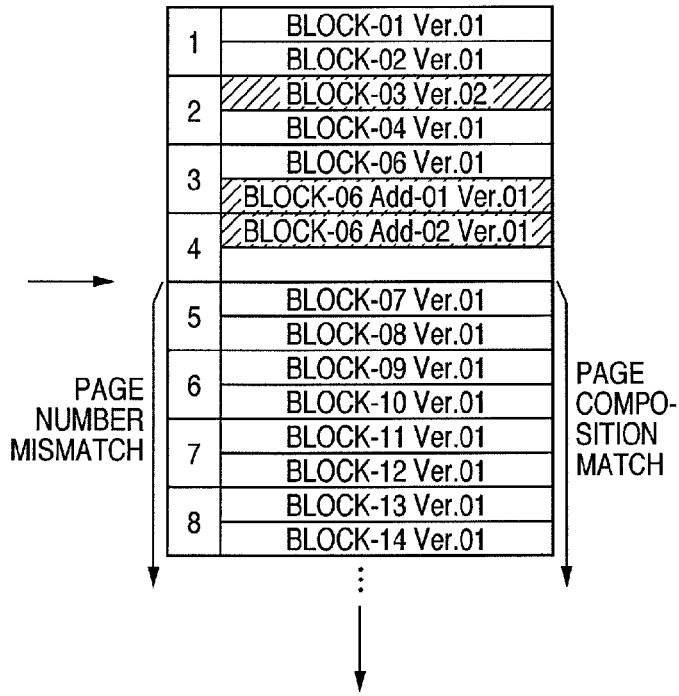

FIG. 15B
DETERMINE PAGE BREAK BASED ON BLOCK LAYOUT FROM SCAN INFORMATION

PAGE NUMBER MISMATCH
PAGE COMPOSITION MATCH

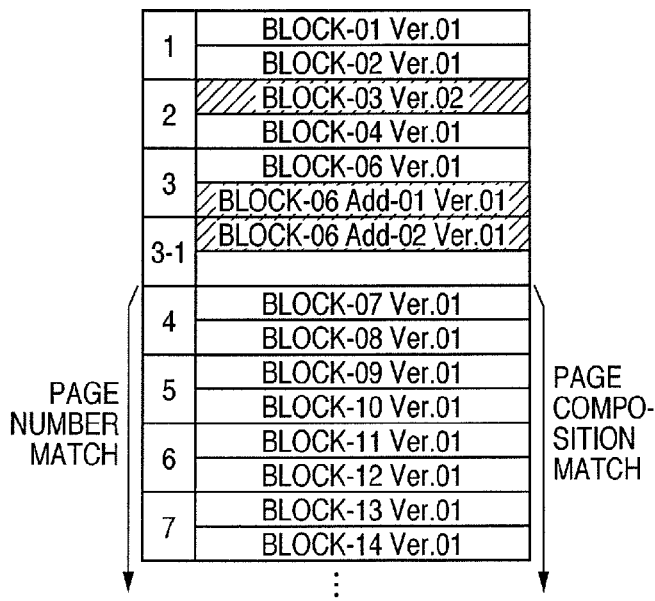

FIG. 15C
CORRECT REPETITION OR MISMATCH OF PAGE NUMBER

PAGE NUMBER MATCH
PAGE COMPOSITION MATCH

FIG. 16A

BLOCK DEFINITION OF PAGE PART

| FIRST NUMBER BLOCK | SECOND NUMBER BLOCK | THIRD NUMBER BLOCK | FOURTH NUMBER BLOCK |
|---|---|---|---|
| 1 | -0 | -0 | -0 |

FIG. 16B

NUMBER WITH LARGER VALUE INDICATES LATTER PAGE

FORMER ← 1　2　3　4　5　6 → LATTER

FIG. 16C

COUNT PAGES WHILE PREFERENTIALLY CONSIDERING HIGHER-NUMBERED NUMBER BLOCK

FORMER ← 1　1-0-0　1-1　1-1-0　1-2　2 → LATTER

FIG. 16D

PAGE NUMBER USING SMALLER NUMBER OF NUMBER BLOCKS INDICATES FORMER PAGE

FORMER ← 1　1-0　1-0-0　1-0-0-0 → LATTER

WHEN ONLY PAGE ADDITION IS DONE  ▽ : ADDITION POSITION  ▨ : ADDED PAGE

WHEN PAGE IS ADDED HALFWAY IN OUTPUT PAGES

WHEN ONLY PAGE ADDITION IS DONE   ▽ : ADDITION POSITION   ▨ : ADDED PAGE

WHEN PAGE IS ADDED HALFWAY IN OUTPUT PAGES

SET TO "2-0-0" BECAUSE "2-1" ALREADY EXISTS

DISCARD PAGE 2 AND OUTPUT AS "1-0"

FIG. 20A
WHEN "DELETED PAGES < CREATED PAGES"
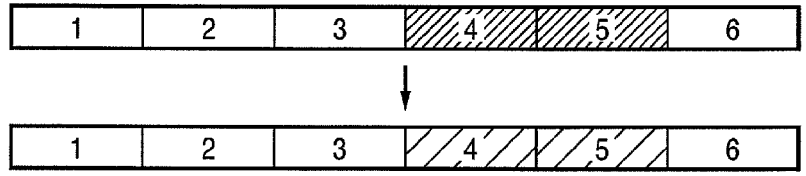
FIG. 20B
WHEN "DELETED PAGES > CREATED PAGES"
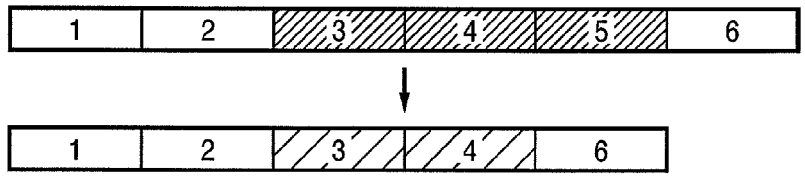
FIG. 20C
WHEN "DELETED PAGES < CREATED PAGES"
C-1
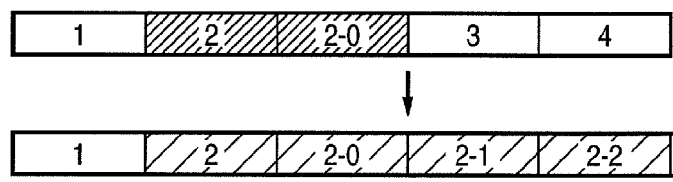
C-2
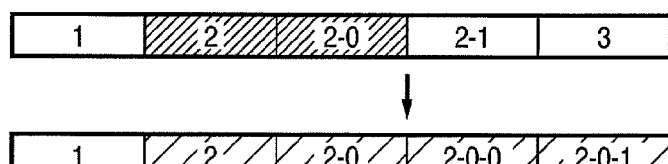
C-3
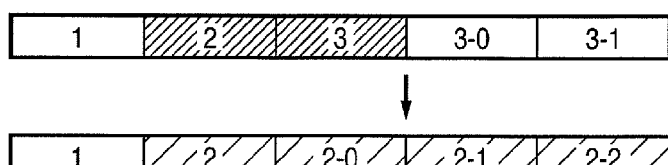

Ver1.0 (ELECTRONIC DATA)

→ PRINT OUT AS PAPER DOCUMENT

Ver1.0 (ELECTRONIC DATA)

↓ EXECUTE BLOCK SELECTION PROCESSING FOR CREATED DATA, ASSIGN VERSION TO EACH BLOCK, AND STORE DATA IN IMAGE SERVER

IMAGE SERVER

Ver1.0 → Ver1.1 (ELECTRONIC DATA)

Ver1.1 (ELECTRONIC DATA)

CHANGE BLOCK-03, DELETE BLOCK-05, AND ADD TWO BLOCKS AFTER BLOCK-06 FROM Ver1.0

REGISTER, IN SERVER, BLOCK INFORMATION REVISED, ADDED, AND DELETED UPON CREATING Ver1.1

IMAGE SERVER

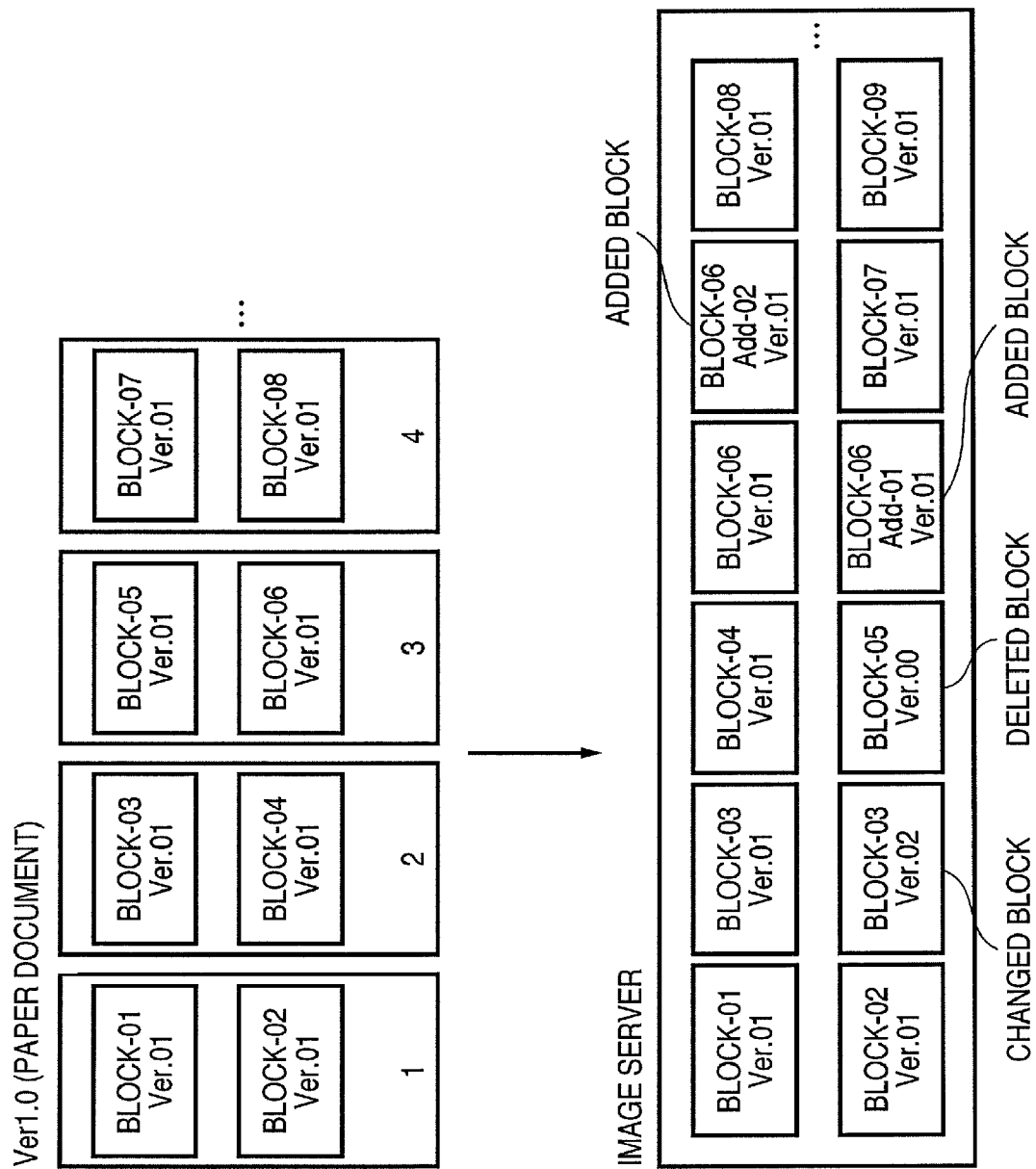
F I G. 30A
F I G. 30B

DOCUMENT Ver1.0 (PAPER DOCUMENT)

DOCUMENT Ver1.1 (ELECTRONIC DATA)

PAPER DOCUMENT AFTER REPLACEMENT FROM DOCUMENT OF Ver1.0 TO Ver1.1

DOCUMENT Ver1.0 (PAPER DOCUMENT)

DOCUMENT Ver1.1 (ELECTRONIC DATA)

PRINT OUT OF Ver1.1     PAPER DOCUMENT OF Ver1.0
REPETITION OF PAGE NUMBER

PAPER DOCUMENT AFTER REPLACEMENT FROM DOCUMENT OF Ver1.0 TO Ver1.1    PAPER DOCUMENT IS USABLE

PREVENT REPETITION OF PAGE NUMBER

FIG. 40A

BLOCK INFORMATION OF Ver1.0

| PAGE NUMBER | |
|---|---|
| 1 | BLOCK-01 Ver.01 |
|   | BLOCK-02 Ver.01 |
| 2 | BLOCK-03 Ver.01 |
|   | BLOCK-04 Ver.01 |
| 3 | BLOCK-05 Ver.01 |
|   | BLOCK-06 Ver.01 |
| 4 | BLOCK-07 Ver.01 |
|   | BLOCK-08 Ver.01 |
| 5 | BLOCK-09 Ver.01 |
|   | BLOCK-10 Ver.01 |
| 6 | BLOCK-11 Ver.01 |
|   | BLOCK-12 Ver.01 |
| 7 | BLOCK-13 Ver.01 |
|   | BLOCK-14 Ver.01 |

FIG. 40B

REVISE BLOCK-03
BLOCK INFORMATION OF Ver1.1

| 1 | BLOCK-01 Ver.01 |
|---|---|
|   | BLOCK-02 Ver.01 |
| 2 | BLOCK-03 Ver.02 |
|   | BLOCK-04 Ver.01 |
| 3 | BLOCK-05 Ver.01 |
|   | BLOCK-06 Ver.01 |
| 4 | BLOCK-07 Ver.01 |
|   | BLOCK-08 Ver.01 |
| 5 | BLOCK-09 Ver.01 |
|   | BLOCK-10 Ver.01 |
| 6 | BLOCK-11 Ver.01 |
|   | BLOCK-12 Ver.01 |
| 7 | BLOCK-13 Ver.01 |
|   | BLOCK-14 Ver.01 |

FIG. 40C

ADD ONE BLOCK
BLOCK INFORMATION OF Ver1.2

| 1 | BLOCK-01 Ver.01 |
|---|---|
|   | BLOCK-02 Ver.01 |
| 2 | BLOCK-03 Ver.02 |
|   | BLOCK-04 Ver.01 |
| 3 | BLOCK-05 Ver.01 |
|   | BLOCK-06 Ver.01 |
| 4 | BLOCK-06 Add-01 Ver.01 |
|   | BLOCK-07 Ver.01 |
| 5 | BLOCK-08 Ver.01 |
|   | BLOCK-09 Ver.01 |
| 6 | BLOCK-10 Ver.01 |
|   | BLOCK-11 Ver.01 |
| 7 | BLOCK-12 Ver.01 |
|   | BLOCK-13 Ver.01 |
| 8 | BLOCK-14 Ver.01 |
|   |  |

FIG. 40D

DELETE BLOCK-05
BLOCK INFORMATION OF Ver2.0

| 1 | BLOCK-01 Ver.01 |
|---|---|
|   | BLOCK-02 Ver.01 |
| 2 | BLOCK-03 Ver.02 |
|   | BLOCK-04 Ver.01 |
| 3 | BLOCK-06 Ver.01 |
|   | BLOCK-06 Add-01 Ver.01 |
| 4 | BLOCK-07 Ver.01 |
|   | BLOCK-08 Ver.01 |
| 5 | BLOCK-09 Ver.01 |
|   | BLOCK-10 Ver.01 |
| 6 | BLOCK-11 Ver.01 |
|   | BLOCK-12 Ver.01 |
| 7 | BLOCK-13 Ver.01 |
|   | BLOCK-14 Ver.01 |

FIG. 41A

BLOCK INFORMATION OF Ver1.0

| PAGE NUMBER | | |
|---|---|---|
| 1 | BLOCK-01 Ver.01 |
| 1 | BLOCK-02 Ver.01 |
| 2 | BLOCK-03 Ver.01 |
| 2 | BLOCK-04 Ver.01 |
| 3 | BLOCK-05 Ver.01 |
| 3 | BLOCK-06 Ver.01 |
| 4 | BLOCK-07 Ver.01 |
| 4 | BLOCK-08 Ver.01 |
| 5 | BLOCK-09 Ver.01 |
| 5 | BLOCK-10 Ver.01 |
| 6 | BLOCK-11 Ver.01 |
| 6 | BLOCK-12 Ver.01 |
| 7 | BLOCK-13 Ver.01 |
| 7 | BLOCK-14 Ver.01 |

FIG. 41B

BLOCK INFORMATION OF Ver1.1

| | |
|---|---|
| 1 | BLOCK-01 Ver.01 |
| 1 | BLOCK-02 Ver.01 |
| 2 | BLOCK-03 Ver.02 |
| 2 | BLOCK-04 Ver.01 |
| 3 | BLOCK-05 Ver.01 |
| 3 | BLOCK-06 Ver.01 |
| 4 | BLOCK-07 Ver.01 |
| 4 | BLOCK-08 Ver.01 |
| 5 | BLOCK-09 Ver.01 |
| 5 | BLOCK-10 Ver.01 |
| 6 | BLOCK-11 Ver.01 |
| 6 | BLOCK-12 Ver.01 |
| 7 | BLOCK-13 Ver.01 |
| 7 | BLOCK-14 Ver.01 |

FIG. 42A

BLOCK INFORMATION OF Ver1.0

| PAGE NUMBER | |
|---|---|
| 1 | BLOCK-01 Ver.01 |
| | BLOCK-02 Ver.01 |
| 2 | BLOCK-03 Ver.01 |
| | BLOCK-04 Ver.01 |
| 3 | BLOCK-05 Ver.01 |
| | BLOCK-06 Ver.01 |
| 4 | BLOCK-07 Ver.01 |
| | BLOCK-08 Ver.01 |
| 5 | BLOCK-09 Ver.01 |
| | BLOCK-10 Ver.01 |
| 6 | BLOCK-11 Ver.01 |
| | BLOCK-12 Ver.01 |
| 7 | BLOCK-13 Ver.01 |
| | BLOCK-14 Ver.01 |

FIG. 42B

BLOCK INFORMATION OF Ver1.2

| 1 | BLOCK-01 Ver.01 |
|---|---|
| | BLOCK-02 Ver.01 |
| 2 | BLOCK-03 Ver.02 |
| | BLOCK-04 Ver.01 |
| 3 | BLOCK-05 Ver.01 |
| | BLOCK-06 Ver.01 |
| 3-1 | BLOCK-06 Add-01 Ver.01 |
| 4 | BLOCK-07 Ver.01 |
| | BLOCK-08 Ver.01 |
| 5 | BLOCK-09 Ver.01 |
| | BLOCK-10 Ver.01 |
| 6 | BLOCK-11 Ver.01 |
| | BLOCK-12 Ver.01 |
| 7 | BLOCK-13 Ver.01 |
| | BLOCK-14 Ver.01 |

FIG. 43A

BLOCK INFORMATION OF Ver1.0

| PAGE NUMBER | |
|---|---|
| 1 | BLOCK-01 Ver.01 |
| | BLOCK-02 Ver.01 |
| 2 | BLOCK-03 Ver.01 |
| | BLOCK-04 Ver.01 |
| 3 | BLOCK-05 Ver.01 |
| | BLOCK-06 Ver.01 |
| 4 | BLOCK-07 Ver.01 |
| | BLOCK-08 Ver.01 |
| 5 | BLOCK-09 Ver.01 |
| | BLOCK-10 Ver.01 |
| 6 | BLOCK-11 Ver.01 |
| | BLOCK-12 Ver.01 |
| 7 | BLOCK-13 Ver.01 |
| | BLOCK-14 Ver.01 |

FIG. 43B

BLOCK INFORMATION OF Ver2.0

| | |
|---|---|
| 1 | BLOCK-01 Ver.01 |
| | BLOCK-02 Ver.01 |
| 2 | BLOCK-03 Ver.02 |
| | BLOCK-04 Ver.01 |
| 3 | BLOCK-06 Ver.01 |
| | BLOCK-06 Add-01 Ver.01 |
| 4 | BLOCK-07 Ver.01 |
| | BLOCK-08 Ver.01 |
| 5 | BLOCK-09 Ver.01 |
| | BLOCK-10 Ver.01 |
| 6 | BLOCK-11 Ver.01 |
| | BLOCK-12 Ver.01 |
| 7 | BLOCK-13 Ver.01 |
| | BLOCK-14 Ver.01 |

FIG. 44A

BLOCK INFORMATION OF Ver1.1

| PAGE NUMBER | | |
|---|---|---|
| 1 | BLOCK-01 Ver.01 | |
| 1 | BLOCK-02 Ver.01 | |
| 2 | BLOCK-03 Ver.01 | |
| 2 | BLOCK-04 Ver.01 | |
| 3 | BLOCK-05 Ver.01 | |
| 3 | BLOCK-06 Ver.01 | |
| 4 | BLOCK-07 Ver.01 | |
| 4 | BLOCK-08 Ver.01 | |
| 5 | BLOCK-09 Ver.01 | |
| 5 | BLOCK-10 Ver.01 | |
| 6 | BLOCK-11 Ver.01 | |
| 6 | BLOCK-12 Ver.01 | |
| 7 | BLOCK-13 Ver.01 | |
| 7 | BLOCK-14 Ver.01 | |

FIG. 44B

BLOCK INFORMATION OF Ver2.0

| | |
|---|---|
| 1 | BLOCK-01 Ver.01 |
| 1 | BLOCK-02 Ver.01 |
| 2 | BLOCK-03 Ver.02 |
| 2 | BLOCK-04 Ver.01 |
| 3 | BLOCK-06 Ver.01 |
| 3 | BLOCK-06 Add-01 Ver.01 |
| 4 | BLOCK-07 Ver.01 |
| 4 | BLOCK-08 Ver.01 |
| 5 | BLOCK-09 Ver.01 |
| 5 | BLOCK-10 Ver.01 |
| 6 | BLOCK-11 Ver.01 |
| 6 | BLOCK-12 Ver.01 |
| 7 | BLOCK-13 Ver.01 |
| 7 | BLOCK-14 Ver.01 |

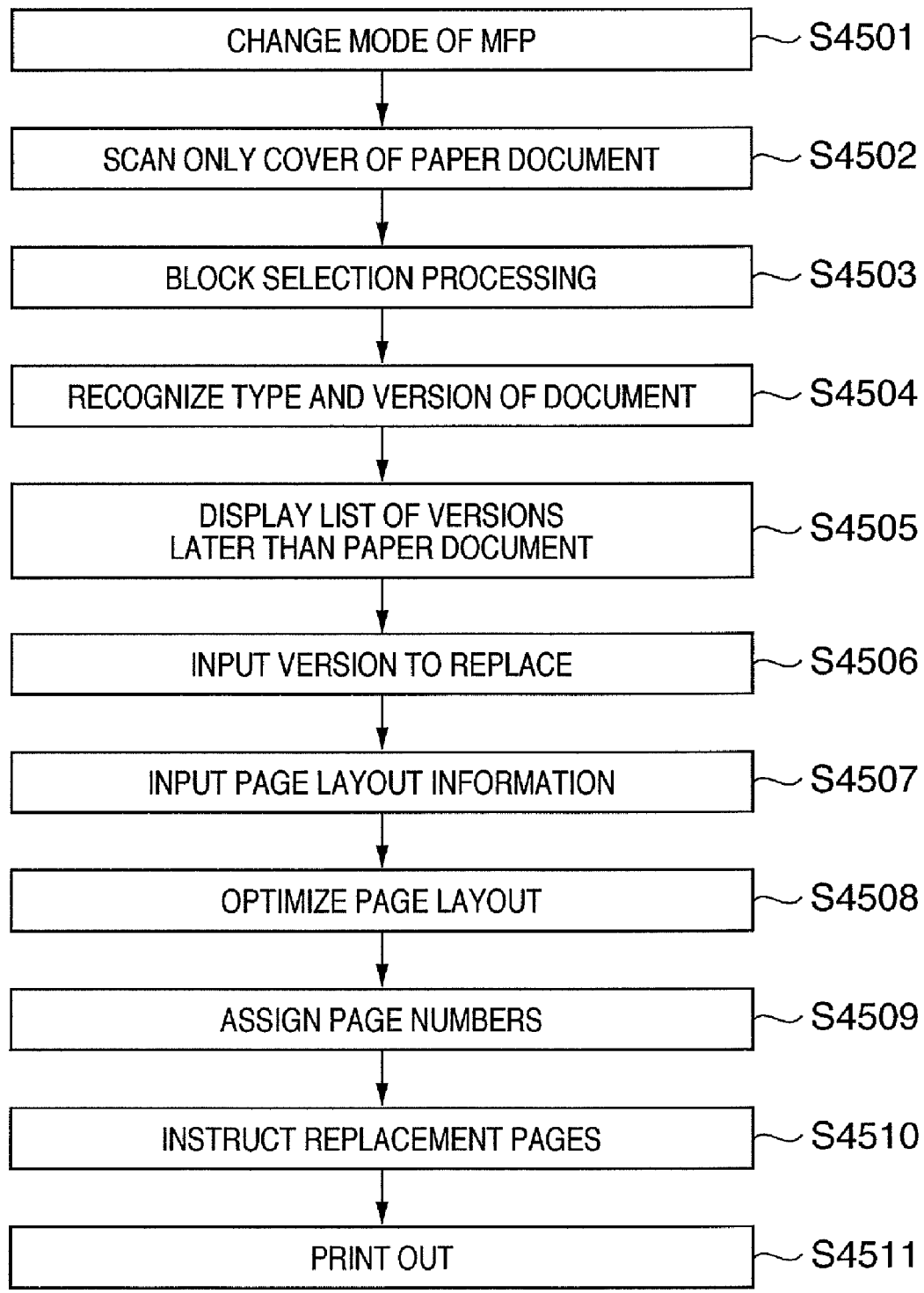

DOCUMENT MANAGEMENT METHOD AND APPARATUS

REFERENCE TO RELATED APPLICATION

This application claims the benefit of Japanese Patent Application No. 2005-359529, filed Dec. 13, 2005, which is hereby incorporated by reference herein in its entirety.

BACKGROUND OF THE INVENTION

1. Field of the Invention

The present invention relates to management of document data and, more particularly, to management of document data of a plurality of versions generated by updating document data.

2. Description of the Related Art

Multifunctional peripherals (to be referred to as MFPs hereinafter) including a scanner, printer, image processor, input/output interface (to be referred to as an input/output I/F hereinafter), and operation unit are becoming popular. An MFP connects to a network such as a LAN through an input/output I/F to form a print system that implements a variety of functions including copy operation. The MFP can carry out tasks such as sending scanned image data to a personal computer (to be referred to as a PC hereinafter) on the network or transmit the image data to an external device through a telephone line as FAX data. The MFP can also receive and print out image data from the PC connected to the network.

In the print system, a database and a management server to efficiently manage the database are connected to the network. The database using a magnetic storage device such as an HDD stores an enormous quantity of data. The print system having such a database can send image data in the database to the PC via the network and cause a printer connected to the PC to print out the image data. The print system can also send image data in the database to the MFP via the network and cause the MFP to print out the image data. It is also possible to store, in the database via the network, image data scanned by the MFP.

In the field of image processing technology, various techniques such as a technique (block segmentation or block selection technique) of segmenting image data into regions in accordance with attributes, an OCR technique, and a pattern matching technique have been developed. The block selection technique recognizes image data in one page and segments it into blocks such as a text region, line region, photo region, and table region. The OCR technique creates text data from image data of a text portion input from, e.g., a scanner. The pattern matching technique determines the similarity of images on the basis of color information, edge information, and shape feature amount and selects an image matching a target image from a plurality of image data.

There is also developed a system that combines the above-described print system and the image processing technology. This system compares image data scanned by the scanner of an MFP with data in a server and searches for the original data of the printed document (e.g., Japanese Patent Application Laid-Open No. 05-037748).

On the other hand, campaigns to stop wasteful print out and copy have currently become common from the viewpoint of cost reduction in offices and saving of paper resources.

A specification or manual under preparation is frequently updated. In reviewing the document or checking its contents, it is however undesirable to print out all pages of the latest version. Preferably, only the difference from an old version is printed and replaced with an existing paper document. To realize this by a conventional technique, it is necessary for the creator of a document to 1) print out a minimum number of pages necessary for replacement in consideration of the difference from a former version, and
2) replace corresponding pages of an existing paper document printed out in the past with the newly printed pages.

Actually, much labor from the user is required for the operation of printing out only replacement pages because changes in the contents are hard to recognize due to repetitiveness of texts and graphics or mismatch of page numbers. For this reason, he/she often ends up printing out all pages of the document, resulting in waste of paper resources.

Assume that a user has an existing printed paper document of Ver1.0, as shown in FIG. 35A. After print out, the document is revised to a version (Ver1.1) shown in FIG. 35B. Revision of the document is done by, e.g., a wordprocessor application on a PC so that Ver1.1 is formed as electronic data. As the contents of revision, the version number indicated by "Ver" in page 1 is revised (from 3501 to 3501'), and "Text•2" in the page 2 is revised (from 3502 to 3502'). The remaining portions have no alteration.

Pages that must be printed as the revised parts of Ver1.1 are contained in pages 1 to 3. Page 4 and subsequent pages have the same contents as those of the already printed paper document of Ver1.0 and need not be printed out again. The user discards pages 1 and 2 of the paper document of Ver1.0 (FIG. 35A), prints out pages 1 to 3 of Ver1.1 (FIG. 35B) formed as electronic data, and replaces them. FIG. 35C shows the replacement result.

In the state shown in FIG. 35C, the contents of the paper document after replacement are difficult to grasp because the contents of "Text•3" and the page number of page 3 repeat. In this example, the document is revised only in one part. If the above-described state occurs in a plurality of parts of the document, it is very difficult to understand the paper document after replacement. Additionally, the replacing operation itself is very cumbersome. This eventually makes the creator to print out all pages of the electronic data of Ver1.1 and discard the whole paper document of Ver1.0 without replacement.

A general system for searching for the original data of a printed document can of course search for the original data, but fails to achieve matching with scan data if data in the server are updated, or their contents are revised. It is therefore impossible to effectively use this system to efficiently replace a paper document.

SUMMARY OF THE INVENTION

The present invention has been made in consideration of the above-described problems, and has as its object to automatically create a document with a page composition that minimizes replacement from a paper document.

It is another object of the present invention to implement automatic page number assignment that facilitates replacement from a printed paper document to a print out of a newly updated part.

According to one aspect of the present invention, there is provided a document management apparatus comprising:

an acquisition unit adapted to acquire block information of each page, which is obtained by executing block segmentation processing for each page of document data of a first version;

a discrimination unit adapted to discriminate a matched block and a mismatched block between the first version and a second version on the basis of the block information acquired by the acquisition unit and block information obtained by executing block segmentation processing for each page of document data of the second version;

an extraction unit adapted to extract a block that is determined as a matched block and exists in a page containing a block determined as a mismatched block in the document data of the first version and a block that is determined as a mismatched block in the document data of the second version;

a generation unit adapted to generate a page by laying out the blocks extracted by the extraction unit while maintaining a block sequence in the whole document data of the second version; and an output unit adapted to output the page generated by the generation unit.

According to another aspect of the present invention, the foregoing object is attained by providing a document management method comprising steps of:

acquiring block information of each page, which is obtained by executing block segmentation processing for each page of document data of a first version;

discriminating a matched block and a mismatched block between the first version and a second version on the basis of the block information acquired in the acquiring step and block information obtained by executing block segmentation processing for each page of document data of the second version;

extracting a block that is determined as a matched block and exists in a page containing a block determined as a mismatched block in the document data of the first version and a block that is determined as a mismatched block in the document data of the second version;

generating a page by laying out the blocks extracted in the extracting step while maintaining a block sequence in the whole document data of the second version; and outputting the page generated in the generating step.

Further features of the present invention will become apparent from the following description of exemplary embodiments with reference to the attached drawings.

BRIEF DESCRIPTION OF THE DRAWINGS

FIG. 4 is a table showing a result obtained by executing block information extraction processing for each block in FIG. 3B;

FIGS. 8A and 8B are views showing the outline of block selection processing according to the embodiment, which is executed for a document containing a plurality of pages;

FIG. 9 is a table showing a result obtained by executing block information extraction processing for each block in FIG. 8B;

FIGS. 14A and 14B are views showing a detailed method of page layout processing according to the embodiment;

FIGS. 15A to 15C are views showing a detailed method of page layout processing according to the embodiment;

FIGS. 16A to 16D are views showing the definition of page numbers in a page number assignment algorithm according to the embodiment;

FIGS. 20A to 20C are views showing a detailed processing method of the page number assignment algorithm according to the embodiment;

FIGS. 30A and 30B are views showing the outline of processing upon document replacement according to the embodiment;

FIGS. 40A to 40D are views showing the outline of version management according to the second embodiment;

FIGS. 41A and 41B are views showing the outline of page layout processing upon document replacement according to the second embodiment;

FIGS. 42A and 42B are views showing the outline of page layout processing upon document replacement according to the second embodiment;

FIGS. 43A and 43B are views showing the outline of page layout processing upon document replacement according to the second embodiment;

FIGS. 44A and 44B are views showing the outline of page layout processing upon document replacement according to the second embodiment;

FIG. 45 is a flowchart showing processing upon document replacement according to the third embodiment.

DESCRIPTION OF THE EMBODIMENTS

Preferred embodiments of the present invention will now be described in detail in accordance with the accompanying drawings.

<Outline of Operation>

Figure 35A:
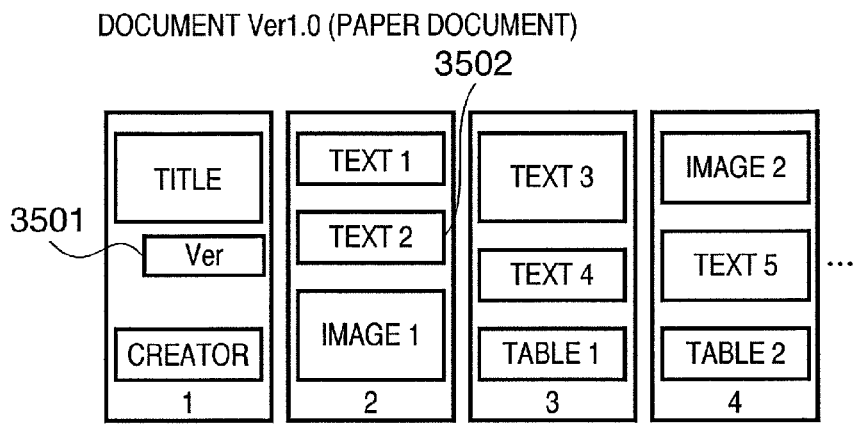
FIGS. 35A to 35C are views for explaining a problem of a general document management method.
Figure 35B:
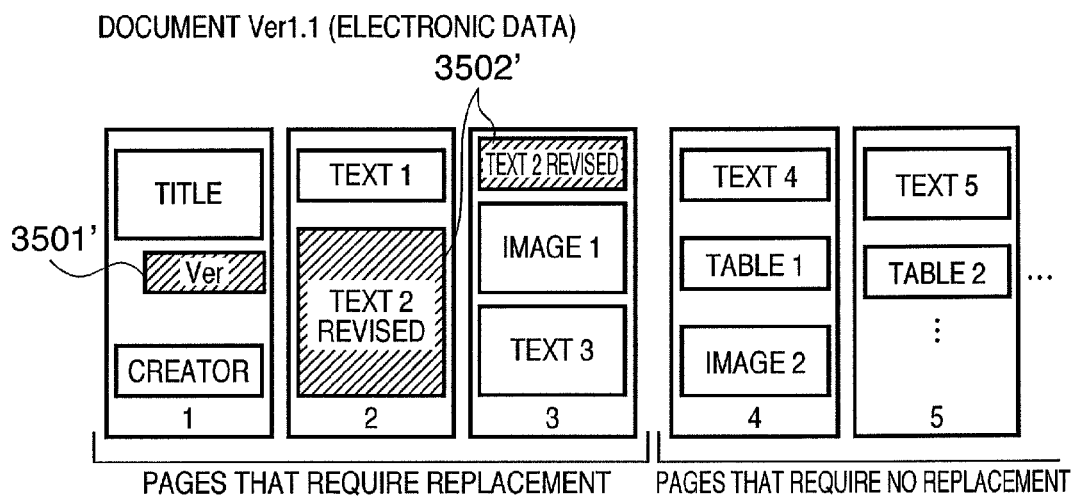
Figure 35C:
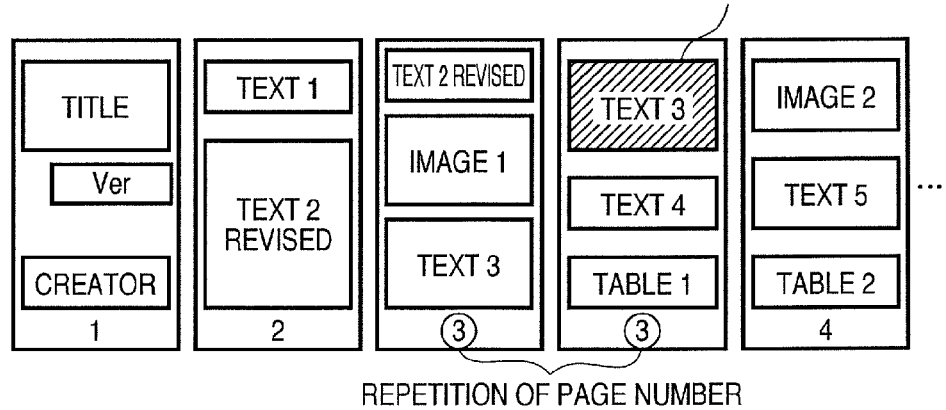
Figure 36A:
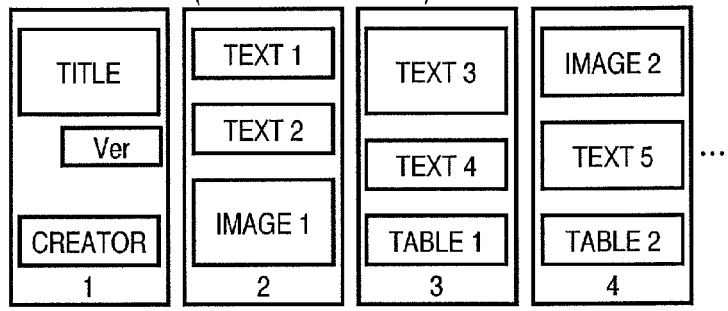
FIGS. 36A to 36D are views for explaining the outline of improvement according to the embodiment.

The outline of replacement page print processing according to an embodiment will be described. For example, assume that a user has an existing printed paper document of a document of Ver1.0, as shown in FIG. 36A. After print out, revision of the same contents as described with reference to FIGS. 35A and 35B is executed for the document to change its version to Ver1.1.

Figure 36B:
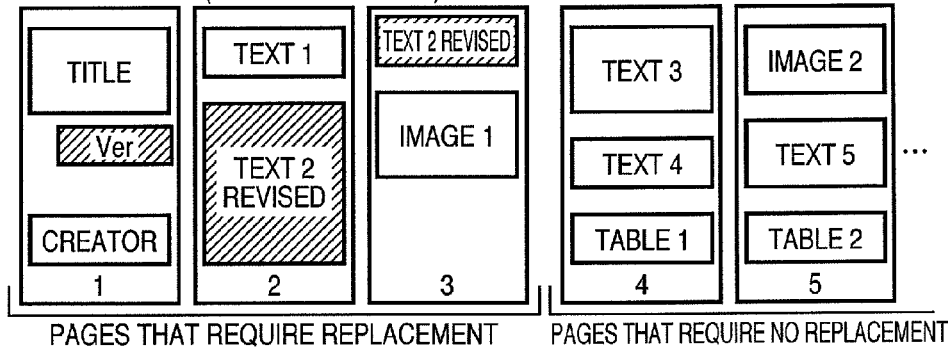

First, the changed parts are automatically recognized by scanning the paper document of Ver1.0. The layout of unchanged parts is altered to obtain a page layout that is similar to the paper document as much as possible. As a result, the user can know that pages that must be printed as the revised parts of Ver1.1 are pages 1 to 3, as shown in FIG. 36B. Page 4 and subsequent pages have the same contents as those of the already printed paper document of Ver1.0 and need not be printed again. In this embodiment, the page layout is adjusted to make page 4 and subsequent pages of Ver1.1 have the same page layout as that of page 3 and subsequent pages of the paper document.

Figure 36C:
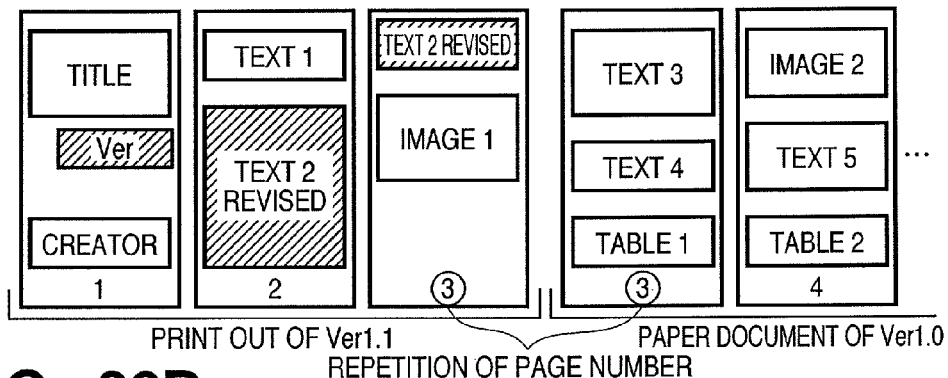

The user only need to discard pages 1 and 2 of the paper document of Ver1.0, print out pages 1 to 3 of Ver1.1 formed as electronic data, and replace them. In this state, however, both the paper document and the newly output Ver1.1 have page 3, i.e., the page number repeats, as shown in FIG. 36C.

Figure 36D:
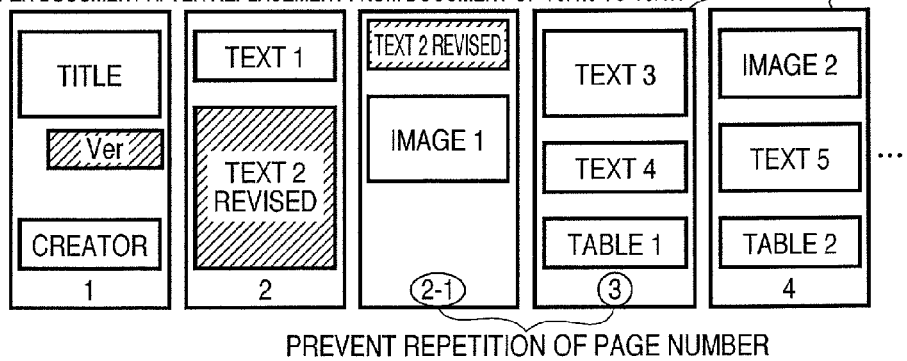

This embodiment uses sub-numbers by a unique algorithm to avoid repeat of page numbers in printing out replacement pages. Consequently, page numbers are assigned, as shown in FIG. 36D, in printing out the replacement pages, thereby preventing repeat of page numbers and clearly notifying the operator of the insert positions upon replacement.

Figure 37:
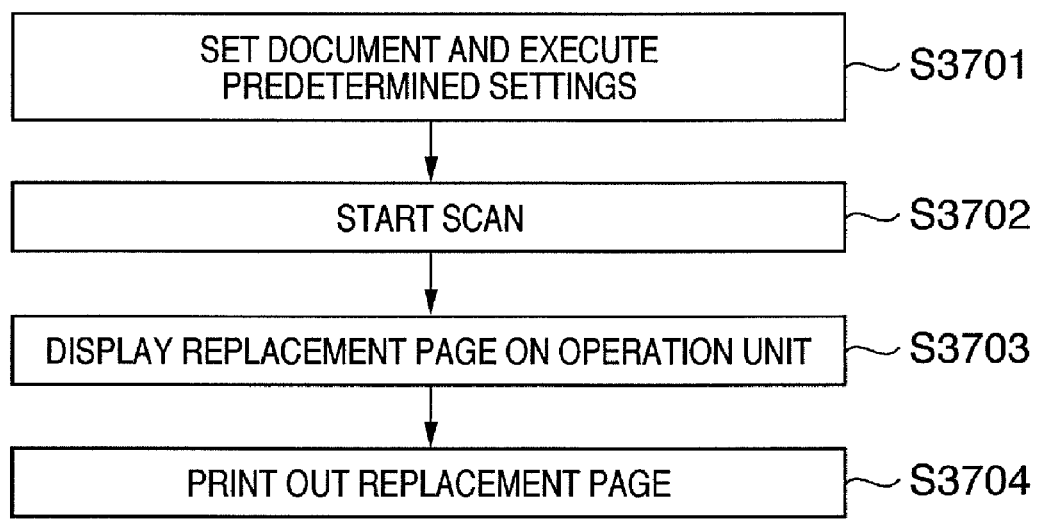
FIG. 37 is a flowchart showing operator's operation contents according to the embodiment.

The print system of this embodiment therefore executes an operation of replacing an existing paper document with its latest version in accordance with contents shown in the flowchart of FIG. 37.

In step S3701, the user of the print system sets a paper document on the auto document feeder (to be referred to as an ADF hereinafter) of the scanner and executes predetermined settings. In step S3702, all document pages are scanned. After scan, the apparatus compares the electronic data of the latest version with the document image obtained by scan. In step S3703, the numbers of pages to be discarded from the paper document are displayed on the display unit of the operation unit. Pages to be inserted (pages to be printed as replacement pages) may be displayed together. In step S3704, pages necessary for replacement to the document of the latest version are printed out. When print out is completed, the user removes the pages instructed on the display unit from the paper document and inserts the output document newly printed in step S3704 in the existing paper document on the basis of the assigned page numbers. The replacing operation is thus completed. In this embodiment, the page layout is adjusted to minimize replacement from the paper document. In printing out a replacement page, the number of the newly printed page is determined on the basis of the page numbers before and after the page to be replaced. The page numbers are set without repeating those of the pages remaining in the paper document. The above-described processing will be described below in detail.

First Embodiment

<Print System>

Figure 1:
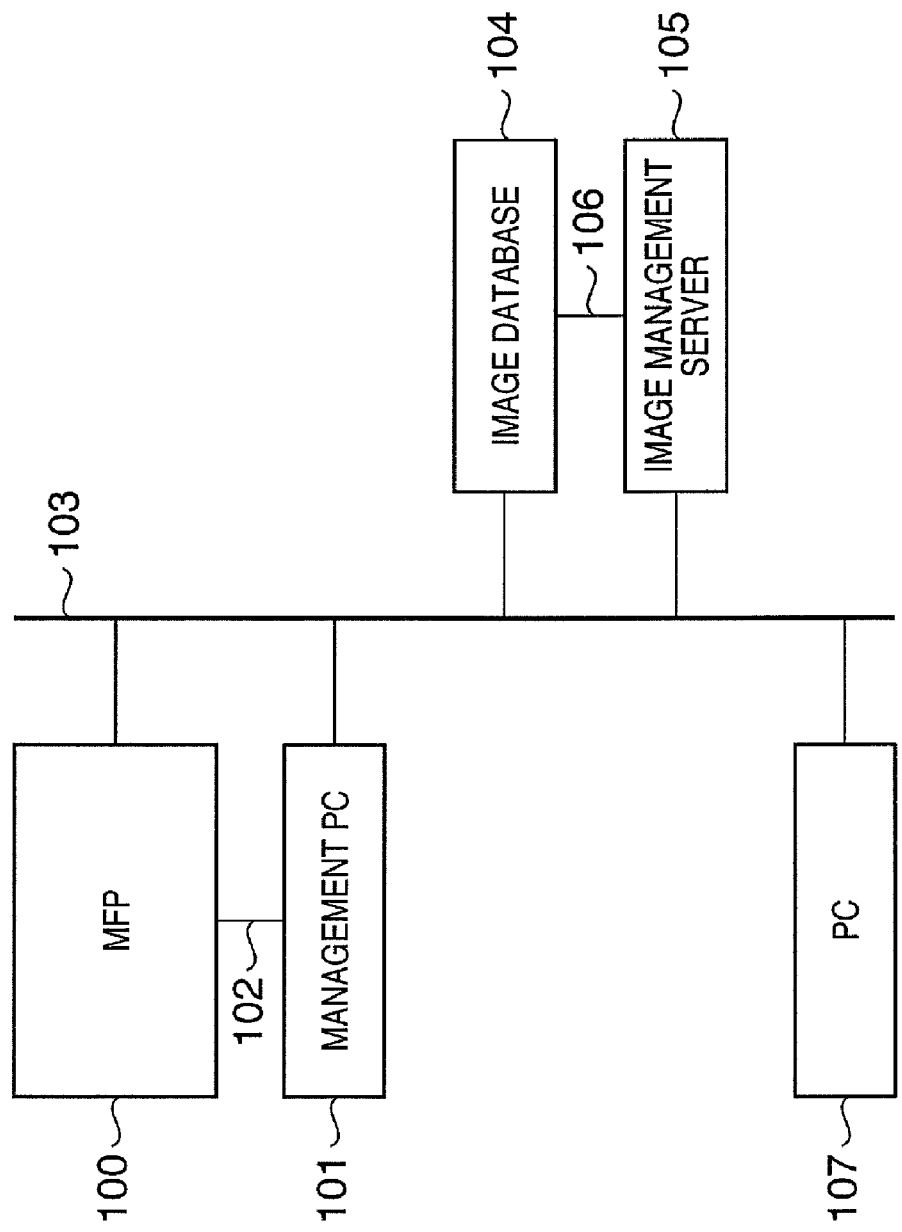
FIG. 1 is a block diagram showing the overall configuration of a print system according to an embodiment.

FIG. 1 is a block diagram showing the configuration of a print system serving as the basics of a system according to this embodiment.

An MFP (multifunctional peripheral) 100 serving as a recording device and a management PC 101 to control the MFP 100 connect to a network 103. A PC 107 to create a document, an image management server 105, and an image database 104 for the image management server 105 connect to the network 103. In this embodiment, the MFP 100 and management PC 101 directly connect to each other via a dedicated interface 102. The image management server 105 and image database 104 directly connect to each other via a dedicated interface 106.

The MFP 100 executes part of image processing for an input image read from a document and inputs the image data as the processing result to the management PC 101 via the interface 102. The management PC 101 is a general computer including an image storage unit, image processor, display unit, and input unit. In this embodiment, the system includes the management PC 101 and MFP 100 separately, although they may be integrated to one device. In this embodiment, the MFP 100 executes block selection processing (block segmentation processing) and pattern matching processing to be described later. However, the present invention is not limited to this. For example, the management PC 101 may execute these processes.

<MFP 100>

Figure 2:
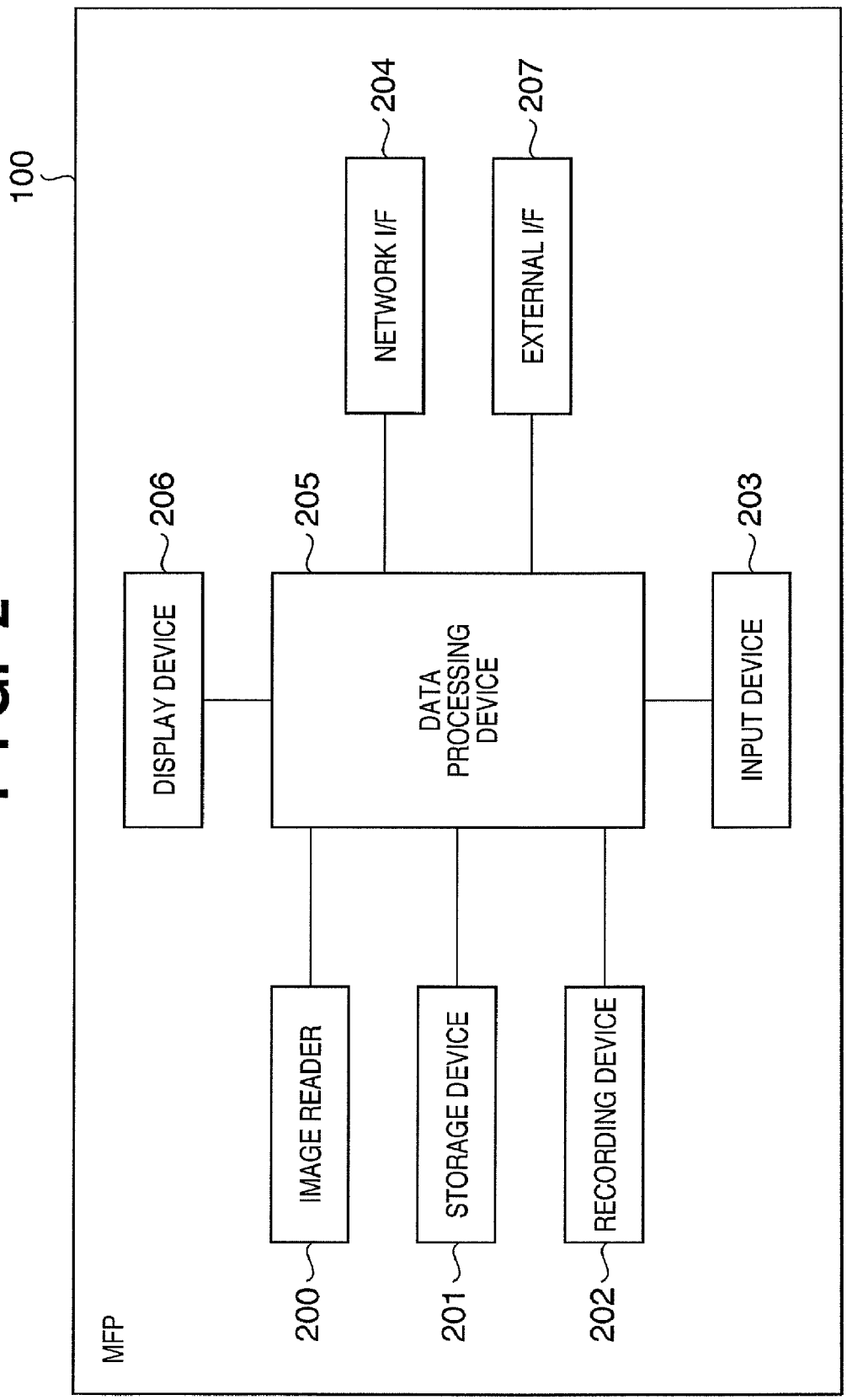
FIG. 2 is a block diagram showing the internal blocks of an MFP 100 in the print system according to the embodiment.

FIG. 2 is a block diagram for explaining the arrangement of the MFP 100. Referring to FIG. 2, the MFP 100 comprises an image reader 200 with an automatic document feeder (ADF) (not shown). The image reader 200 causes a light source to irradiate a document conveyed to the reading position by the ADF and forms the image of reflected light on a solid-state image sensing device through a lens. The solid-state image sensing device generates an image reading signal with a predetermined resolution (e.g., 600 dpi) and predetermined density (e.g., 8 bits). Image data containing raster data is formed from the image reading signal and stored in a storage device 201.

The MFP 100 has the storage device 201 and a recording device 202. To execute a normal copy function, a data processing device 205 processes image data obtained by the image reader 200 to convert it into a record signal and sequentially outputs the signal to the recording device 202 to form a recorded image on a recording paper sheet. To copy a plurality of pages, the data processing device 205 temporarily stores a record signal of one page in the storage device 201 and sequentially outputs the signal to the recording device 202 to form a recorded image.

The MFP 100 also has a network I/F 204 to connect to the network 103. Hence, the MFP 100 can acquire image data from the PC 107 through the network 103 and cause the recording device 202 to record the image on a recording paper sheet. More specifically, the MFP 100 receives, from the network 103 via the network I/F 204, image data output from the PC 107. The data processing device 205 converts the image data into a record signal recordable by the recording device 202 and causes the recording device 202 to record the image on a recording paper sheet.

The MFP 100 is operated through a key operation unit (input device 203) provided on it or the input device (e.g., keyboard and pointing device) of the management PC 101. For the operations, the data processing device 205 causes an internal controller (not shown) to execute predetermined control. The MFP 100 has a display device 206 and causes it to display an operation input state and image data to be processed.

The management PC 101 can directly control the storage device 201 via an external I/F 207 and the dedicated interface 102. The dedicated interface 102 is used to exchange data and control signals between the MFP 100 and the management PC 101.

<Image Database and Image Management Server>

The image database 104 stores image data of texts, tables, graphics, and halftone images used in a document created by the PC 107. The image database 104 also stores various kinds of attached information (to be described later) of the image data. The image management server 105 manages the image data and attached information.

The configuration of the print system used in this embodiment and the functions of the respective parts have been described above. Several image processing operations executed by the data processing device 205 or management PC 101 will be described next.

<Block Selection Processing>

Figure 3B:
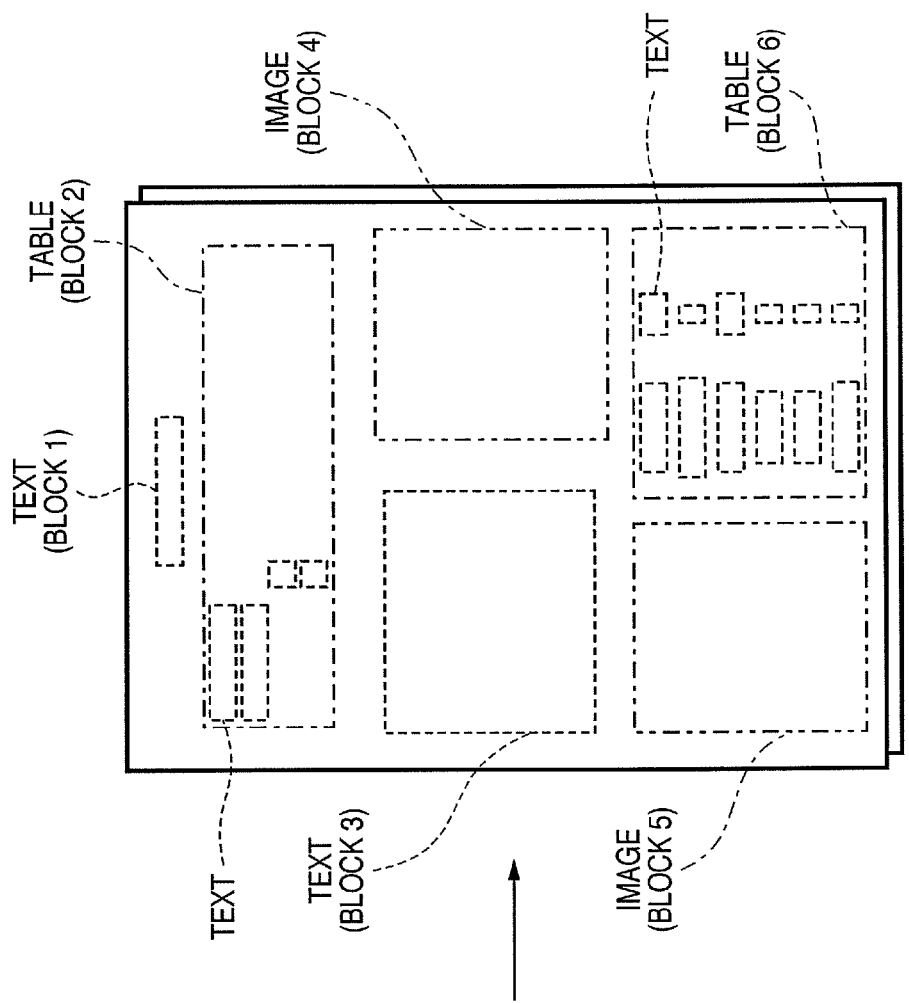
FIGS. 3A and 3B are views showing the outline of block selection processing according to the embodiment.
Figure 3A:
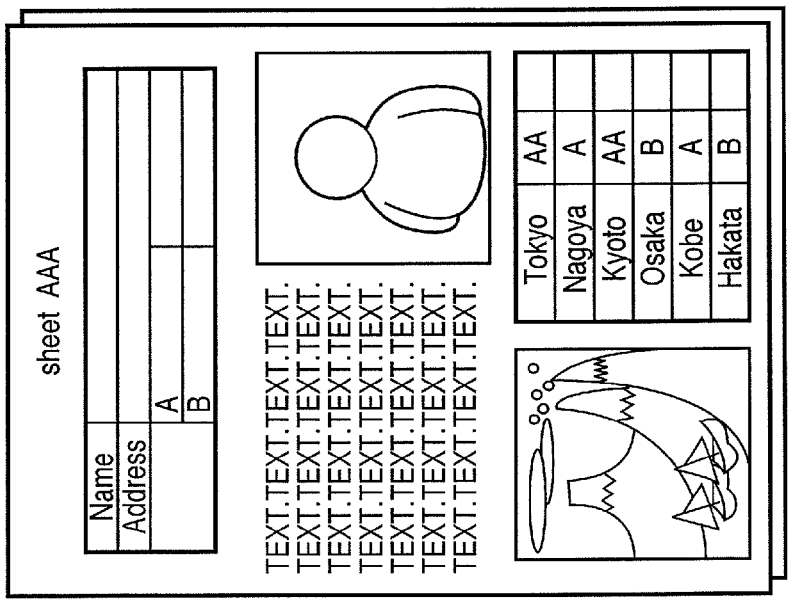

Block selection processing will be described with reference to FIGS. 3A and 3B. The data processing device 205 or management PC 101 executes a predetermined control program to implement block selection processing. In block selection processing (block segmentation processing), input image data of one page, as shown in FIG. 3A, is analyzed and segmented into rectangular blocks, as shown in FIG. 3B, on the basis of attributes. Examples of rectangular blocks are a text region (TEXT), table region (TABLE), and image region (IMAGE). An example of block selection processing will be described below in detail.

In the block selection processing of this embodiment, first, an input image is binarized into a monochrome image. Pixel blocks surrounded by black pixel contours are extracted. The size of each of the extracted black pixel blocks is evaluated. The contours of white pixel blocks inside a black pixel block with a predetermined size or more are traced. The size of each white pixel block is evaluated, and black pixel blocks inside a white pixel block are traced. That is, internal pixel block extraction and contour tracing are repeated recursively if an internal pixel block has a predetermined size or more. The size of a pixel block is evaluated on the basis of, e.g., its area.

A rectangular block circumscribing a thus obtained pixel block is generated. The attribute of each rectangular block is determined on the basis of its size and shape. For example, a rectangular block having an aspect ratio of almost 1 and a size falling within a predetermined range is regarded as a text equivalent block that can be included in a text region rectangular block. If text equivalent blocks in the vicinity align periodically, a new rectangular block including these text equivalent blocks is generated. This new rectangular block is defined as a text region rectangular block. A black pixel block that incorporates periodically rectangular white pixel blocks each having a predetermined size or more is defined as a table region rectangular block. The remaining pixel blocks with indefinite shapes are defined as image region rectangular blocks.

<Block Information Extraction Processing>

In block information extraction processing, input file information is generated by acquiring block information shown in FIG. 4 for each of the rectangular blocks generated, as shown in FIG. 3B, by the above-described block selection processing. That is, each block contains block information and image information of the block.

As indicated by 401 to 408 in FIG. 4, block information of each block contains a block number, attribute, position (coordinate X and coordinate Y), size (width W and height H), and contents (whether the data is color or monochrome, and whether the data contains a text). The block information of a block whose attribute is TEXT or TABLE contains, as other information 409, information representing the text contents in the block. The block information of a block whose attribute is IMAGE contains, as the other information 409, the histogram information of the image and information to discriminate between a line image and a halftone image.

In this embodiment, block attributes 402 are given by a text region (TEXT), table region (TABLE), and image region (IMAGE). The coordinate X 403 and coordinate Y 404 indicate the X- and Y-coordinates of the starting point (the coordinates of the upper left corner) of each rectangular block in the input image. In this embodiment, X-coordinates are plotted in the horizontal direction, and Y-coordinates are plotted in the vertical direction. In this embodiment, the block numbers 401 are assigned in ascending order of Y-coordinate values. Blocks having identical Y-coordinate values are numbered in ascending order of X-coordinate values. The width W 405 indicating a block size represents the X-direction size of a rectangular block, and the height H 406 represents the Y-direction size of a rectangular block.

The block information contains information representing whether an image in a block is color or monochrome. If it is determined that a text exists in a block, OCR processing is executed for the text. Hence, block information contains information 408 representing whether a block contains character data. In addition, various kinds of information to be used for pattern matching (to be described later) are extracted as the other information 409 and stored together with image data. The various kinds of information change depending on the attribute such as a text region, table region, and image region.

For example, the block information of a text region contains, as the other information 409, text data obtained by OCR-processing characters in the region. If a table region includes characters, the block information of the table region contains text data obtained by OCR-processing the characters in the table region. The block information of an image region contains the histogram of image data in the region and information to discriminate between a line image and a halftone image assumed from the histogram.

Figure 5:
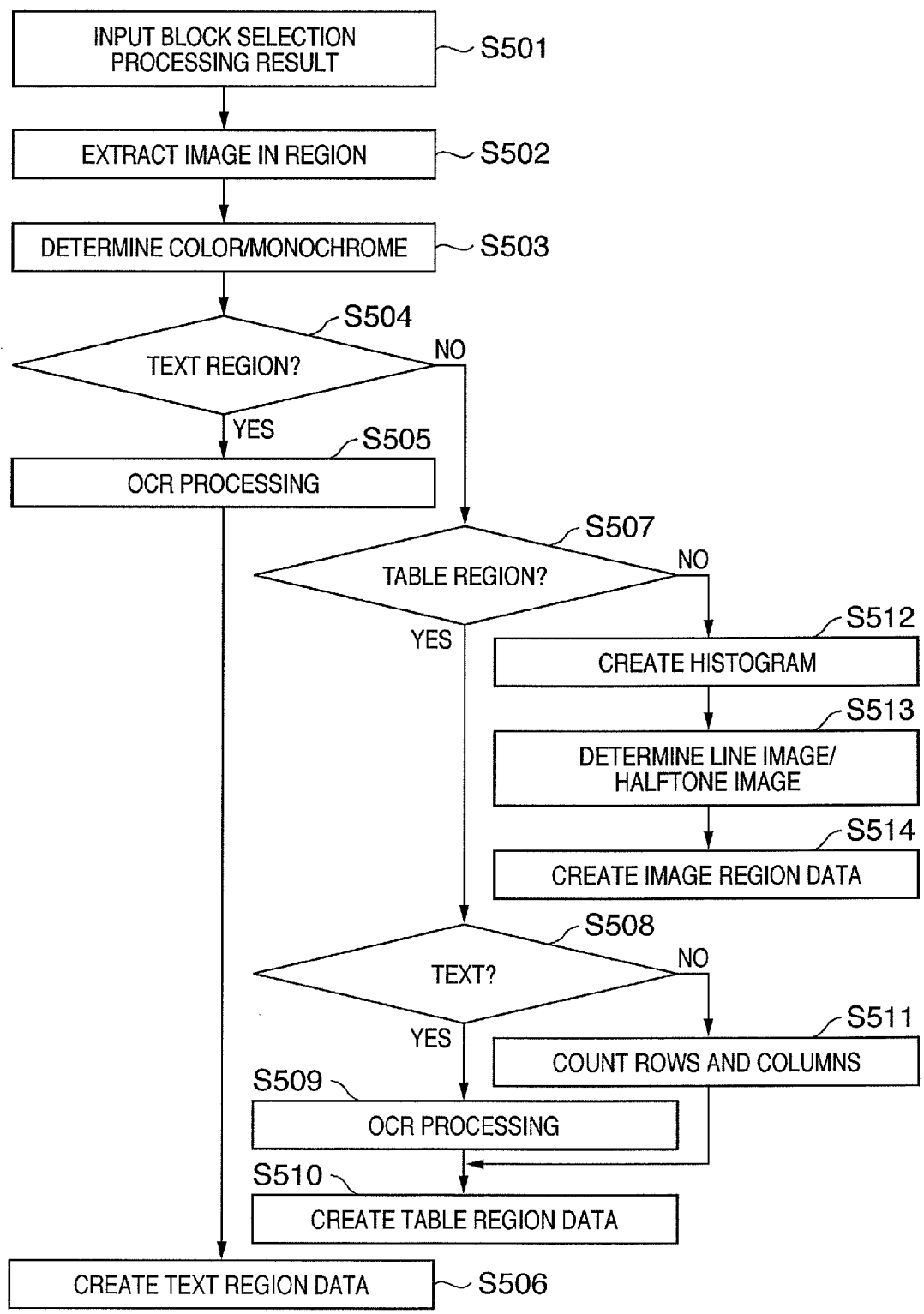
FIG. 5 is a flowchart showing block information extraction processing according to the embodiment.

FIG. 5 is a flowchart showing block information extraction processing executed by the data processing device 205. The data processing device 205 or management PC 101 executes a predetermined control program to implement block information extraction processing to be described below. A description will be made below assuming that the data processing device 205 executes block information extraction processing.

In step S501, the data processing device 205 acquires a result of block selection processing. The result of block selection processing contains information such as the attribute, coordinate X, coordinate Y, width W, and height H of each block and the presence/absence of a text in each block. These pieces of information can directly be used as the block information in FIG. 4. In step S502, the data processing device 205 extracts, from the memory, the image data of a block as an information extraction target in a page on the basis of the coordinate X, coordinate Y, width W, and height H. Various kinds of information are extracted sequentially from the image data of each extracted block.

In step S503, the data processing device 205 executes color/monochrome determination. This determination is done on the basis of the values of RGB data in image data. For example, let Rn, Gn, and Bn be the data values of the colors. If the absolute values of Rn-Gn, Gn-Bn, and Bn-Rn are smaller than preset values (ΔNr-g, ΔNg-b, and ΔNb-r), respectively, the image is determined as a monochrome image. If the absolute values are equal to or larger than the preset values, the image is determined as a color image. In this embodiment, color/monochrome determination is done in this way. The determination may be done by a more simple method in consideration of the circuit scale or the processing speed of software. The color/monochrome determination accuracy may be increased by using a more advanced method.

The other information in the block information changes depending on the attribute of each region. Hence, the process branches in accordance with the attribute of each block (image data).

If the extracted image data is determined to be a text region (the attribute is TEXT), the process advances from step S504 to step S505. In step S505, the data processing device 205 executes OCR processing of the image data and recognizes the character information in the block as text data. In step S506, the data processing device 205 registers the text data obtained by OCR processing as the other information 409, i.e., information of the text region. The information 408 representing the presence/absence of a text is set to "YES".

If the block extracted in step S502 is determined to be not a text region but a table region (the attribute is TABLE), the process advances to step S508 via steps S504 and S507. In step S508, the data processing device 205 determines whether character data exists in the region. If the data processing device 205 determines in step S508 that character data exists in the region, the process advances to step S509. The data processing device 205 executes OCR processing of the image data. The data processing device 205 recognizes the character information in the block as text data and registers it as the other information 409 in the block information. The information 408 representing the presence/absence of a text is set to "YES".

If the data processing device 205 determines in step S508 that no character data exists in the region, the process advances from step S508 to step S511. In step S511, the data processing device 205 counts the rows and columns of the table in the image that is determined to be a table region containing no character data. In step S510, the data processing device 205 registers the information as the other information 409 of the table region in the block information. The data (block information) of the table region is thus generated. In this case, the information 408 representing the presence/absence of a text is set to "NO".

If the block extracted in step S502 is determined to be neither a text region nor a table region, the block is recognized as an image region (the attribute is IMAGE), and the process advances to step S512 via steps S504 and S507. In step S512, the data processing device 205 creates the histogram of the image data of the block. In step S513, the data processing device 205 determines whether the image data of the block is a line image or a halftone image. In step S514, the data processing device 205 records the histogram created in step S512 and the determination result in step S513 as the other information 409 in the block information. The data (block information) of the image region is thus generated.

Histogram creation in step S512 will be described with reference to FIG. 6. The histogram creation method according to this embodiment is as follows.

Figure 6:
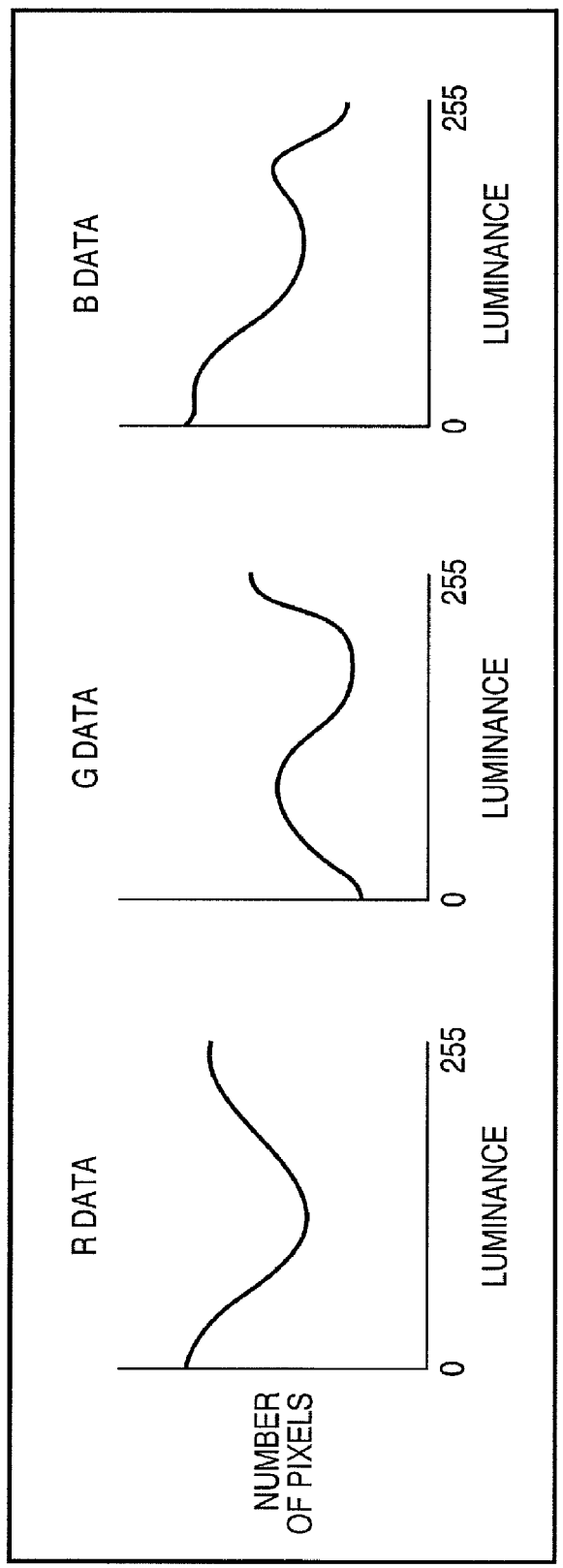
FIG. 6 illustrates graphs showing examples of the histograms of halftone image data processed as block information according to the embodiment.

The data processing device 205 counts, for each of RGB image data, the number of pixels of each of luminance levels 0 to 255 and makes line graphs, as shown in FIG. 6. More specifically, a counter is prepared for each of the values 0 to 255. Pixels of image data in the memory are sequentially input one by one, and a counter corresponding to each pixel value is incremented. When all pixels are counted, the data for a histogram are collected.

Figure 7:
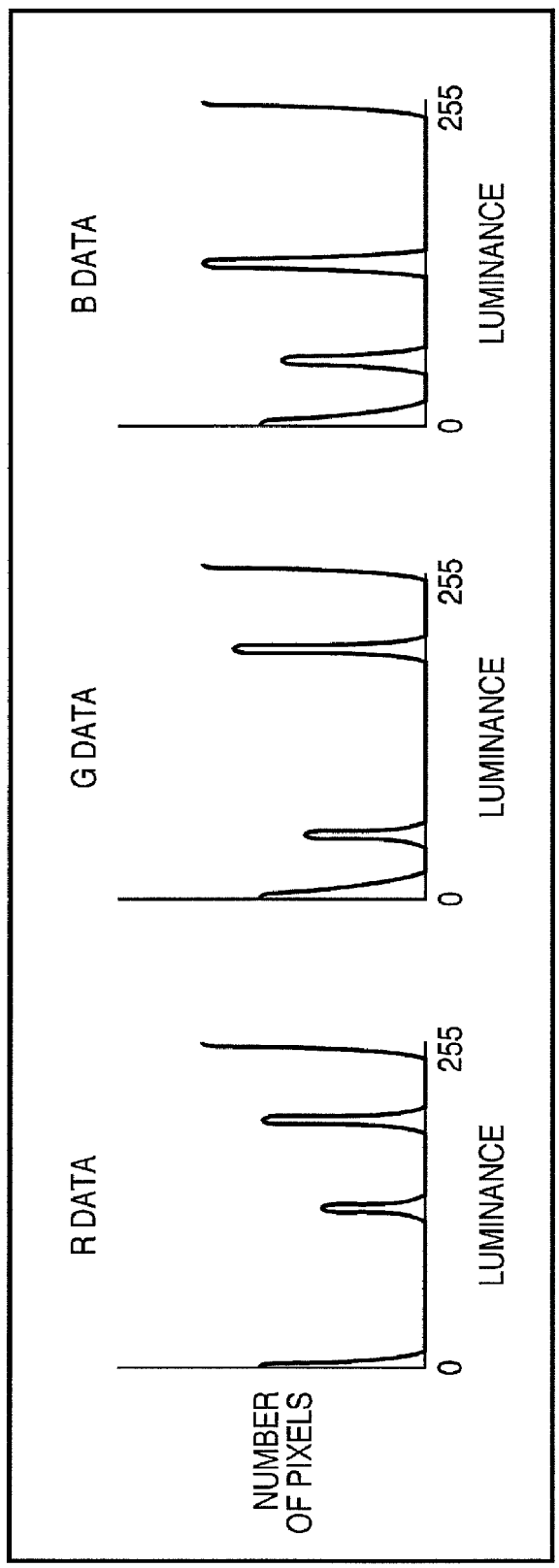
FIG. 7 illustrates graphs showing examples of the histograms of line image data processed as block information according to the embodiment.

Whether image data is a line image or a halftone image can be determined by using, e.g., the histogram data. In a halftone image, the RGB values used in the image change with tonality. Hence, the histograms are represented by continuous curves on the whole, as shown in FIG. 6. In a line image, the RGB values represent predetermined colors. Hence, certain values are outstanding, as shown in FIG. 7. Whether image data is a line image or a halftone image can be determined by discriminating between the two features of histogram data.

More specifically, in this embodiment, peaks of a histogram are extracted from data. The ratio of pixels included in several levels before and after each peak is calculated as a percentage of all pixels, and the calculated values are summed. The sum is divided by the number of extracted peaks. If the resultant value is larger than a preset value, the image is determined as a line image. If the value is smaller than the preset value, the image is determined as a halftone image.

In this embodiment, the above-described items are used as the other information of each region. However, the present invention is not limited to this. For example, the number of characters in a text region or table region, the font type, character size, the widths of the columns and rows of a table region, the widths of lines of a table, and the edge information of an image region may be added as items of the other information. This allows to more quickly and accurately execute pattern matching processing later on the basis of those various kinds of information described above.

<Block Selection and Information Extraction Processing in a Plurality of Pages>

In this embodiment, block selection and information extraction processing are executed for a document including a plurality of pages, and obtained data are used for pattern matching and page layout later. An information management method when block selection processing is executed for a plurality of pages will be described with reference to FIGS. 8A, 8B, and 9.

FIG. 8A shows image data of a plurality of pages. FIG. 8B shows how to assign block numbers to regions obtained by block selection processing. In this example, the blocks are numbered in consecutive order throughout the pages. Rectangular blocks in each page are numbered on the basis of their positions (X- and Y-coordinates) as described above. More specifically, the blocks are numbered in ascending order of Y-coordinate values. Blocks having identical Y-coordinate values are numbered in ascending order of X-coordinate values.

FIG. 9 is a table showing a result obtained by executing information extraction processing for each block in the pages. Extracted block information contains almost the same information as that of the blocks in one page described with reference to FIG. 4. When a plurality of pages undergo the block selection, an item "page number" is added. This information is used for inter-page layout change processing (to be described later in detail).

<Pattern Matching of Image>

Image similarity determination is done on the basis of various kinds of information about image data, and an image matching a target image is selected from a plurality of image data. This processing is called pattern matching processing.

In this embodiment, upon changing a document, pattern matching processing is executed between image data in each rectangular block obtained by block selection processing of the updated document and image data in the image database. Alternatively, upon replacing a paper document with a latest version, pattern matching processing is executed between image data in each rectangular block obtained by block selection processing of image data obtained by scanning the paper document and image data in the image database.

In this embodiment, image information used for pattern matching is information extracted by the above-described block information extraction processing. The method of pattern matching of this embodiment changes between a text region, table region, and image region because information for determination changes between attributes recognized by block selection.

Figure 10:
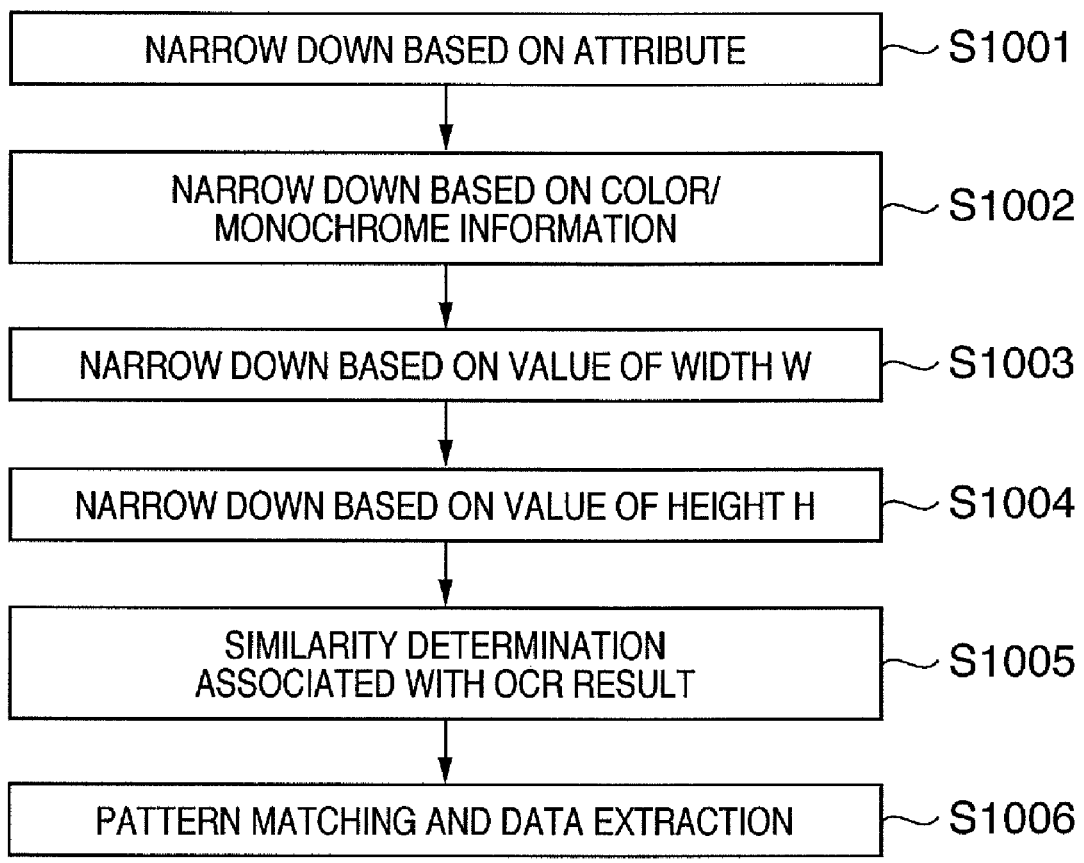
FIG. 10 is a flowchart showing pattern matching processing for a text region according to the embodiment.

On the basis of various kinds of block information recognized by block selection processing, matched image data are narrowed down from a plurality of image data stored in the image database. For quick narrow down, information that allows determination by simple comparison is used first. FIG. 10 shows the procedure of pattern matching processing when an original image is a text region. The data processing device 205 or management PC 101 executes a predetermined control program to implement processing shown in FIG. 10. A description will be made below assuming that the data processing device 205 executes the following pattern matching processing.

In step S1001, the data processing device 205 executes narrow down based on the attribute. In pattern matching of a text region, blocks whose attribute is determined as a text region are selected from all image data in the image database. In step S1002, the data processing device 205 selects data matching the original image by determining whether the text region contains color image data.

In step S1003, the data processing device 205 executes narrow down on the basis of the value of the width W in the block information. In this embodiment, the data processing device 205 selects image data satisfying $$W-n \leq Wx \leq W+n \tag{1}$$

where W is the width of the original image in pattern matching, Wx is the width of each image in the image database, n is a preset value. The larger the value n is, the larger the number of image data candidates to be selected is.

In step S1004, the data processing device 205 executes narrow down on the basis of the value of the height H in the block information. In this case, the data processing device 205 selects image data satisfying $$H-m \leq Hx \leq H+m \tag{2}$$

where W is the height of the original image in pattern matching, Hx is the height of each image in the image database, m is a preset value. The larger the value m is, the larger the number of matched image data candidates to be selected is.

In step S1005, the data processing device 205 determines the similarity between the original image and each image in the image database by using text data (OCR result) contained in the block information. The similarity is determined by comparing text information obtained by executing OCR processing of the original image with the text information of each image, in the image database, satisfying all narrow-down conditions in steps S1001 to S1004. In step S1006, the data processing device 205 extracts, from the image database, an image matching the original image on the basis of the similarity determination result in step S1005.

Figure 11:
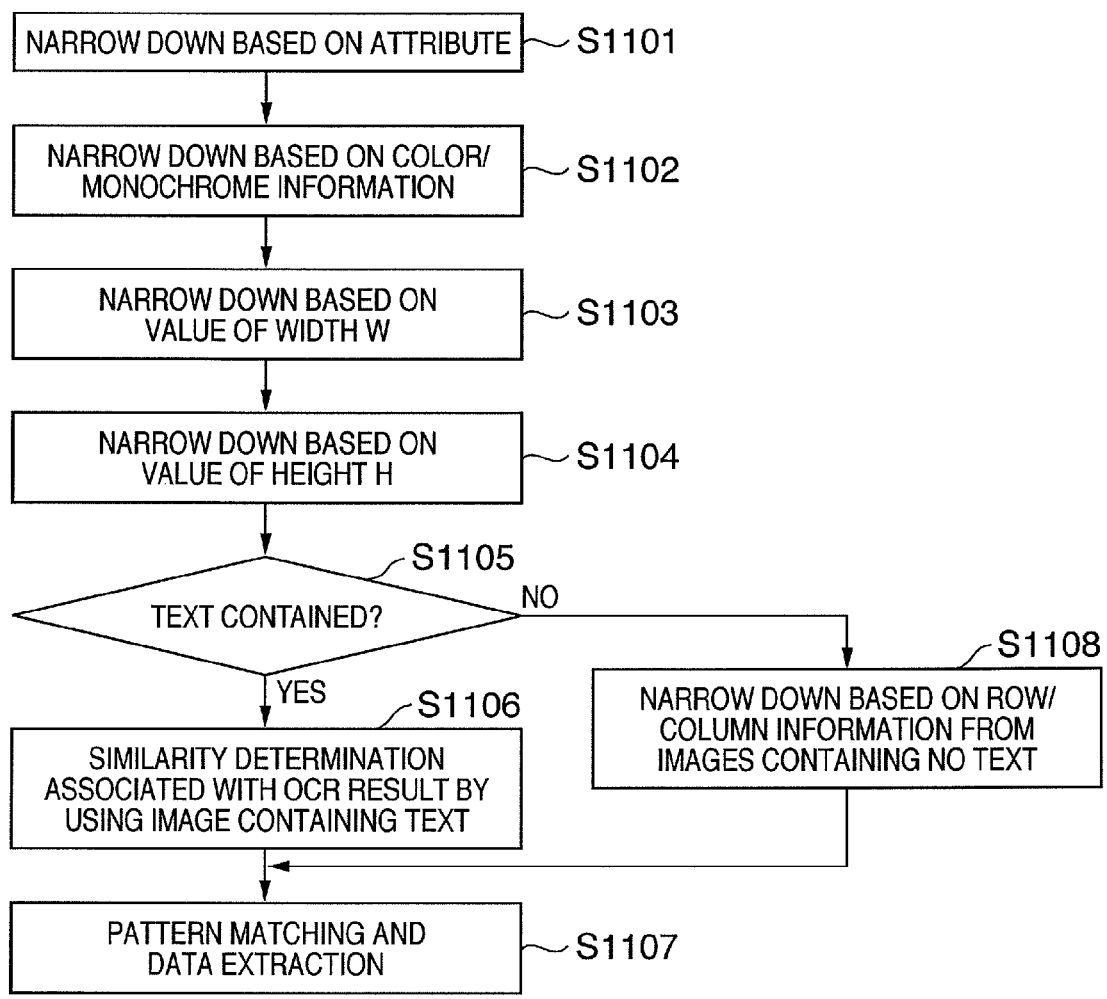
FIG. 11 is a flowchart showing pattern matching processing for a table region according to the embodiment.

Pattern matching processing when an original image is a table region will be described next with reference to the flowchart in FIG. 11. The data processing device 205 or management PC 101 executes a predetermined control program to implement processing shown in FIG. 11. A description will be made below assuming that the data processing device 205 executes the processing.

In step S1101, the data processing device 205 selects blocks whose attribute is determined as a table region from all image data in the image database. The narrow-down process in steps S1102 to S1104 is the same as in steps S1002 to S1004.

In step S1105, the data processing device 205 branches the process depending on whether the table region as a processing target contains a text. If the table region contains a text, the process advances to step S1106. In step S1106, the data processing device 205 executes narrow down by selecting images containing a text from images that satisfy all narrow-down conditions in steps S1101 to S1104. The data processing device 205 determines the similarity by comparing text information of each selected image with text information obtained by executing OCR processing of the original image. In step S1107, the data processing device 205 extracts, from the image database, an image with a highest similarity obtained in step S1106 as an image matching the original image.

If the table region of the original image contains no text, the data processing device 205 executes narrow down in step S1108 by selecting images containing no text from images that satisfy all narrow-down conditions in steps S1101 to S1104. The number of rows and the number of columns of the table are compared between each selected image and the original image. In step S1107, the data processing device 205 extracts, from the image database, an image having rows and columns of the table as many as the original image as a matched image.

Figure 12:
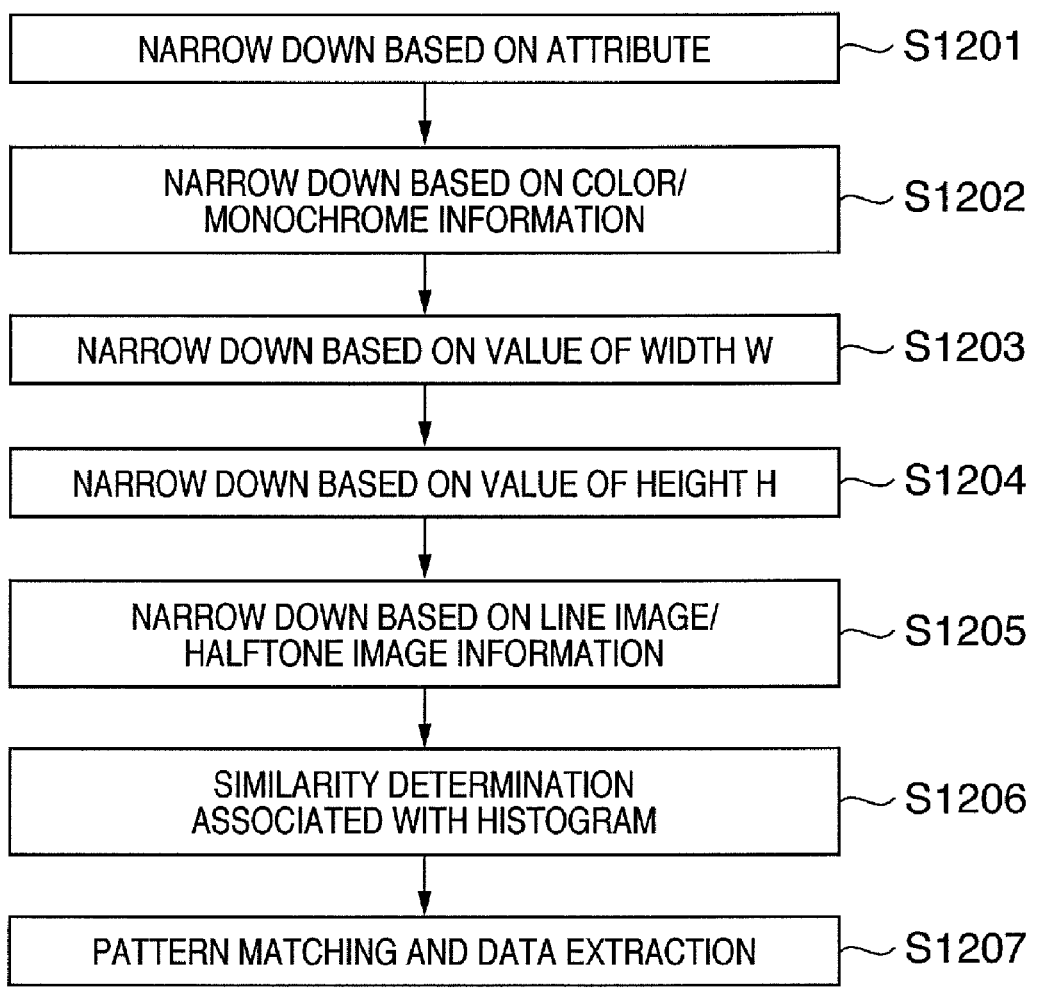
FIG. 12 is a flowchart showing pattern matching processing for an image region according to the embodiment.

Pattern matching processing when an original image is an image region will be described next with reference to the flowchart in FIG. 12. The data processing device 205 or management PC 101 executes a predetermined control program to implement processing shown in FIG. 12. A description will be made below assuming that the data processing device 205 executes the processing.

In step S1201, the data processing device 205 selects blocks whose attribute is determined as an image region from all image data in the image database. The narrow-down process in steps S1202 to S1204 is the same as in steps S1002 to S1004.

In step S1205, the data processing device 205 further executes narrow down by using, of the block information, information representing whether the image is a line image or a halftone image. That is, each image whose information representing whether it is a line image or a halftone image matches the original image is selected from the image database. In step S1206, the data processing device 205 determines the similarity by comparing the histogram of the original image and that of each image that satisfies all narrow-down conditions in steps S1201 to S1205. In step S1207, the data processing device 205 selects and extracts, from the image database, an image with a highest similarity obtained by similarity determination in step S1206.

The other information 409 acquired by "block information extraction processing" is not limited to that described in the above embodiment. For example, the number of characters in a text region or table region, the font type, character size, the widths of the columns and rows of a table region, the widths of lines of a table, and the edge information of an image region may be added as items of the other information 409. Pattern matching processing using the various kinds of information allows to more quickly and accurately execute determination.

<Page Layout Processing>

Page layout processing of this embodiment will be described next with reference to FIGS. 13A to 13C, 14A and 14B, and 15A to 15D.

Figure 13A:
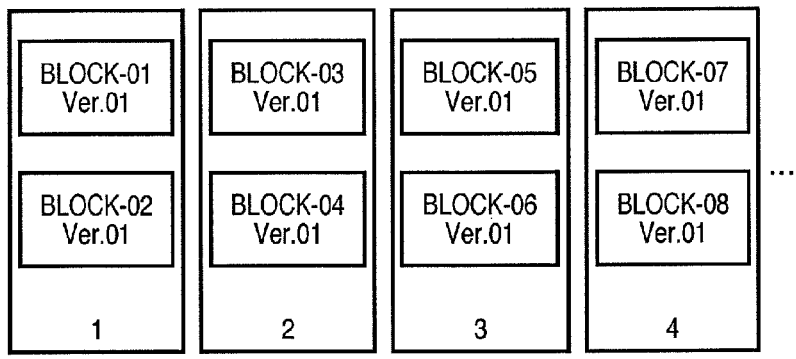
FIGS. 13A to 13C are views showing the outline of page layout processing according to the embodiment.
Figure 13B:
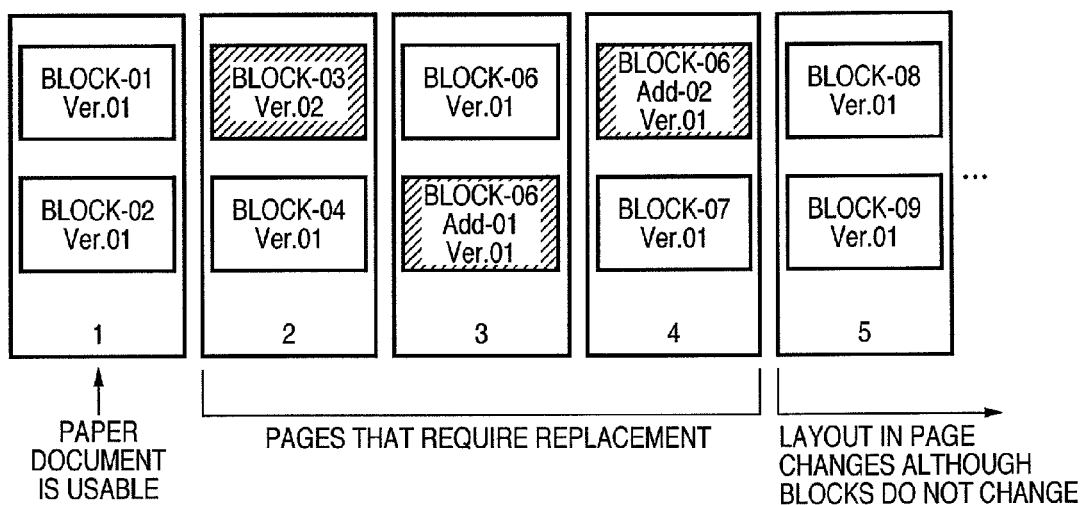

Assume that an already printed paper document (Ver1.0) has a page composition shown in FIG. 13A. The document data in this state is revised by using the PC 107 to a page composition shown in FIG. 13B (Ver1.1). In this example, "Block-05" is deleted, and "Block-03" is revised in the document data of Ver1.0. "Block-06 Add-01" and "Block-06 Add-02" are added after "Block-06". To replace the pages of the paper document without repeating the page numbers and blocks, it is necessary to replace pages 2, 3, and 4 with revised contents and page 5 and subsequent pages with a change in page layout. That is, in the page layout shown in FIG. 13B, all paper document pages from page 2 must be replaced.

Figure 13C:
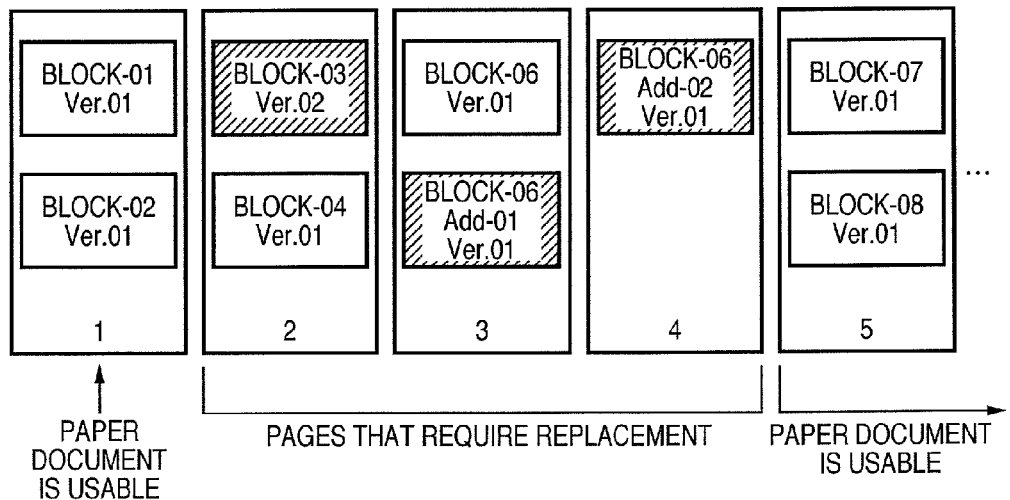

This embodiment executes page layout processing on electronic data, as shown in FIG. 13C, to minimize the number of paper document pages to be replaced. That is, the number of paper document pages to be replaced is reduced by making the block layout of each page matching the paper document as much as possible.

The page layout processing of this embodiment will be described in detail with reference to FIGS. 14A and 14B and 15A to 15C.

FIG. 14A shows information of page numbers and blocks contained in the pages obtained by scanning the paper document shown in FIG. 13A. When this document data is revised to the data in FIG. 13B, and the blocks are laid out closely, block information shown in FIG. 14B is obtained. As compared to the block information shown in FIG. 14A, all pages from page 2 contain blocks different from the paper document.

Page layout processing is executed as shown in FIG. 15B. In this page layout processing, first, the block information based on the page layout of the paper document is compared with the block information of the revised document, thereby determining the layout of pages without block change. In the example shown in FIGS. 15A and 15B, of the revised document, page 1, page 5, and subsequent pages have no revised blocks. Hence, the layout of page 1, page 5, and subsequent pages is determined to be the same as the paper document. Next, the page layout of revised blocks and unrevised blocks (in this embodiment, Block-03 to Block-06 Add-02) contained in the same page as the revised blocks is determined. At this time, page layout starts from a block at the beginning of the document.

Figure 15D:
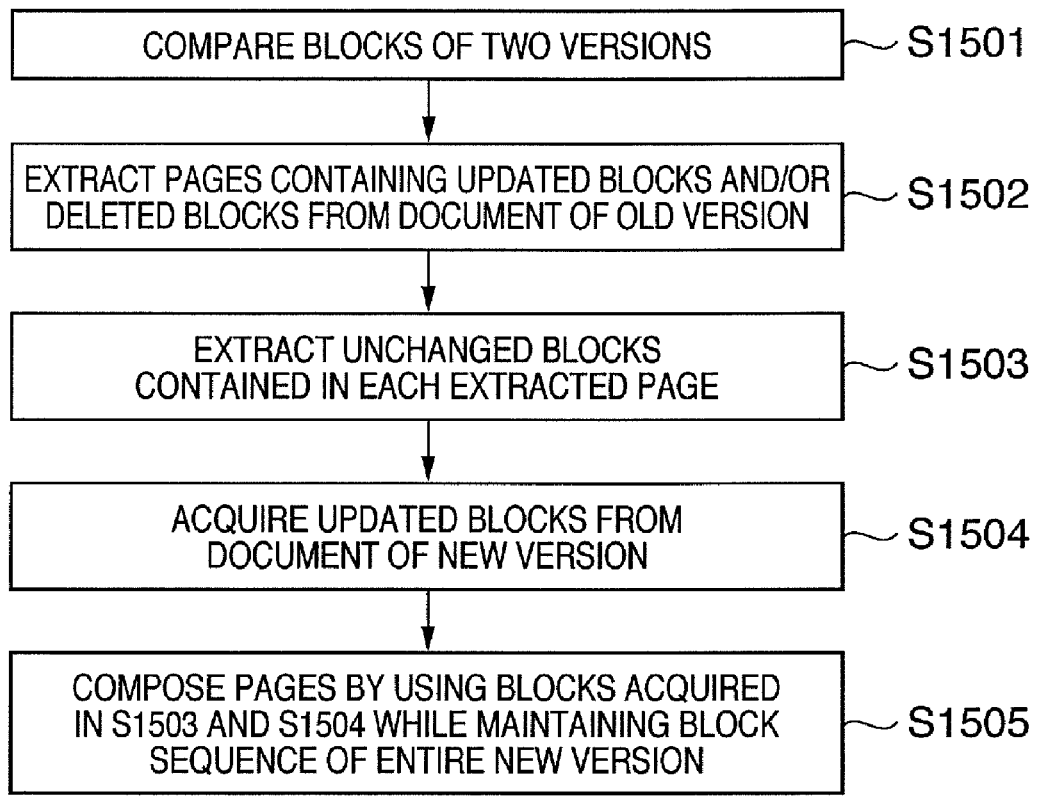
FIG. 15D is a flowchart showing a detailed method of page layout processing according to the embodiment.

FIG. 15D is a flowchart for explaining an example of page layout processing according to this embodiment. The data processing device 205 or management PC 101 executes a predetermined control program to implement processing shown in FIG. 15D. A description will be made below assuming that the data processing device 205 executes the processing. In step S1501, the data processing device 205 compares blocks between two versions and discriminates, of the blocks of the document of old version, blocks (changed blocks) that have been changed and blocks (deleted blocks) that have been deleted. In FIGS. 15A and 15B, Block-03 is a changed block, and Block-05 is a deleted block. In step S1502, the data processing device 205 extracts, from the document of old version, pages containing the changed blocks and/or deleted blocks discriminated in step S1501. In FIG. 15A, pages 2 and 3 are extracted. In step S1503, the data processing device 205 extracts unchanged blocks contained in the pages extracted in step S1502. In FIG. 15A, Block-04 and Block-06 are extracted. In step S1504, the data processing device 205 acquires, from the document of new version, blocks (changed blocks) that have been changed and blocks (added blocks) that have been added. In FIG. 15B, Block-03, Block-06 Add-01, and Block-06 Add-02 are acquired. In step S1505, the data processing device 205 constructs new pages by using the unchanged blocks acquired in step S1503 and the changed blocks and added blocks acquired in step S1504. The pages are constructed so as to maintain the block arrangement of the entire new version. In FIG. 15B, pages 2 to 4 are constructed. The blocks are preferably arranged to minimize the number of newly generated pages.

The above-described page layout processing makes page 1, and page 5 and all subsequent pages of the revised document have the same page layout as the paper document, as shown in FIG. 13C.

<Page Number Assignment Processing>

With the above-described page layout processing, the page layout of the paper document shown in FIG. 15A changes to that shown in FIG. 15B. Comparing the page layout in FIG. 15A with that in FIG. 15B, the page numbers do not match although the blocks contained in each page match.

For example, the page containing Block-07 and Block-08 in FIG. 15A has a number "4". However, the page containing Block-07 and Block-08 in FIG. 15B has a number "5". When only the pages with changed contents are printed out and replaced while maintaining the layout in FIG. 15B, page "4" repeats, resulting in difficulty in grasping the contents of the paper document after replacement.

To solve this problem, this embodiment employs a unique algorithm which prevents page number repeat by assigning page numbers as shown in FIG. 15C upon replacement. Page number assignment processing according to this embodiment will be described with reference to FIGS. 16A to 20C.

In this embodiment, page numbers are defined as shown in FIG. 16A for page number assignment. Normal page numbers "1", "2", "3", . . . use only a first number block. A sub-number block is added to the numbers as needed. A plurality of sub-number blocks can be added as needed.

That is, "1-0" "1-1", and "1-2" are page numbers including first and second number blocks. Page numbers "2-1-0", "2-1-1", and "2-1-2" include first to third number blocks.

As shown in FIG. 16B, if the page numbers have an equal number of number blocks, a page number with a larger value indicates a latter page. As shown in FIG. 16C, the page sequence is determined by preferentially considering a number represented by a higher-numbered number block (the first number block has first priority). As shown in FIG. 16D, a page number using a smaller number of number blocks indicates a former page. In accordance with this definition, page numbers are assigned to pages to be newly output while preventing page number repeat in the paper document.

A page number assignment method when pages are deleted or added as a result of page layout will be described next. Three cases where only page deletion is done, where only page addition is done, and where page deletion and addition are done will be described below in detail.

Figure 17:
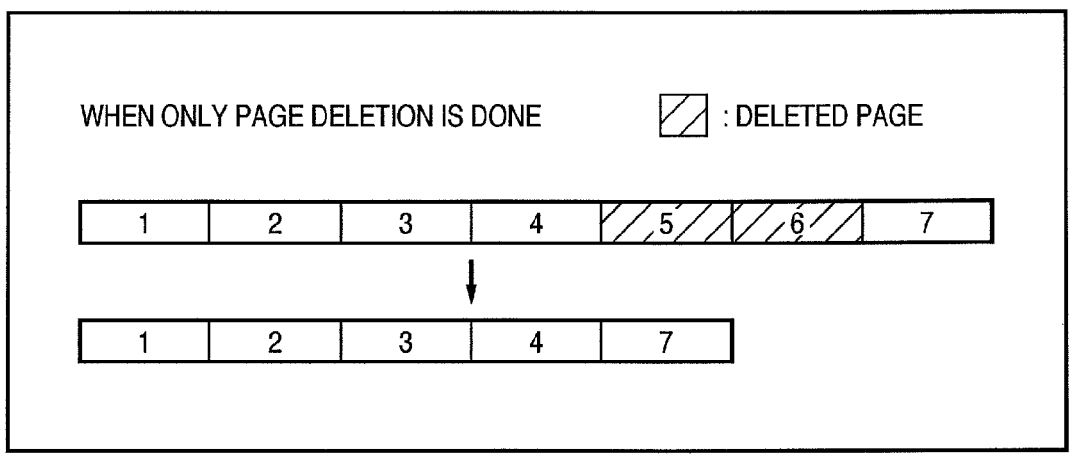
FIG. 17 is a view showing a detailed processing method of the page number assignment algorithm according to the embodiment.

FIG. 17 is a view showing an example wherein only page deletion is done as a result of page layout processing. When only page deletion is done, the user only needs to remove unnecessary pages from the already output paper document so no new print out is necessary. In the example in FIG. 17, the user need only discard pages 5 and 6 without new print out. After replacement, pages 5 and 6 are eliminated from the paper document.

Figure 18A:
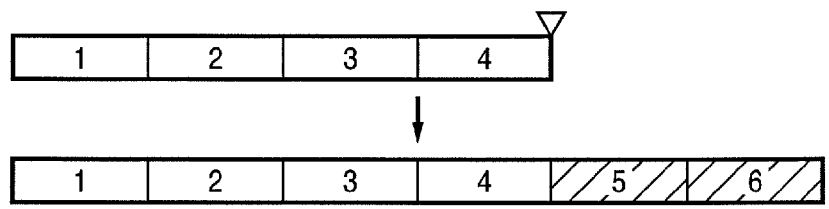
FIGS. 18A and 18B are views showing a detailed processing method of the page number assignment algorithm according to the embodiment.
Figure 18B:
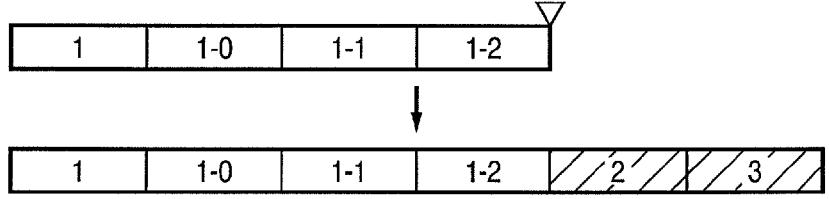
Figure 19A:
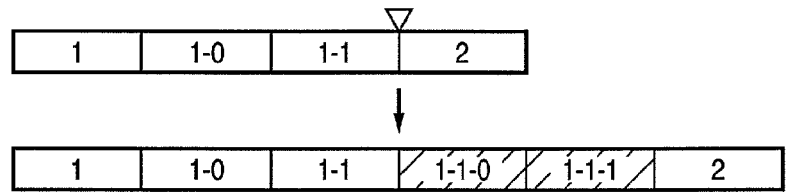
FIGS. 19A to 19C are views showing a detailed processing method of the page number assignment algorithm according to the embodiment.
Figure 19B:
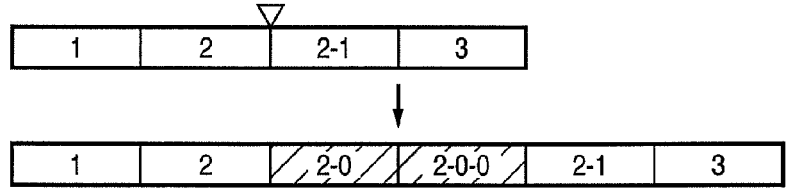
Figure 19C:
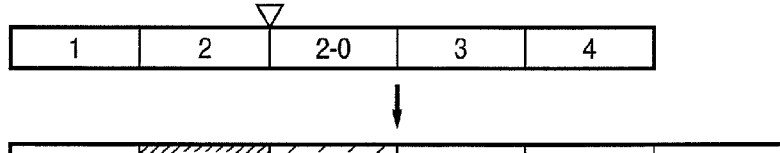

FIGS. 18A, 18B, and 19A to 19C show an example wherein only page addition is done as a result of page layout processing. When only page addition is done, discard of unnecessary pages from the already output paper document does not occur. Instead, newly printed pages are inserted in the paper document. At this time, the newly printed pages are assigned page numbers without any page repeat in the existing paper document. FIGS. 18A and 18B show cases wherein pages are added to the end of the paper document. FIGS. 19A to 19C show cases wherein pages are added halfway in the paper document. In this case, the printed pages are assigned page numbers by assigning numbers to the highest number block of the last page number in ascending order.

In the example shown in FIG. 18A, newly printed pages are added after the last page, i.e., page 4 of the paper document. The newly printed pages are assigned page numbers "5" and "6". In the example shown in FIG. 18B, newly printed pages are added after the last page, i.e., page "1-2" of the paper document. In this case, the newly printed pages are assigned page numbers "2" and "3" because numbers are assigned to the highest number block (the first number block) of the last page number in ascending order.

FIGS. 19A to 19C show cases wherein pages are added halfway in the paper document. In these cases, page numbers are assigned in accordance with the following rules.

[Rule a] A number block is added to the page number of the page immediately before the added page. Numbers beginning from 0 are assigned to the added number block in ascending order.

[Rule b] If the page number assigned in accordance with the rule a exists in the already output paper document, a number block is further added, and numbers beginning from 0 are assigned to the added number block in ascending order.

[Rule c] If the page number assigned in accordance with the rule b violates the rule in FIG. 16D, i.e., "a page number using a smaller number of number blocks indicates a former page", the following processing is done.

<c-1> A number block is added to the page immediately before the inserted page that violates the rule, and a number is assigned to the immediately preceding page by setting the added number block to "0" (the page with the new page number is printed as needed).

<c-2> Page numbers are assigned to the inserted pages while setting numbers in ascending order to the added number block.

[Rule d] When the page numbers of the pages immediately before and after the addition point have n number blocks and n+1 number blocks, respectively, and the value of the (n+1)th number block of the page number of the immediately succeeding page is 0, the following processing is executed. First, the immediately preceding page is output again. At this time, the page number of the immediately preceding page is changed by adding a number block and setting it to 0. The added pages are assigned page numbers obtained by assigning numbers in ascending order to the added number block.

In the example shown in FIG. 19A, two pages are added between page "1-1" and "2" of the paper document. In this case, one number block is added in accordance with the rule a. Page numbers "1-1-0" and "1-1-1" are assigned.

In the example shown in FIG. 19B, two pages are added between page "2" and "2-1" of the paper document. In this case, if the rule a is applied, the page numbers are "2-0" and "2-1". However, "2-1" is already used upon preceding replacement and exists in the paper document. Hence, the rule b is applied to add a number block and assign a number "2-0-0". Added pages after "2-0-0" obtain page numbers determined by assigning numbers to the third number block in ascending order. For example, if four pages are added in FIG. 19B, their page numbers are "2-0", "2-0-0", "2-0-1", and "2-0-2".

In the example shown in FIG. 19C, two pages are added between page "2" and "2-0" of the paper document. If the rule a is applied, the page numbers are "2-0" and "2-1". In this case, "2-0" is already used upon preceding replacement and exists in the paper document. Hence, the rule b is applied to add a number block and assign a number "2-0-0". This creates a page number sequence of "2", "2-0-0", and "2-0" and violates the rule "a page number using a smaller number of number blocks indicates a former page". Hence, page number assignment is done in accordance with the rule c. A page having a page number "1-0" and the same contents as page 2 of the paper document is printed out. An added page is assigned a page number "1-1", printed out, and replaced with the paper document. As a result, a document having the page number sequence shown in FIG. 19C is obtained.

FIGS. 20A to 20C are views for explaining page number assignment when pages are deleted, and pages are added to the deletion positions in the paper document. The processing method changes depending on the relationship between the number of deleted pages and the number of added pages. Every case will be described.

FIG. 20A shows an example wherein the number of deleted pages equals the number of added pages. If the number of deleted pages equals the number of added pages, page numbers are assigned in accordance with a rule "in the range of deleted pages, the same page numbers as the deleted pages are assigned to added pages". Hence, the page numbers do not change even after replacement. In FIG. 20A, two pages, i.e., page 4 and page 5 of the paper document are deleted, and two new pages are added. The numbers of newly printed pages are "4" and "5".

FIG. 20B shows an example wherein the number of deleted pages is larger than the number of added pages. If the number of deleted pages is larger than the number of added pages, page numbers are assigned in accordance with a rule "in the range of deleted pages, the same page numbers as the deleted pages are assigned to added pages". Hence, the page numbers are discontinuous after replacement because of page missing. However, this embodiment provides no solution to the problem that simply generates a missing number and has not so large effect upon recognizing the document contents, unlike page number repetition that makes it difficult to grasp the page sequence.

In FIG. 20B, three pages, i.e., pages 3 to 5 of the paper document are deleted, and two new pages are added. The numbers of newly printed pages are "3" and "4". The paper document after replacement has no page 5 at this point of time.

FIG. 20C shows an example wherein the number of added pages is larger than the number of deleted pages. In this case, page number assignment is done in accordance with the following procedure.

(1) Page numbers are assigned in accordance with a rule "in the range of deleted pages, the same page numbers as the deleted pages are assigned to added pages".

(2) After all the numbers of the deleted pages are used up, page numbers are assigned in accordance with a rule "numbers are assigned in ascending order to the last number block of the page number of the last deleted page".

(3) If a number equal to or larger than a number which already exists in the paper document is assigned, a number block is added, and numbers beginning from 0 are assigned to the added number block in ascending order.

(4) If the page number of the last deleted page has n number blocks, the page number of the next page has n+1 number blocks, these pages have the same numbers in the first to nth number blocks, and the n+1th number block is 0, then the processing is slightly complex. In this case, the page numbers are determined in the following way.

(4-1) One is subtracted from the number of the nth number block of the page number of the last deleted page. The resultant number is set to the nth number block.

(4-2) A number block is added to the page number of the last page to increase the number of number blocks to n+1, and numbers beginning from 0 are assigned to the added number block in ascending order.

In an example C-1 shown in FIG. 20C, pages "2" and "2-0" of the paper document are deleted, and four pages are added to the same position. In this case, "2" and 2-0" are assigned in accordance with the procedure (1). Then, a number is assigned to the last number block (second number block in this example) in ascending order in accordance with the procedure (2). That is, the page numbers of the two remaining pages are "2-1" and "2-2".

In an example C-2 shown in FIG. 20C, pages "2" and "2-0" of the paper document are deleted, and four pages are added to the same position. The page following the deleted pages has a page number "2-1". In accordance with the procedure (1), "2" and "2-0" are assigned to the first two pages. After assigning the same page numbers as the deleted pages, the remaining pages are assigned page numbers "2-1" and "2-2" in accordance with the procedure (2). However, since "2-1" already exists in the paper document, a number block is added, and "2-0-0" and "2-0-1" are assigned as page numbers.

In an example C-3 shown in FIG. 20C, pages "2" and "3" of the paper document are deleted, and four pages are added to the same position. The page following the deleted pages has a page number "3-0". In accordance with the procedure (1), "2" and "3" are assigned to two of the added pages. That is, the same page numbers as the deleted pages are assigned. Then, the remaining pages are assigned numbers "3-0" and "3-1" in accordance with the procedures (2) and (3). Since "3-0" already exists in the paper document, "3-0-1" and "3-0-1" should be assigned in accordance with the procedure (3). However, assigning "3-0-0" and "3-0-1" to the pages before "3-0" violates the rule shown in FIG. 16D. This problem occurs when the page number of the last deleted page has n number blocks, the page number of the next page has n+1 number blocks, these pages have the same numbers in the first to nth number blocks, and the n+1th number block is 0. Hence, the procedure (4) is employed to assign "2-0", "2-1", and "2-2" after "2".

The above-described page number assignment processing can prevent page number repeat upon replacement and assign page numbers that allows the operator who executes replacement to easily recognize the replacement position.

<Processing of Print System>

Print processing of this embodiment using the above-described print system and various kinds of image processing techniques will be described.

In using the print system of this embodiment, the operator registers and updates document data in the image database. To keep an output paper document in a latest state, replacement with the latest print out is executed. A print out operation upon initial document creation and an operation of printing out a revised and completed document also exist. Each of the above-described operations will be described below in detail.

Operations on the image database 104 will be described. There are two operations in association with the image database 104: an initial data registration operation and an update operation during revision.

<Description of Initial Data Registration Operation>

Figure 21A:
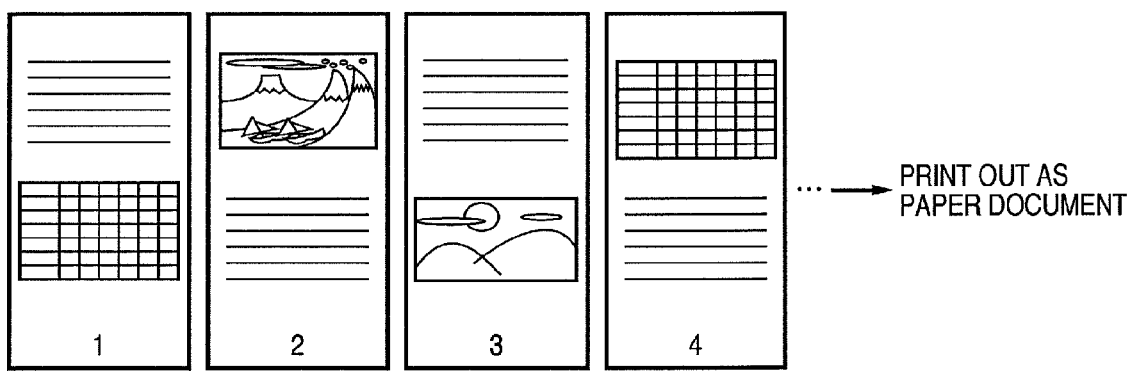
FIGS. 21A to 21C are views showing the outline of block information registration upon the first document creation according to the embodiment.
Figure 21B:
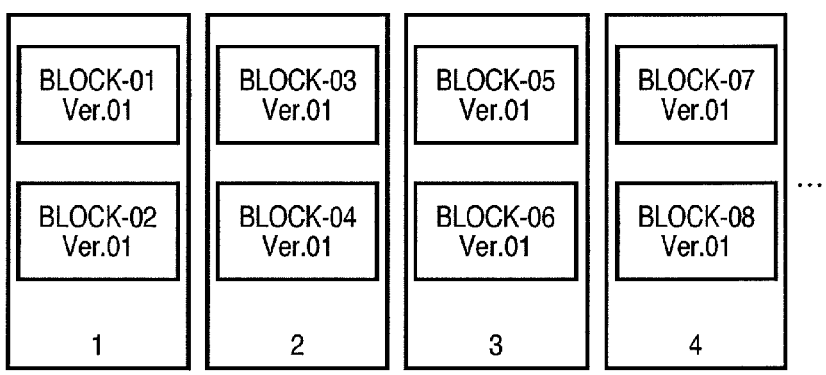
Figure 21C:
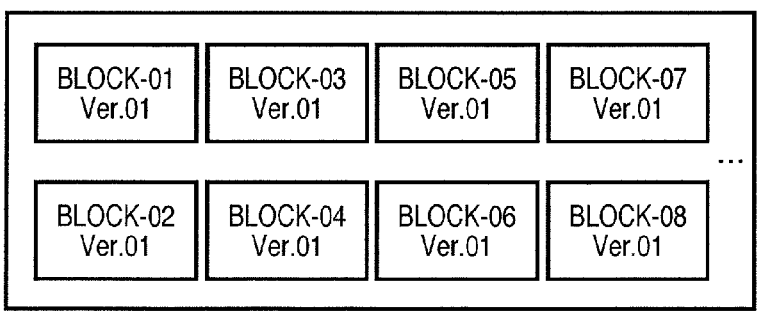

The operation performed by the operator first includes creating a document and registering the created document in the image database 104. In this operation, the operator executes block selection processing for a document created by an application on the PC 107, as shown in FIG. 21A. The operator segments the document into blocks and executes block information extraction processing for each block, as shown in FIG. 21B. The operator stores the image data and block information of each block in the image database 104 and image management server 105 respectively, as shown in FIG. 21C.

Figure 22:
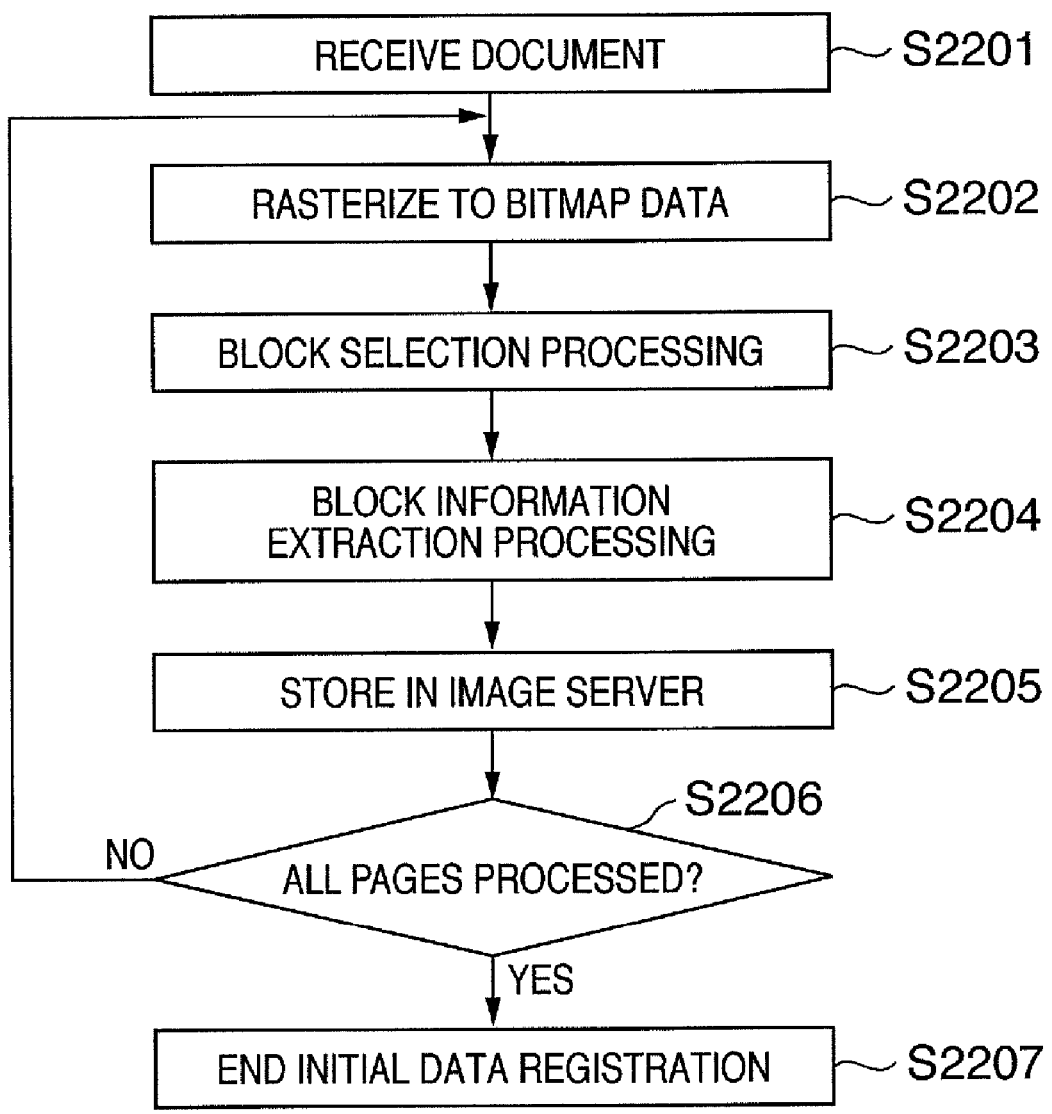
FIG. 22 is a flowchart showing the procedure of block information registration upon the first document creation according to the embodiment.

The initial data registration operation will be described with reference to the flowchart in FIG. 22. The MFP 100 (data processing device 205) executes initial data registration (to be described below) in the image management server 105. The management PC 101 or PC 107 may execute the registration.

The PC 107 creates a document. In this embodiment, the version of the document created here is "Ver1.0". In step S2201, the MFP 100 receives the document via the network 103. Upon receiving the document, the MFP 100 rasterizes each page of the document into bitmap data in step S2202 to execute block selection processing of segmenting the contents of the document into blocks. More specifically, the MFP 100 causes the data processing device 205 to rasterize each page of the document data received via the network 103 into bitmap data. The data processing device 205 stores the obtained bitmap data in the storage device 201 of the MFP 100.

In step S2203, the data processing device 205 executes block selection processing for the bitmap data in the storage device 201 to segment it into blocks such as a text region, table region, and image region. In step S2204, the data processing device 205 executes block information extraction processing for each region to extract block information as data for pattern matching of each region. In step S2205, the data processing device 205 transfers the image data and extracted block information of each block to the image database 104 and image management server 105 via the network 103. In this embodiment, image data is stored in the image database 104. Block information is stored and managed in the image management server 105.

When the above-described processes in steps S2202 to S2205 end for all pages of the document, the process advances from step S2206 to step S2207 to end the initial data registration operation. If a page still remains unprocessed, the process returns from step S2206 to step S2202 so that the data processing device 205 repeats the above-described processing.

As the version of each block in the initial data registration operation, a number easily recognizable by the operator is uniformly assigned to all blocks. In this embodiment, "Ver01" is automatically uniformly assigned to all blocks.

<Description of Image Database Update Operation>

Figure 23A:
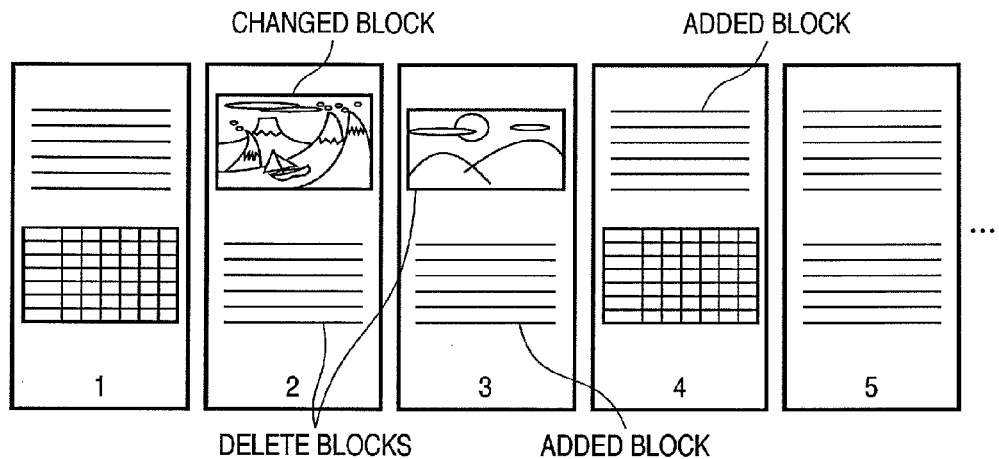
FIGS. 23A to 23C are views showing the outline of block information updating upon document revision according to the embodiment.
Figure 23B:
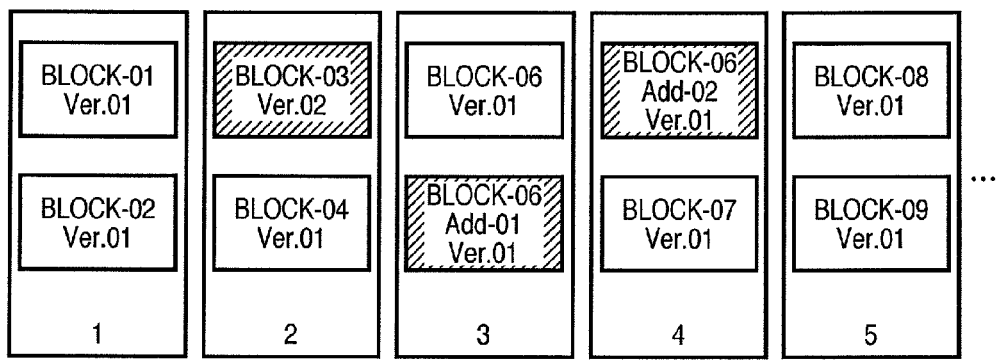
Figure 23C:
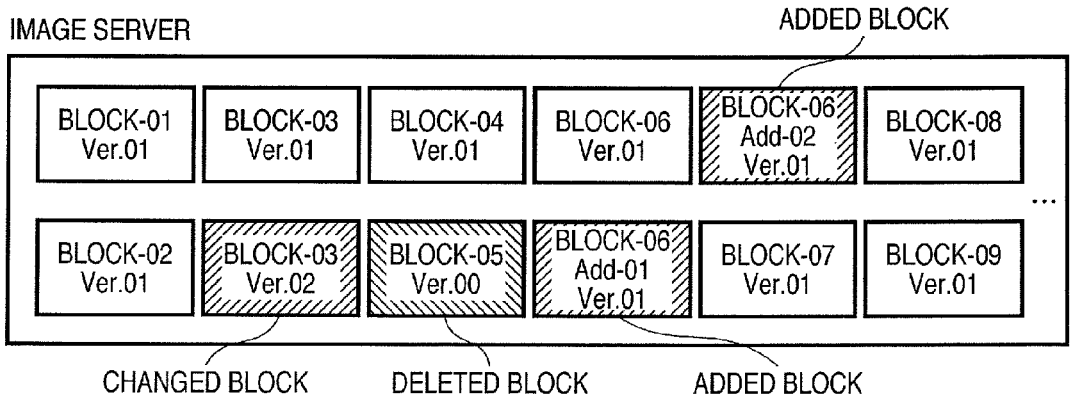

The operation performed by the operator next includes revising the document and updating the image database 104 on the basis of the revised document data. For example, the operator executes block selection processing for a document revised by an application on the PC 107 and updated from Ver1.0 to Ver1.1, as shown in FIG. 23A. FIG. 23B shows the result of block selection processing of the document in FIG. 23A. If a block is divided or revised, or a block is deleted or added, the block information is changed. The operator stores the image data and block information of each block that has been, e.g., revised in the image database 104 and image management server 105, as shown in FIG. 23C.

Figure 24:
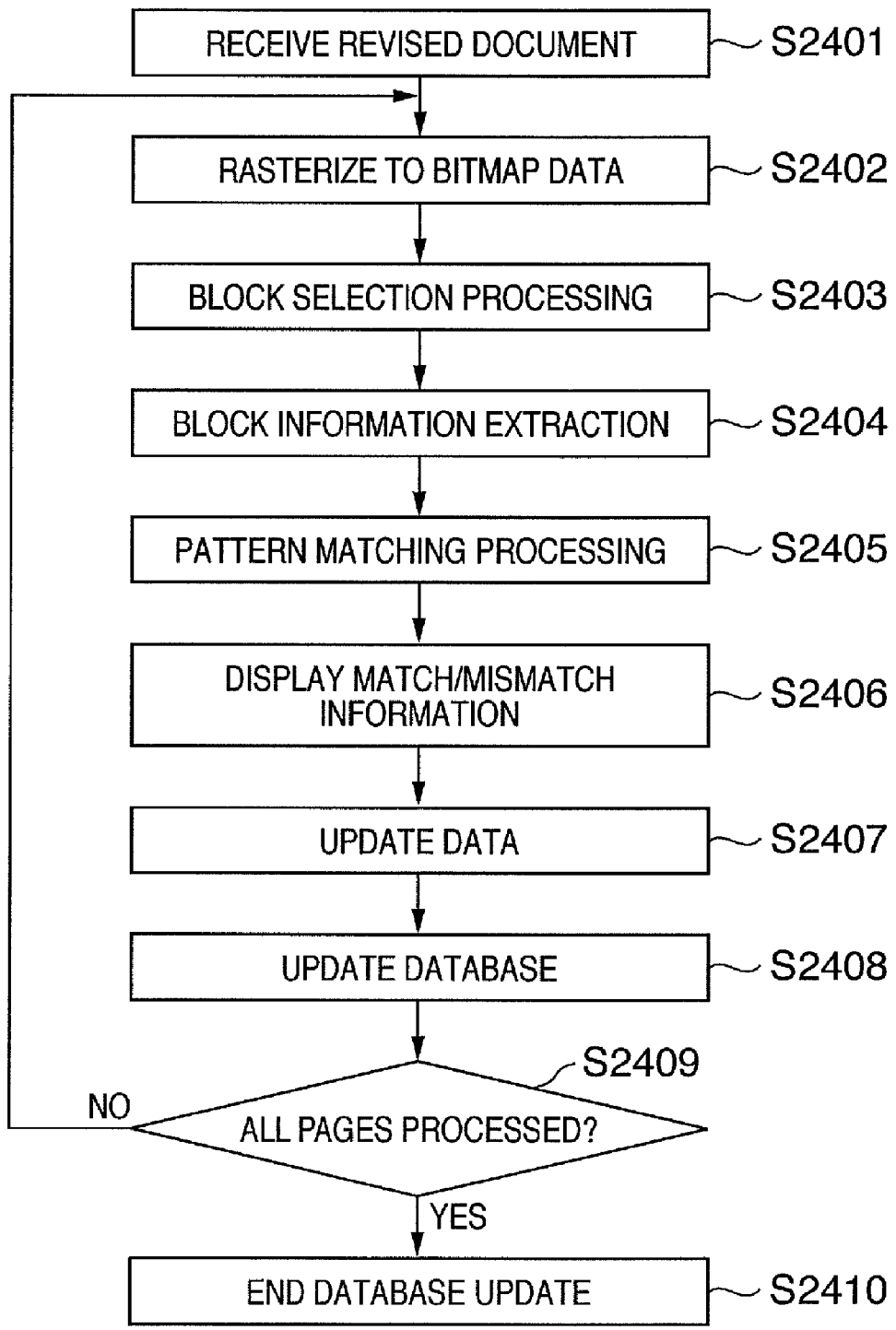
FIG. 24 is a flowchart showing the procedure of block information updating upon document revision according to the embodiment.

FIG. 24 is a flowchart showing detailed processing of the above-described image database update operation. The PC 107 revises the document. In this embodiment, the version of the revised document is "Ver1.1". The PC 107 transmits the revised document to the MFP 100 via the network 103.

In step S2401, the MFP 100 receives the document via the network 103. Upon receiving the document, the MFP 100 rasterizes each page of the document into bitmap data in step S2402 to execute block selection processing of segmenting the contents of the document into blocks. More specifically, the MFP 100 causes the data processing device 205 to rasterize each page of the document data received via the network 103 into bitmap data. The data processing device 205 stores the obtained bitmap data in the storage device 201 of the MFP 100.

In step S2403, the data processing device 205 executes block selection processing for the bitmap data in the storage device 201 to segment it into blocks such as a text region, table region, and image region. In step S2404, the data processing device 205 executes block information extraction processing for each region to extract block information as data for pattern matching of each region.

In step S2405, the data processing device 205 executes pattern matching described with reference to FIGS. 10 to 12 between each block and the data of blocks stored in the image database 104. In step S2406, the data processing device 205 displays the pattern matching result on the display device 206 of the MFP 100. That is, match/mismatch information of each block is displayed. In step S2407, the data processing device 205 updates the data of each revised block by using the input device 203 of the MFP 100 on the basis of the pattern matching result displayed on the display device 206. In step S2408, the data processing device 205 updates the data in the image database 104.

When the above-described processes in steps S2402 to S2408 end for all blocks of one page, the data processing device 205 determines in step S2409 whether the processing ends for all pages of the received document. If the processing ends for all pages of the document, the process advances to step S2410 to end the update operation of the image database 104. If a page still remains unprocessed, the data processing device 205 repeats the same processing (steps S2402 to S2408) for the data of the next page of the document.

The version of each block in the image database update operation is determined in the following way. If the content of a block is revised, the version number of the block is incremented, though the block number does not change, as shown in FIG. 23C. If a new block is added after a block, the new block is given, after the block number, a block name "Add-01" or "Add-02" representing an added block and assigned a new version number. The version number of a deleted block is set to "00", thereby updating image data management data in the image management server 105.

The display processing (step S2406) of match/mismatch information of the pattern matching result by the display device 206 of the MFP 100 in the above flowchart will be described in detail. The processing (step S2407) of updating the data of each revised block by using the input device 203 of the MFP 100 on the basis of the pattern matching result displayed on the display device 206 will also be described in detail.

Figure 25:
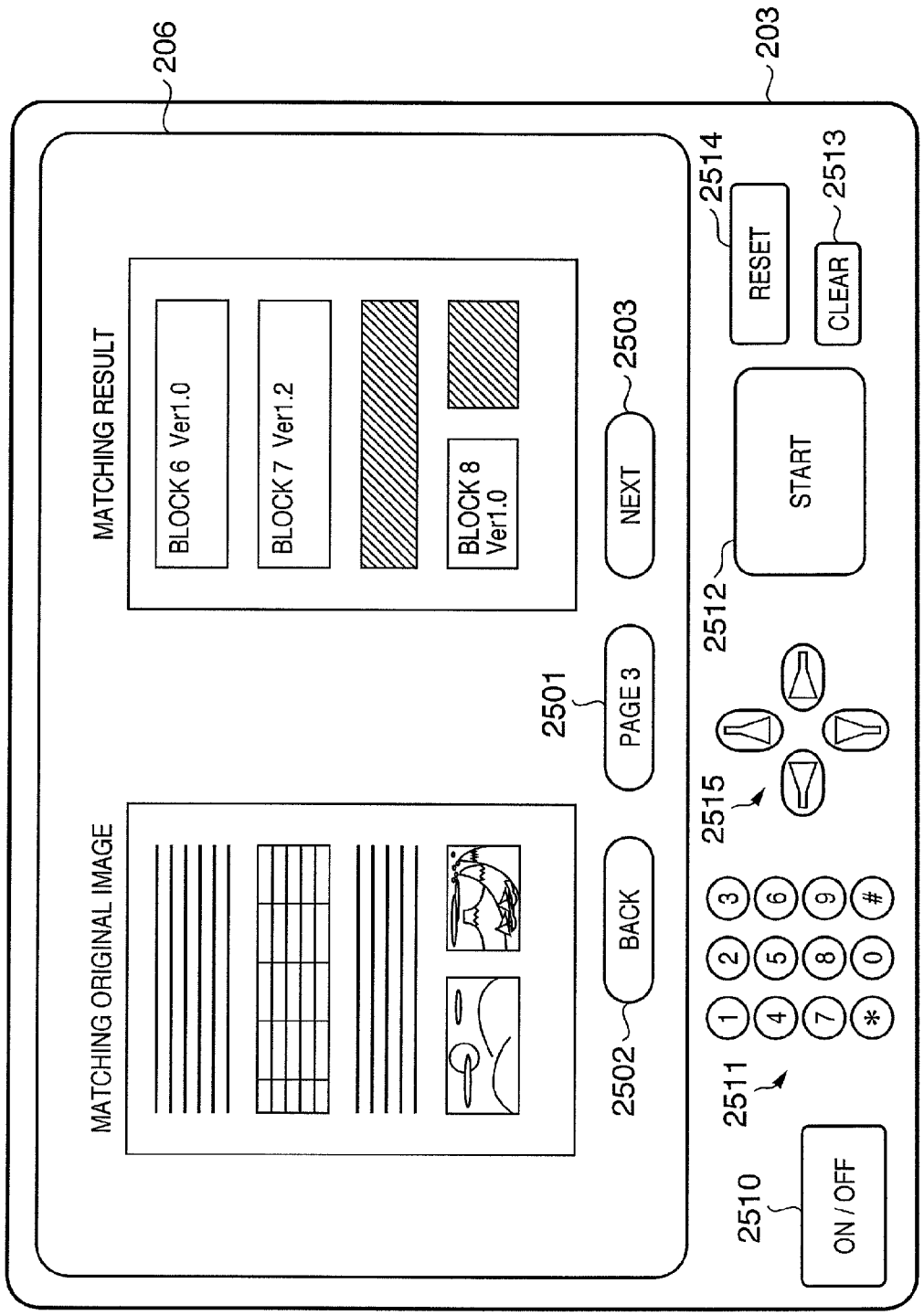
FIG. 25 is a view showing an operation unit that displays pattern matching upon document revision according to the embodiment.

FIG. 25 is a view showing an example of display of match/mismatch information of the pattern matching result by the display device 206 of the MFP 100. In this embodiment, the display device 206 and input device 203 are arranged together as the operation unit of the MFP 100. The display device 206 uses a liquid crystal screen. In pattern matching result display, the display device 206 displays image data used for pattern matching on the left side and the pattern matching result on the right side. A page number indicator 2501 to indicate the currently displayed page and buttons 2502 and 2503 to switch display to the preceding page or next page are also displayed.

The operation unit formed from the input device 203 includes a power ON/OFF button 2510, a ten-key pad 2511 to input, e.g., a number, and an operation start button 2512. The operation unit also includes buttons 2513 and 2514 to clear or reset settings and cursor keys 2515 to select an input point. Instead of arranging the buttons described above, the display device 206 may have a touch panel type liquid crystal screen so that the user can input various settings and values by pressing the screen.

Figure 27:
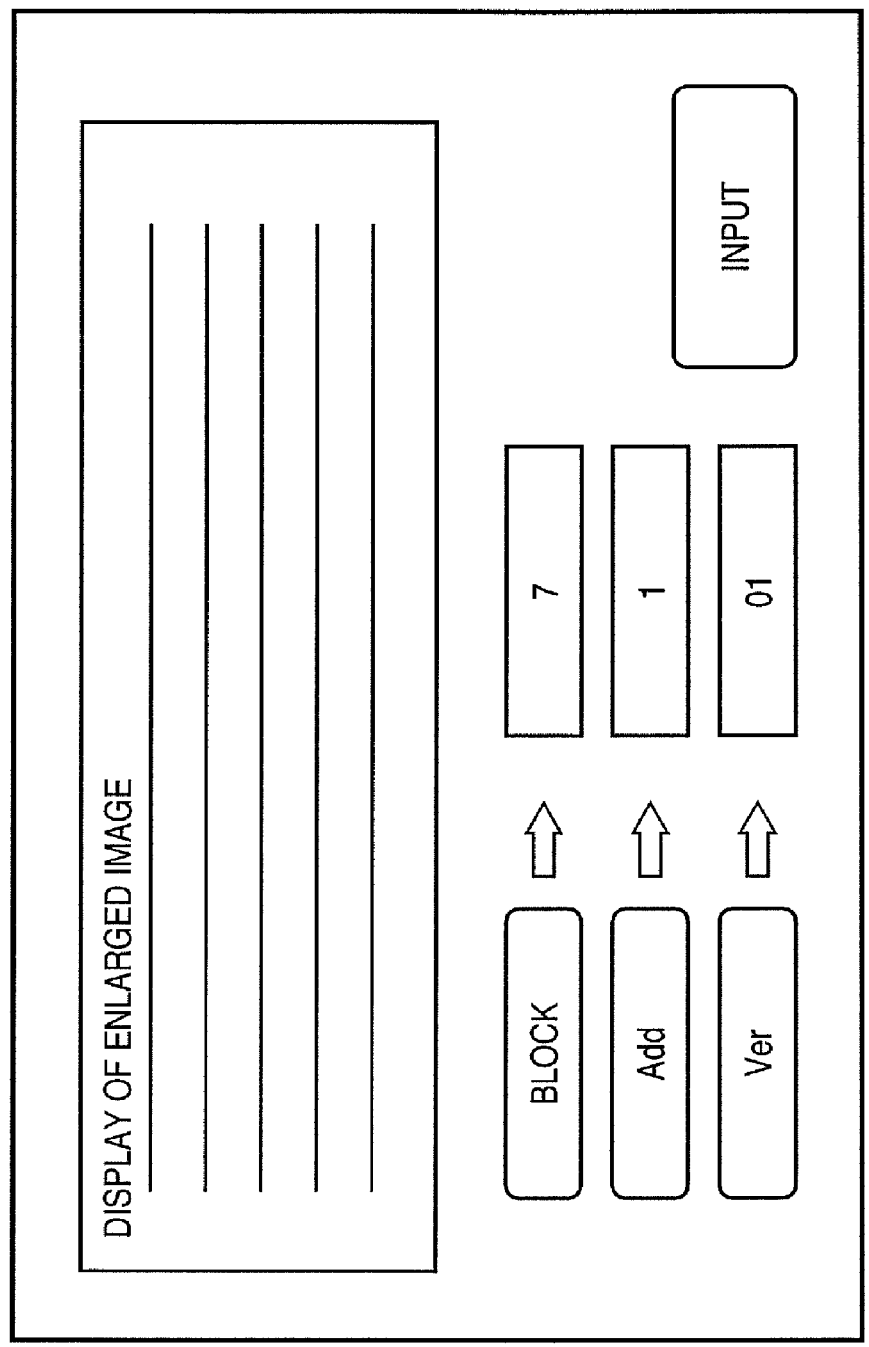
FIG. 27 is a view showing display in inputting updated data upon document revision according to the embodiment.
Figure 28:
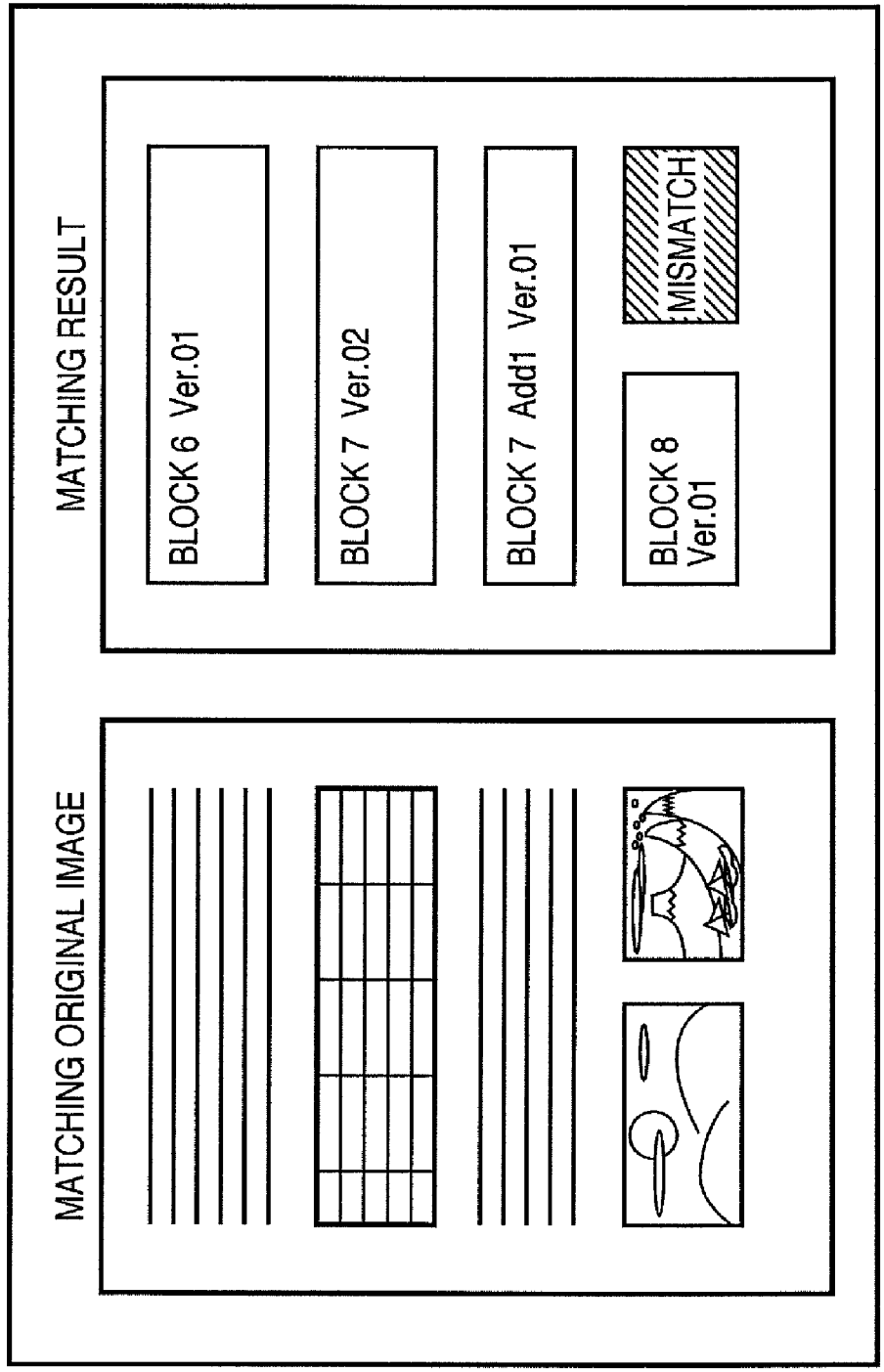
FIG. 28 is a view showing display in inputting updated data upon document revision according to the embodiment.

A detailed method of causing the display device 206 to display a pattern matching result and revising the contents of the image database will be described next with reference to FIGS. 26 to 28.

Figure 26:
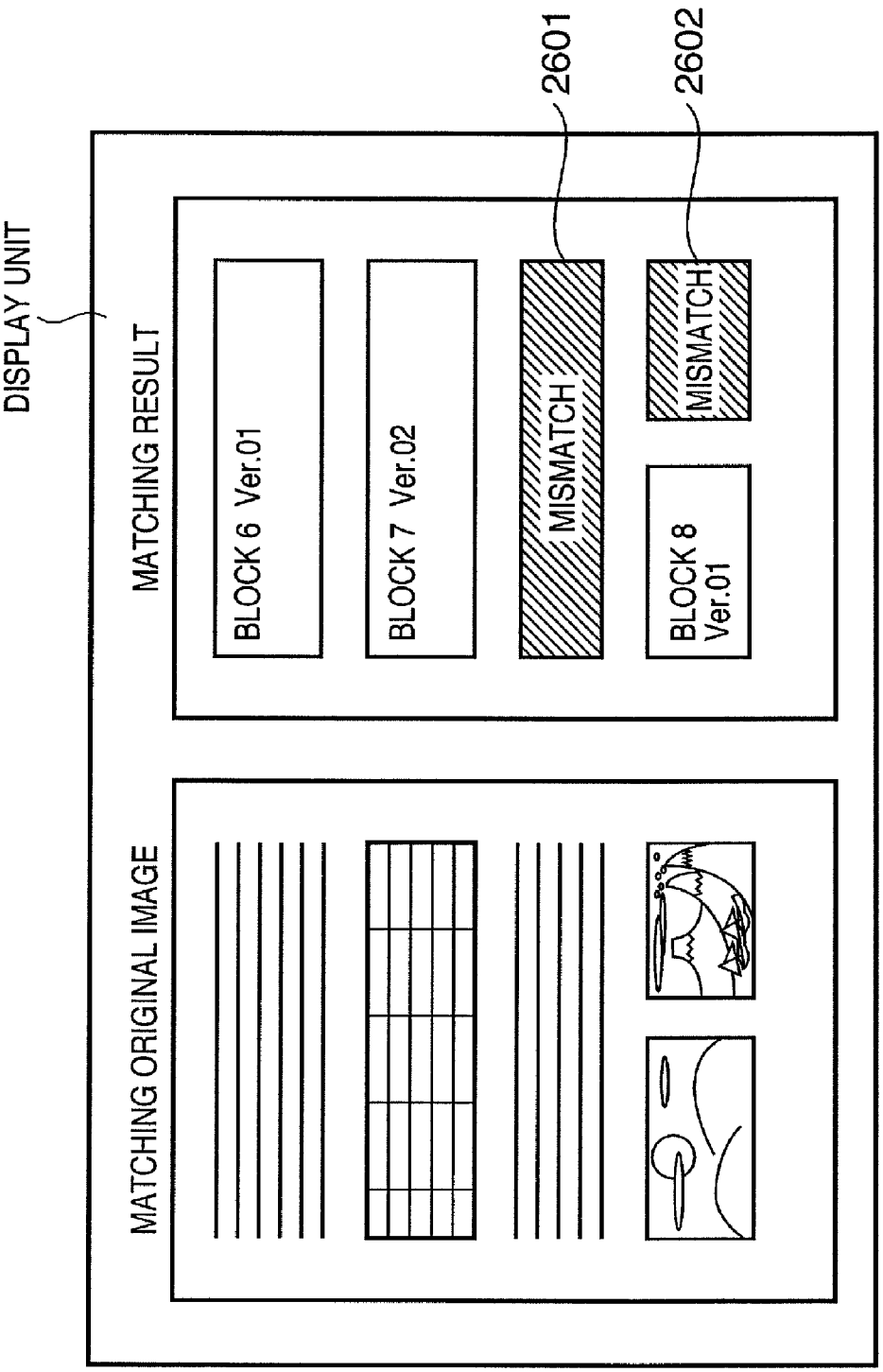
FIG. 26 is a view showing display in inputting updated data upon document revision according to the embodiment.

FIG. 26 is a view showing a result of pattern matching between electronic data obtained by causing the PC 107 to revise document contents and image data stored in the image database. In the example shown in FIG. 26, the pattern matching result indicates that the image database stores no data matching a block 2601 of the third column and a right block 2602 of the lowermost column.

In association with the two blocks, information representing that they are blocks having revised contents or added blocks is input. First, a mismatched block is selected by using the operation unit. For example, the block 2601 of the third column is selected. As shown in FIG. 27, an enlarged image of the selected block and an input window to revise its block information are displayed. In the selecting operation, the touch panel detects user's finger touch on the mismatched block 2601. Referring to FIG. 27, the user inputs new information such as the block number of the displayed block, an "Add" number if the block is an added block, and a version number. The user selects a field by touching it and inputs a number by using the ten-key pad 2511 of the input device 203. In this embodiment, the mismatched block 2601 is Block Add1 Ver.01 added next to block 7. With this input, the new block information of the third column, which indicates a mismatch in FIG. 26, is reflected so that the display device 206 displays data shown in FIG. 28. In accordance with the same procedures as described above, the information of each mismatched block in each page is corrected.

When information about block revision and addition is corrected in all pages, the image database is updated in association with each deleted block. Each block that is contained in the image database but not contained in the original image for matching is determined as a deleted block. This determination is automatically executed. In the example shown in FIG. 23C, the data of Block-05 is recognized to be absent in the revised electronic data. The version number of Block-05 is set to "00".

When information about revision, addition, and deletion is corrected in all pages, the information in the image database is updated, and the operation ends.

Operations associated with a paper document will be described next. There are three operations for a paper document: initial print out operation, replacing operation upon update, and final print out operation upon completing a document.

<Description of "Initial Print Out Operation">

When a document is created for the first time, the document data is printed as the base of paper documents in the future. In this embodiment, the first version is created as Ver1.0, as described with reference to FIGS. 21A to 21C. The MFP 100 prints out the document data. This print out is used as a fundamental paper document for the replacing operation later.

<Description of "Replacing Operation Upon Update">

Figure 29:
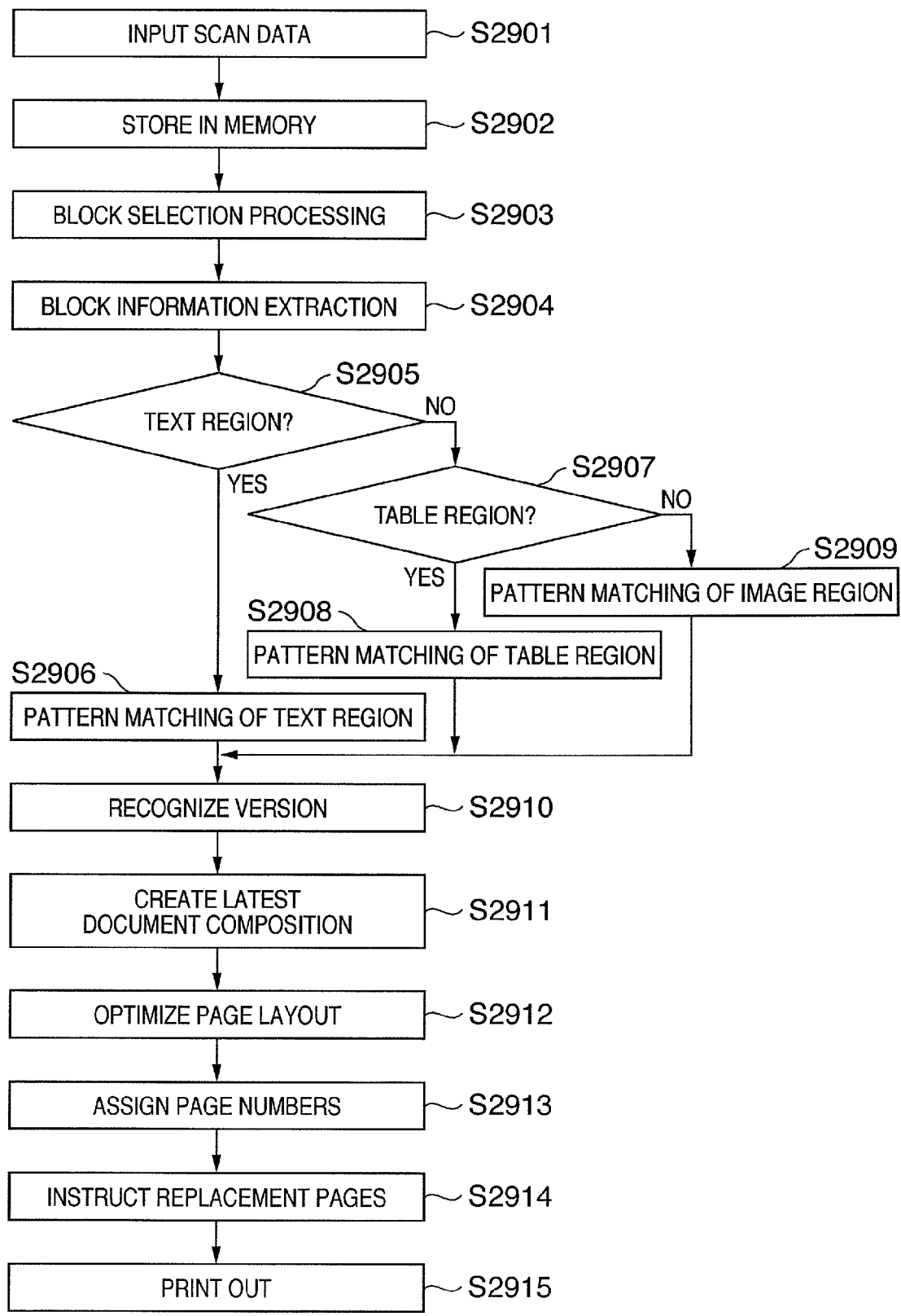
FIG. 29 is a flowchart for explaining processing upon document replacement according to the embodiment.

Detailed processing of the replacing operation upon updating the paper document will be described with reference to the flowchart in FIG. 29. The data processing device 205 of the MFP 100 executes a predetermined control program to implement the processing shown in FIG. 29.

In steps S2901 to S2904, each page of document data of the first version is subjected to block segmentation processing to acquire block information of each page. First, in step S2901, the image reader 200 of the MFP 100 scans a paper document (of the first version) and inputs the contents of the paper document as electronic data. In step S2902, the storage device 201 of the MFP 100 stores the electronic data. In this embodiment, the version of the scanned document is "Ver1.0". In step S2903, the data processing device 205 executes block selection processing for the image data stored in the storage device 201 in step S2902 to segment it into blocks such as a text region, table region, and image region. In step S2904, the data processing device 205 executes block information extraction processing as shown in FIG. 5 for each region.

In steps S2905 to S2909, pattern matching is executed between each block and the data of blocks stored in the image database. In this embodiment, information to be subjected to pattern matching changes depending on a block attribute. If a block attribute is determined as a text region, the process advances from step S2905 to step S2906 to execute pattern matching processing for a text region. If a block attribute is determined as a table region, the process advances to step S2908 through steps S2905 and S2907 to execute pattern matching processing for a table region. If a block attribute is determined as an image region, the process advances to step S2909 through steps S2905 and S2907 to execute pattern matching processing for an image region. In this way, block information obtained by block segmentation processing for each page of the document data of the second version (latest version in this example) and the block information of the first version acquired in step S2904 are obtained. Matched and mismatched blocks between the two versions are discriminated.

The above-described process from paper document scan to pattern matching of each block in steps S2901 to S2909 is executed for all blocks in all pages of the paper document. Then, the process advances to step S2910.

In step S2910, the data processing device 205 recognizes, on the basis of the pattern matching result, the number and version of each block contained in the scanned paper document and recognizes revised, added, and deleted blocks. In step S2911, the data processing device 205 creates the latest document composition. Since the pages contain different blocks in the document composition, it is impossible to efficiently replace the paper document. In step S2912, the data processing device 205 executes page layout processing described with reference to FIGS. 15A to 15D to revise the layout so as to utilize output paper document as much as possible. More specifically, the data processing device 205 extracts blocks in the document data of the first version, that are discriminated as matched blocks and exist in pages containing a block discriminated as a mismatched block, and blocks that are discriminated as mismatched blocks in the document data of the second version. The data processing device 205 generates pages by laying out the extracted blocks while maintaining the block sequence in the entire document data of the second version. The layout is determined to minimize the number of generated pages. In step S2913, the data processing device 205 assigns page numbers to the pages, which should be printed out and inserted in the paper document, in accordance with the above-described procedures without repeating the page numbers. The page number of each page in the original document is acquired by executing OCR processing of the scan data input in step S2901.

In step S2914, the data processing device 205 causes the display device 206 to display, on the screen, an instruction to notify the operator of paper document pages to be removed, and print outs to be inserted in the paper document and their insert positions. In step S2915, new pages to be inserted in the paper document are printed out.

Version recognition (step S2910) in the flowchart of FIG. 29 will be described in detail with reference to FIGS. 30A and 30B.

Assume that the paper document has the contents described above with reference to FIGS. 21A to 21C and is printed out as Ver1.0. When the paper document is scanned and subjected to pattern matching, block numbers and version numbers as shown in FIG. 30A are obtained. The document data is revised from Ver1.0 to the version shown in FIGS. 23A to 23C. The version of each block in the image database 104 changes to Ver1.1. FIG. 30B shows the contents. In this state, the data processing device 205 executes pattern matching with the blocks shown in FIG. 30A. Matching is done between all scanned data and the data in the image database 104.

In Block-05, however, the version of the data upon matching based on the block information changes to Ver.00 by revision of the document to Ver1.1. The data processing device 205 can recognize, by recognizing the version number, that Block-05 has been deleted upon revision to Ver1.1.

For Block-03, matching with Ver.01 in the image database is executed. For Block-03, Ver.02 is also present in the image database in addition to the Ver.01. Hence, the data processing device 205 can recognize that Block-03 has been updated upon revision to Ver1.1.

As is apparent from the paper document scan result, Block-06 Add-01 and Block-06 Add-02 are not contained in the paper document and have a version number other than Ver.00. Hence, the data processing device 205 can recognize that these blocks have been added upon revision to Ver1.1.

As described above, pattern matching between the data of the scanned paper document and the data in the image database and recognition of block numbers and version numbers enable to recognize blocks revised, added, and deleted upon revision of the document. In this way, the blocks used in the document of Ver1.1 and their latest versions are recognized on the basis of the version recognition result of each block. Page layout processing and page number assignment processing are executed on the basis of the recognition result, thereby creating document data for replacement.

Figure 31:
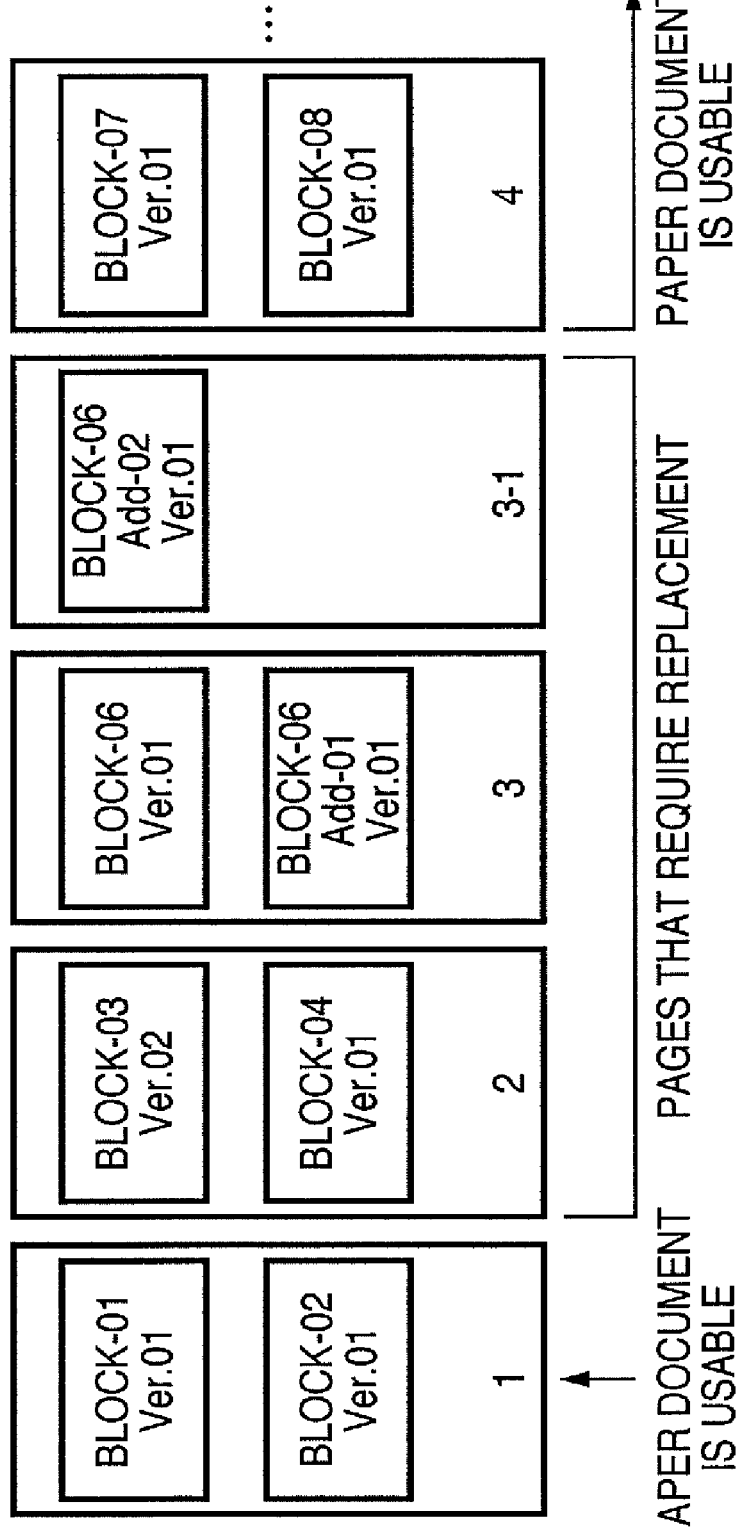
FIG. 31 is a view showing the outline of page layout processing upon document replacement according to the embodiment.

FIG. 31 is a view showing a result of page layout processing and page number assignment to most efficiently replace the paper document with the document of Ver1.1 described with reference to FIGS. 30A and 30B.

Figure 32:
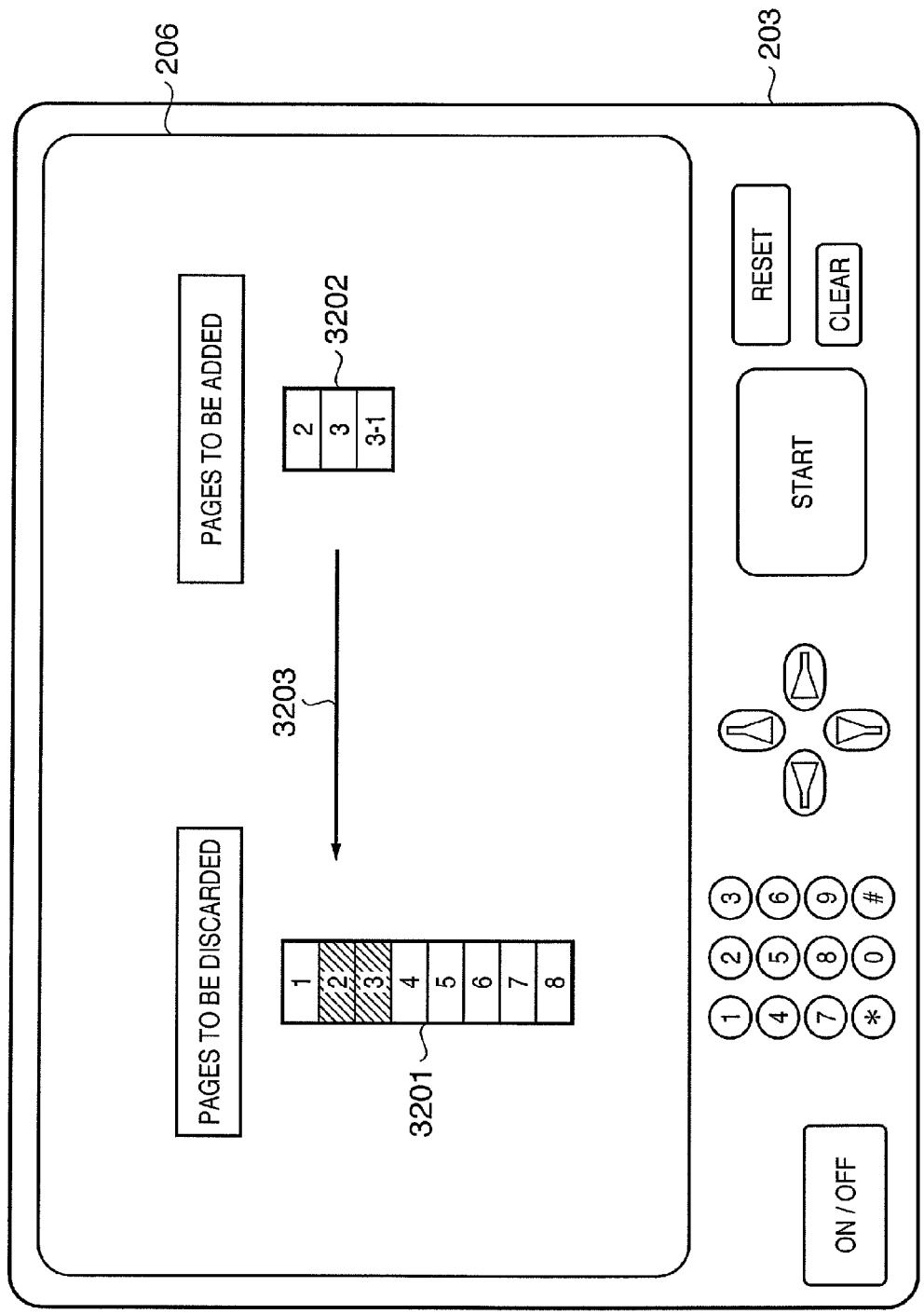
FIG. 32 is a view showing a page deletion/addition instructing method upon document replacement according to the embodiment.

Processing (step S2914) of causing the display device 206 of the MFP 100 to instruct replacement pages in the flowchart of FIG. 29 will be described next. The data processing device 205 explicitly displays, on the liquid crystal screen of the display device 206, the page numbers of pages to be discarded in a page composition 3201 of the document, as shown in FIG. 32. If pages to be added are present, the data processing device 205 also explicitly displays them as added pages 3202 and their insert position by an arrow 3203. The added pages 3202 have the page numbers of print outs. This display facilitates the replacing operation by the operator. As the pages to be discarded, pages extracted in step S1502 in FIG. 15D described above are displayed.

<Description of "Final Print Out Operation">

Final print out will be described next with reference to FIG. 33.

When update is continued by replacing the paper document in accordance with the above-described arrangement, a paper document without repetition of contents and page numbers in the document can be completed. However, the page numbers have additional number blocks, and large spaces may remain in the pages. Hence, when a completed document is to be printed but finally, it is necessary to print out the document data created by the PC 107 without considering replacement with the paper document.

Figure 33:
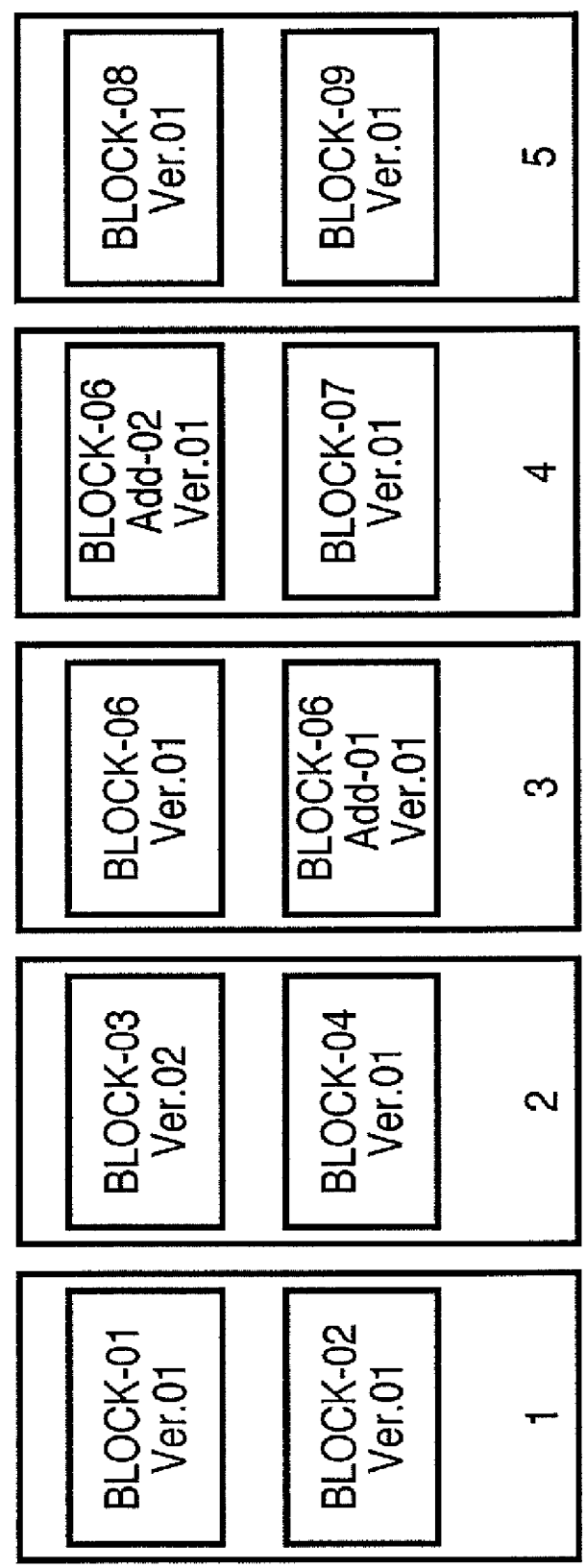
FIG. 33 is a view showing a final output result of the document according to the embodiment.

That is, the created document is printed out as usual, as shown in FIG. 33. The data processing device 205 lays out all blocks closely in the pages as the latest version, assigns page numbers by using only the first number block, and prints out all pages from the first page to the last page. In this way, the print out of the final result of the document is obtained.

Figure 34:
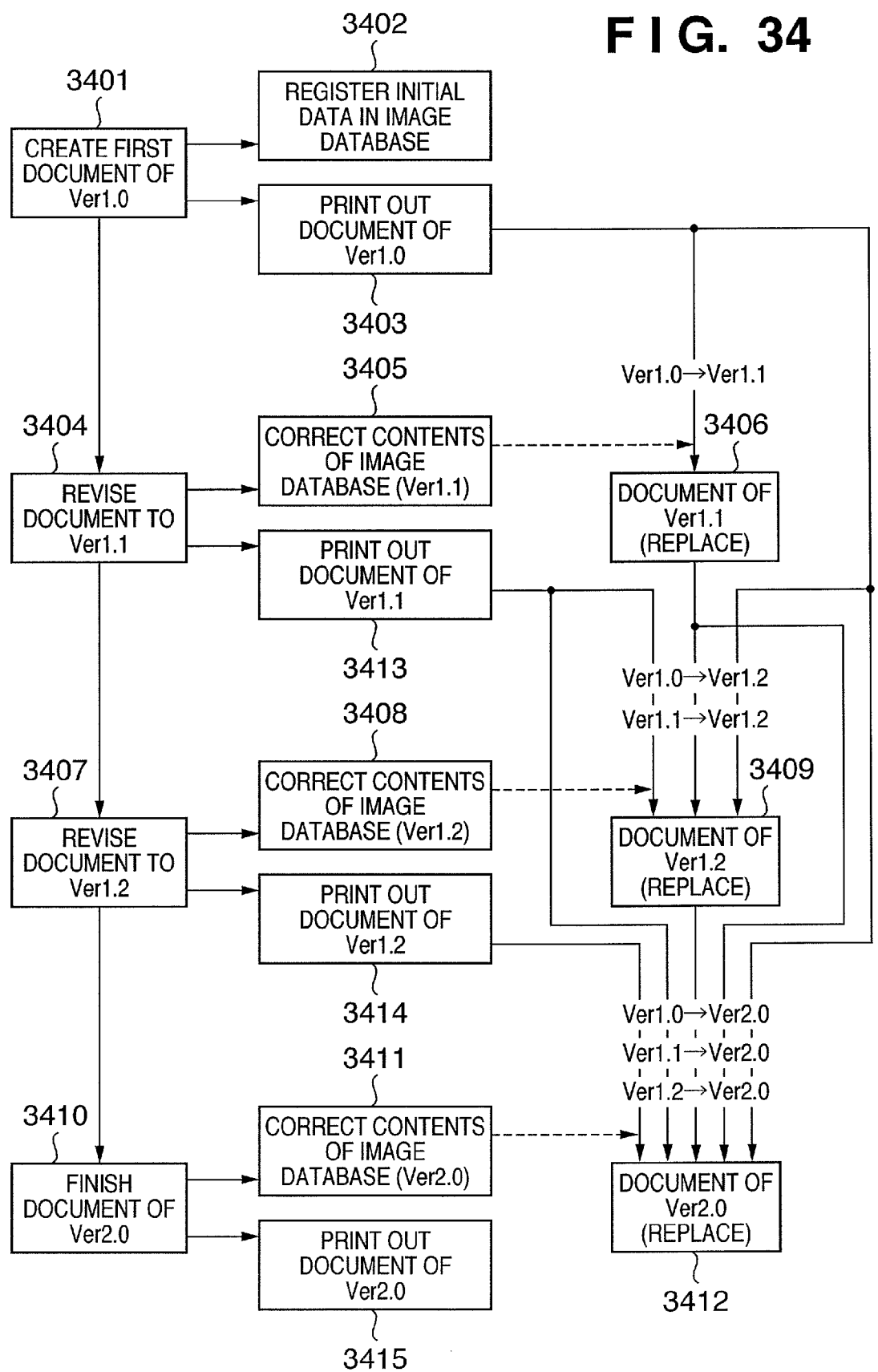
FIG. 34 is a flowchart collectively showing the outline of processing according to the embodiment.

The above-described contents will be described with reference to FIG. 34.

First, the operator creates the first document (Ver1.0) (3401). At this time, the document is printed out (3403), and the initial data is registered in the image database (3402).

Assume that the PC 107 revises the contents of the document so that its version changes to Ver1.1 (3404). The operator corrects the contents of the image database in accordance with the composition of Ver1.1 (3405). Assume that PC 107 further revises the contents of the document so that its version changes to Ver1.2 (3407). The operator corrects the contents of the image database in accordance with the composition of Ver1.2 (3408). Assume that the PC 107 executes final revision of the document contents to create Ver2.0 as a final version (3410). The operator corrects the contents of the image database in accordance with the composition of Ver2.0 (3411).

A case will be examined in which Ver1.1 should replace the paper document (3403) of Ver1.0 printed out first. In this case, it is possible to obtain a replaced paper document (3406) corresponding to Ver1.1 by executing the above-described various kinds of processing operations on the basis of image data obtained by scanning the paper document of Ver1.0 and contents in the image database (3405) corresponding to Ver1.1.

A case will be examined in which Ver1.2 should replace the paper document (3403) of Ver1.0 printed out first. In this case, it is possible to obtain a replaced paper document (3409) corresponding to Ver1.2 by executing the above-described various kinds of processing operations on the basis of image data obtained by scanning the paper document of Ver1.0 and contents in the image database (3408) corresponding to Ver1.2.

A case will be examined in which Ver2.0 should replace the paper document (3403) of Ver1.0 printed out first. In this case, it is possible to obtain a replaced paper document (3412) corresponding to Ver2.0 by executing the above-described various kinds of processing operations on the basis of image data obtained by scanning the paper document of Ver1.0 and contents in the image database (3411) corresponding to Ver2.0.

A case will be examined in which Ver1.2 should replace the paper document (3406) of Ver1.1 obtained from the paper document of Ver1.0 by replacement. In this case, it is possible to obtain the replaced paper document (3409) corresponding to Ver1.2 on the basis of image data obtained by scanning the paper document (3406) of Ver1.1 and contents in the image database (3408) corresponding to Ver1.2.

A case will be examined in which Ver2.0 should replace the paper document (3406) of Ver1.1 obtained from the paper document of Ver1.0 by replacement. In this case, it is possible to obtain the replaced paper document (3412) corresponding to Ver2.0 on the basis of image data obtained by scanning the paper document (3406) of Ver1.1 and contents in the image database (3411) corresponding to Ver2.0.

A case will be examined in which Ver2.0 should replace the paper document (3409) of Ver1.2 which has replaced the paper document (3406) of Ver1.1 obtained from the paper document of Ver1.0 by replacement. In this case, it is possible to obtain the replaced paper document (3412) corresponding to Ver2.0 on the basis of image data obtained by scanning the paper document (3409) of Ver1.2 and contents in the image database (3411) corresponding to Ver2.0.

A case will be examined in which Ver1.2 should replace the printed paper document (3413) of Ver1.1. In this case, it is possible to obtain the replaced paper document (3409) corresponding to Ver1.2 on the basis of image data obtained by scanning the paper document (3413) of Ver1.1 and contents in the image database (3408) corresponding to Ver1.2.

A case will be examined in which Ver2.0 should replace the printed paper document (3413) of Ver1.1. In this case, it is possible to obtain the replaced paper document (3412) corresponding to Ver2.0 on the basis of image data obtained by scanning the paper document (3413) of Ver1.1 and contents in the image database (3411) corresponding to Ver2.0.

A case will be examined in which Ver2.0 should replace the printed paper document (3414) of Ver1.2. In this case, it is possible to obtain the replaced paper document (3412) corresponding to Ver2.0 on the basis of image data obtained by scanning the paper document (3414) of Ver1.2 and contents in the image database (3411) corresponding to Ver2.0.

As described above, match/mismatch of each block is recognized by pattern matching. The blocks are replaced with the latest image data, thereby replacing the paper document. For this reason, both a replaced paper document and a paper document obtained by printing out document data that is still being updated are usable as the original document for replacement. The operator can therefore execute replacement without particularly being aware of the version of the existing paper document.

In outputting a finally completed document, the completed document data (3410) is printed out as usual, thereby obtaining a print out (3415) of the document of the final version.

As described above, according to the first embodiment, the user can obtain a paper document corresponding to a new version by removing pages instructed on the display unit from the existing paper document and inserting newly printed pages in the paper document on the basis of their page numbers. The user can complete the paper document update operation by the simple operation and need not print out pages more than necessary, making a contribution to saving of cost and paper resources.

To print replacement pages for a paper document of an arbitrary version from a paper document of another arbitrary version, it is necessary to hold the block information of each version as shown in FIGS. 14A and 14B.

Second Embodiment

In the first embodiment, it is possible to replace a paper document of a latest version with an existing paper document without awareness of the version of the existing paper document by scanning the paper document, recognizing the contents, and updating the contents to the latest data at that point of time. In addition, management of document information such as blocks in the pages of each version is unnecessary. However, scanning all pages of a paper document and recognizing its contents are time-consuming. There is also a disadvantage because only replacement to a latest version is possible always.

The second embodiment allows the same replacing operation as in the first embodiment without paper document scan and content recognition by managing document information such as the page layout of each version and the versions of blocks in the pages. The second embodiment allows not only replacement to a paper document of a latest version but also replacement to a paper document of an intermediate version by managing the contents of all versions of a document.

The second embodiment is different from the first embodiment in the following three points.

(1) Upon creating each version of a document, an image management server 105 stores page layout information in addition to pattern matching information.

(2) In replacing a paper document, the user inputs the version of the existing paper document and the version to replace it.

(3) Page layout processing optimum for replacement is done on the basis of the page layout information of the two versions.

These three points will be described below in detail.

"(1) Upon creating each version of a document, the image management server 105 stores page layout information in addition to pattern matching information." will be described in detail with reference to FIG. 38.

The operator creates a first document (Ver1.0) by a PC 107 (3801). The initial data is registered in an image database (3802), and the page layout information of the document of Ver1.0 is registered in the image management server 105 (3803).

Assume that the PC 107 revises the contents of the document so that its version changes to Ver1.1 (3804). The operator corrects the contents of an image database 104 in accordance with the composition of Ver1.1 (3805) and registers the page layout information of the document of Ver1.1 in the image management server 105 (3806).

Assume that PC 107 further revises the contents of the document so that its version changes to Ver1.2 (3807). The operator corrects the contents of the image database 104 in accordance with the composition of Ver1.2 (3808) and registers the page layout information of the document of Ver1.2 in the image management server 105 (3809).

Assume that the PC 107 executes final revision of the document contents to create Ver2.0 (3810). The operator corrects the contents of the image database 104 in accordance with the composition of Ver2.0 (3811) and registers the page layout information of the document of Ver2.0 in the image management server 105 (3812).

Figure 38:
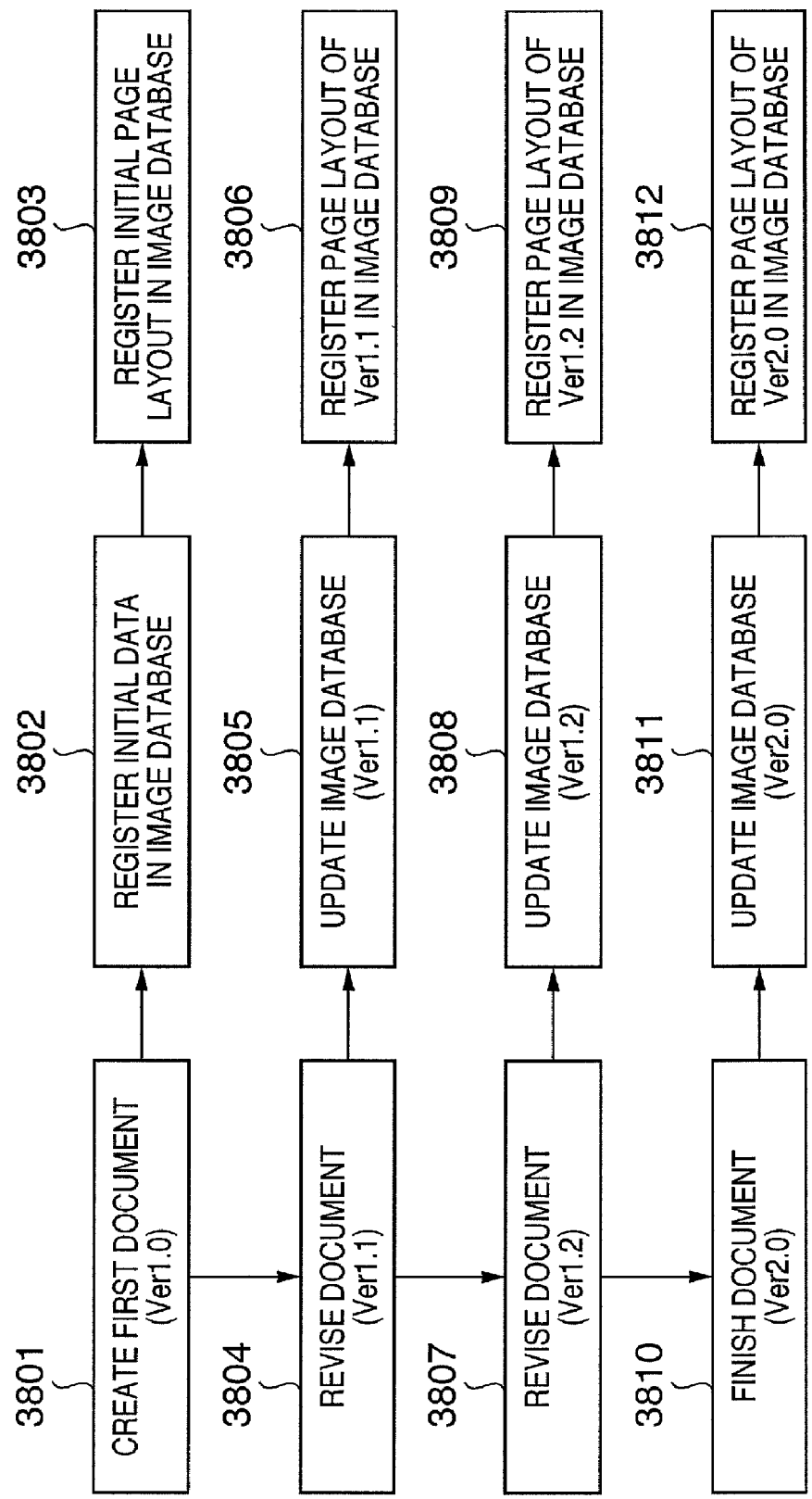
FIG. 38 is a flowchart showing the procedure of a registration operation in an image database according to the second embodiment.

FIGS. 40A to 40D show examples of layout information of the documents of the respective versions in FIG. 38. The page layout information shown in FIG. 40A contains the information of blocks contained in the pages of Ver1.0 and the versions of the blocks. Since this is initial data, the blocks are sequentially assigned numbers beginning from 01. All the blocks have a version Ver.01.

The page layout information shown in FIG. 40B contains the information of blocks contained in the pages of Ver1.1 and the versions of the blocks. The content of Block-03 changes from the state of Ver1.0, though the page composition does not change.

The page layout information shown in FIG. 40C contains the information of blocks contained in the pages of Ver1.2 and the versions of the blocks. A block is added between Block-06 and Block-07, as compared to the state of Ver1.1. The added block is "Block-06 Add-01 Ver.01". The page composition also changes.

The page layout information shown in FIG. 40D contains the information of blocks contained in the pages of Ver2.0 and the versions of the blocks. Block-05 is deleted from the state of Ver1.2. The page composition also changes.

Page replacement of the paper document is executed by additionally using the above-described page layout information in the first embodiment.

Figure 39:
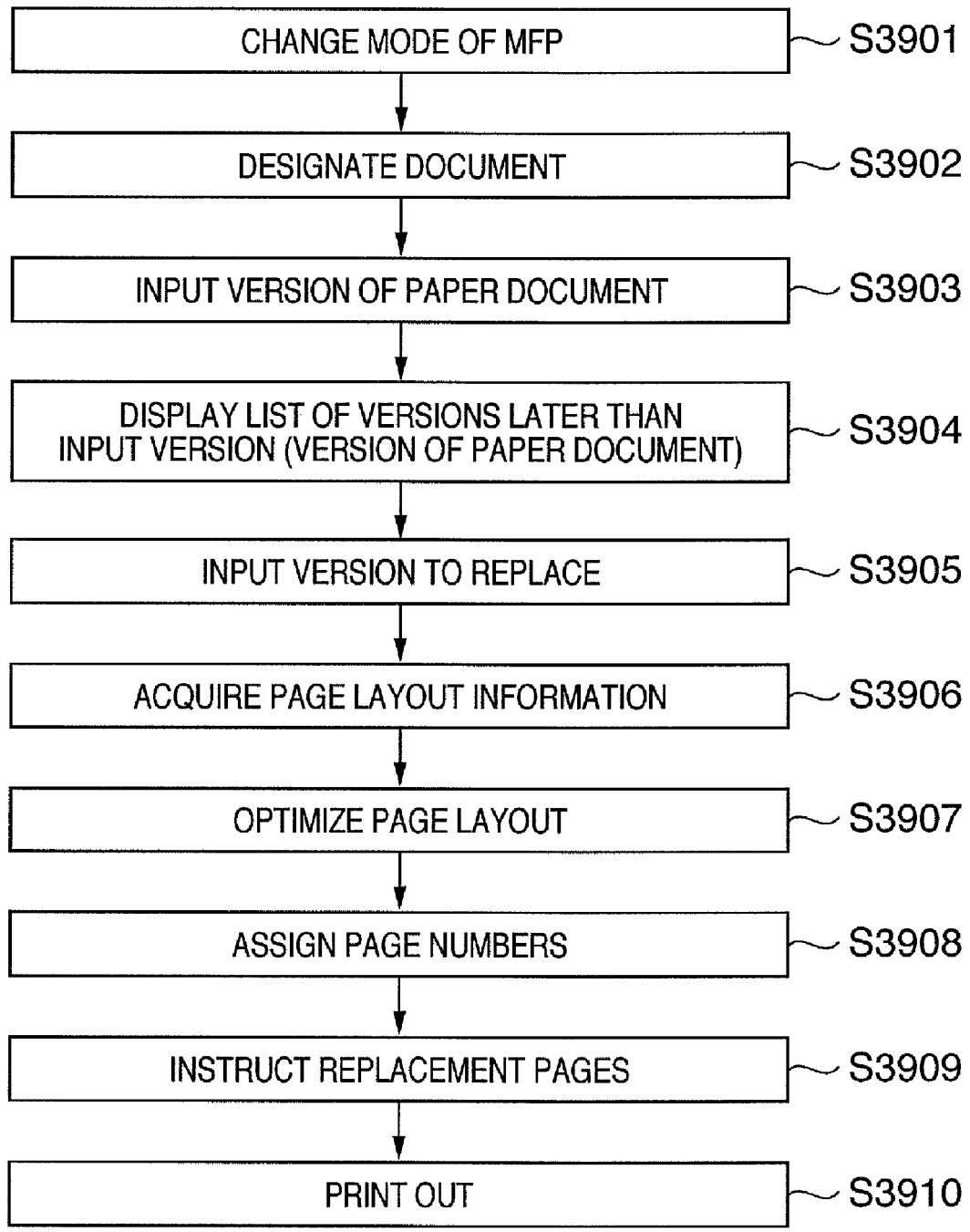
FIG. 39 is a flowchart for explaining document replacement processing according to the second embodiment.

Page replacement processing according to the second embodiment will be described next with reference to the flowchart in FIG. 39.

The user sets the operation mode to a paper document update operation mode from an input device 203 of an MFP 100. In response to this, a data processing device 205 changes the operation mode of the MFP 100 to the update operation mode in step S3901. The user designates, at the input device 203, a document file to be updated. The data processing device 205 receives it in step S3902. The user inputs the version of an existing paper document through the input device 203. The data processing device 205 receives it in step S3903. Upon receiving input of the version, the data processing device 205 displays, on a display device 206, a list of all document versions updated and registered after the input version in step S3904. The user can select a version to replace from the list. In step S3905, the data processing device 205 receives the version selected by the user from the list.

In step S3906, the data processing device 205 acquires, from the image management server 105, the page layout information of the version (the version of the existing paper document) received in step S3903 and that of the version (the version to output) received in step S3905. In step S3907, the data processing device 205 executes page layout optimization processing to optimize the layout for output. The processing described with reference to FIGS. 15A to 15D is applicable as the page layout processing.

If pages of the paper document are deleted, or pages to be printed out are added as a result of optimization, the data processing device 205 assigns page numbers in step S3908 without page number repetition or the like, as in the first embodiment. The data processing device 205 displays, on the display device 206, a replacement instruction for the user in step S3909. In step S3910, the data processing device 205 prints out the replacement pages.

The operator discards pages of the existing paper document and inserts printed output pages in accordance with the replacement instruction displayed on the display device 206, thereby obtaining a replaced document of a desired version, as in the first embodiment.

The page layout optimization processing (step S3907) in FIG. 39 will be described next in detail with reference to FIGS. 41A, 41B, 42A, 42B, 43A, 43B, 44A, and 44B.

FIGS. 41A and 41B are views for explaining page layout optimization upon replacement from Ver1.0 to Ver1.1 in FIGS. 40A and 40B. In change from Ver1.0 shown in FIG. 41A to Ver1.1 shown in FIG. 41B, the content of Block-03 changes, though the page composition does not change. Since only page 2 of the paper document changes, page 2 of the paper document is removed. Page 2 of the document data of Ver1.1 is printed out to replace the paper document.

FIGS. 42A and 42B are views for explaining page layout optimization upon replacement from Ver1.0 to Ver1.2 in FIGS. 40A and 40C. In change from Ver1.0 shown in FIG. 42A to Ver1.2 shown in FIG. 42B, the content of Block-03 changes, and a block is added between Block-06 and Block-07. The block addition generates a block layout difference in the pages between the two versions.

The page layout is optimized, as in the first embodiment, by generating a page containing only Block-06 Add-01 Ver.01 to make use of the paper document as much as possible. Page numbers are assigned while preventing page number repetition. The data processing device 205 prints out pages 2 and 3-1 of the document data of Ver1.2, as shown in FIG. 42B. The user replaces page 2 of the paper document with the printed pages 2 and 3-1.

FIGS. 43A and 43B are views for explaining page layout optimization upon replacement from Ver1.0 to Ver2.0 in FIGS. 40A and 40D. In change from Ver1.0 shown in FIG. 43A to Ver2.0 shown in FIG. 43B, the content of Block-03 changes, a block is added between Block-06 and Block-07, and Block-05 is deleted.

The block addition and deletion generate a block layout difference in the pages between the two versions. However, only pages 2 and 3 require replacement. The paper document is directly usable for the remaining pages. Layout optimization is not particularly necessary. The data processing device 205 prints out pages 2 and 3 of the document data of Ver2.0. The user replaces pages 2 and 3 of the paper document (Ver1.0) with the printed pages 2 and 3.

FIGS. 44A and 44B are views for explaining page layout optimization upon replacement from Ver1.1 to Ver2.0 in FIGS. 40B and 40D. In change from Ver1.1 shown in FIG. 44A to Ver2.0 shown in FIG. 44B, a block is added between Block-06 and Block-07, and Block-05 is deleted.

The block addition and deletion generate a block layout difference in the pages between the two versions. However, only page 3 requires replacement. The paper document is directly usable for the remaining pages. Layout optimization is not particularly necessary. The data processing device 205 prints out page 3 of the document data of Ver2.0. The user replaces page 3 of the paper document with the printed page 3.

As described above, the second embodiment allows the same replacing operation as in the first embodiment without paper document scan and content recognition. The second embodiment allows not only replacement to a paper document of a latest version but also replacement to a paper document of an intermediate version by managing the contents of all versions of a document.

In the second embodiment, page layout information of a revised version of a document is managed as data. For this reason, update by replacement from a paper document that is obtained by replacing an existing paper document is impossible, unlike the first embodiment.

Third Embodiment

In the second embodiment, in replacing a paper document, the user inputs, from the input device 203, the type and version of an existing paper document and a version to replace. However, since the system is capable of image processing such as block selection processing and OCR processing, document type designation and version recognition can be done by executing these processing operations.

In the third embodiment, existing paper document designation and version input, which are executed from the input device of the MFP 100 or PC 101 in the second embodiment, are executed on the basis of image data read by a scanner (image reader 200).

FIG. 45 is a flowchart for explaining processing upon page replacement according to the third embodiment. In the third embodiment, a document is assumed to have a title and version on its cover.

The user sets the operation mode to a paper document update operation mode from an input device 203 of an MFP 100. The MFP 100 (data processing device 205) receives it in step S4501. In step S4502, the data processing device 205 causes the image reader 200 to scan the cover to a document to be updated and stores the image data of the cover part in a storage device 201 of the MFP 100.

In step S4503, the data processing device 205 executes block selection processing for the image data stored in the storage device 201 in step S4502. In step S4504, the data processing device 205 executes OCR processing of a region that is recognized as a text part by block selection processing and recognizes the title and version of the document on the basis of the result of OCR processing. In step S4505, the data processing device 205 displays, on a display device 206, a list of all document versions updated and registered after the version recognized in step S4504.

The user can select a desired version to replace from the displayed list. When the user designates a version, the data processing device 205 receives it in step S4506. In step S4507, the data processing device 205 receives, from an image management server 105, the page layout information of the version of the existing paper document recognized in step S4504 and that of the version designated in step S4506 as an output target. In step S4508, the data processing device 205 executes page layout optimization processing on the basis of these pieces of page layout information to optimize the layout for output. If pages of the paper document are deleted, or pages to be printed out are added as a result of optimization, the data processing device 205 assigns page numbers in step S4509 without, e.g., page number repetition, as in the first embodiment. In step S4510, the data processing device 205 displays a replacement instruction on the display device 206. In step S4511, the data processing device 205 prints out the replacement pages.

The operator discards pages of the existing paper document and inserts printed output pages in accordance with the replacement instruction displayed on the display unit, thereby obtaining a replaced document of a desired version, as in the first embodiment.

Figure 46B:
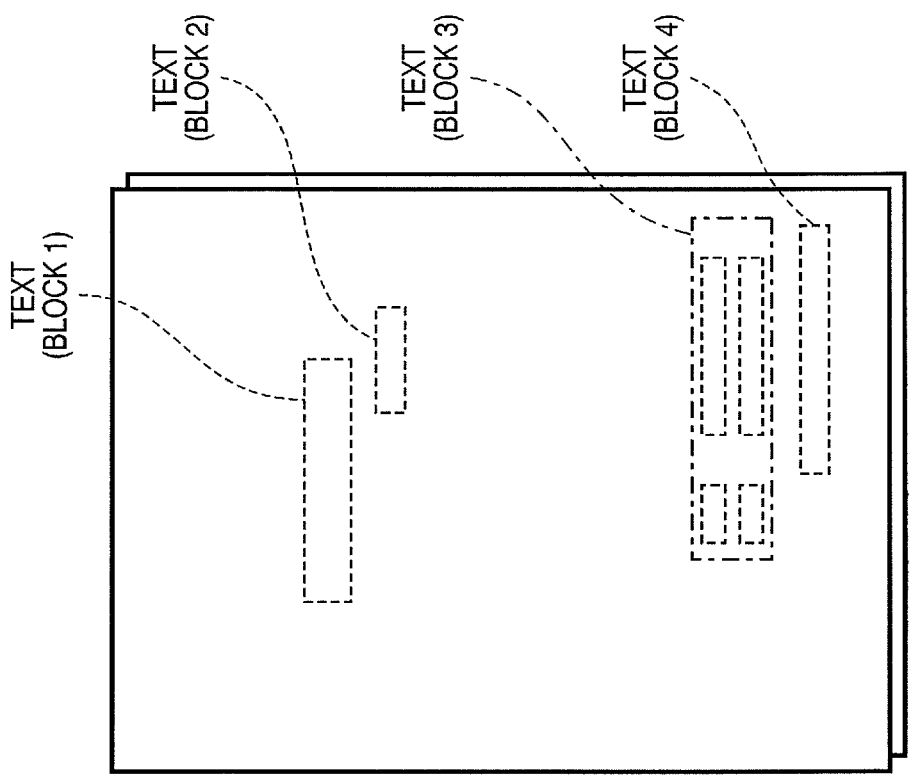
FIGS. 46A and 46B are views showing the outline of processing on recognition of the cover of a document according to the third embodiment.

Document and version recognition processing (step S4505) in FIG. 45 will be described next in detail with reference to FIGS. 46A and 46B.

Figure 46A:
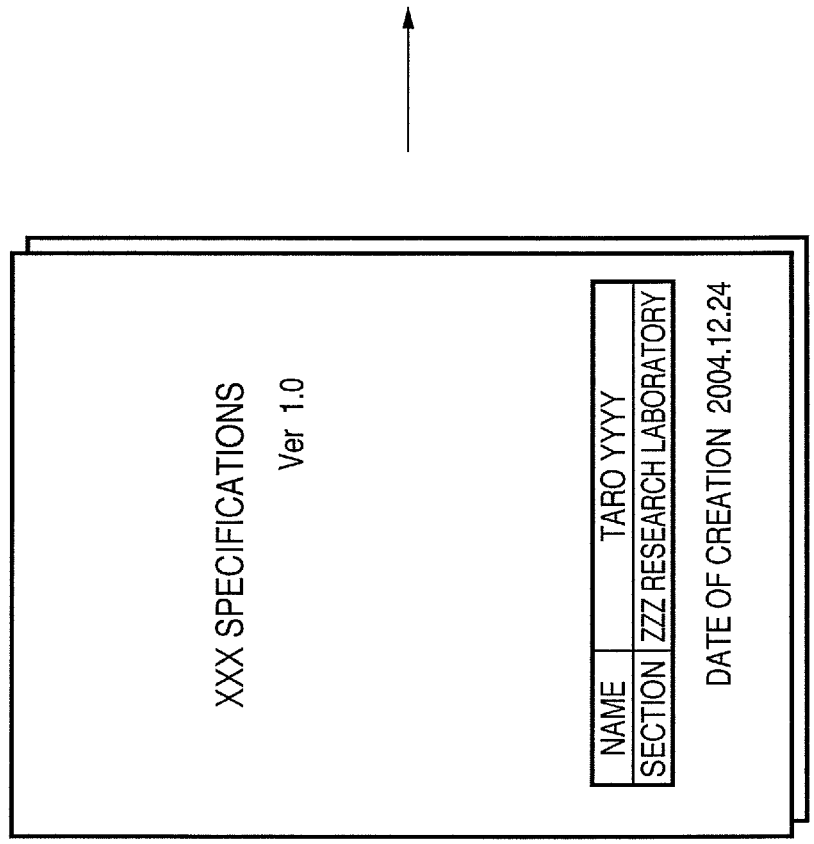

FIG. 46A is a view showing an example of a document cover. FIG. 46B is a view showing a result of block selection processing executed for the cover by the data processing device 205. The result in FIG. 46B is obtained by executing block selection processing for the image data shown in FIG. 46A in accordance with the same procedure as described in detail in the first embodiment. The type and version of the document are recognized by the following method on the basis of the result of block selection processing.

A text region including a largest font is determined as a part including a document title. On the basis of the thus obtained title, the type of the document is recognized. To recognize the version of the document, a text region containing a character string "Ver" is extracted from the result of OCR processing. Characters except "Ver" in the text region containing the character string "Ver" are recognized to indicate the version of the document.

In the third embodiment, the type and version of the document are recognized in the above-described way on the basis of the exemplified feature of a cover form. However, the present invention is not limited to this. Actually, it is necessary to cope with various forms. Hence, recognition based on another algorithm using another information is also possible.

As described above, according to the third embodiment, the type and version of a paper document are recognized by executing recognition processing of the scan image data of a cover. In the second embodiment, the operator manually inputs the type and version of a document. In the third embodiment, however, the input operation is unnecessary.

In the first and second embodiments, a plurality of versions exist in correspondence with one document. However, the image database may store a plurality of documents. In this case, the image database holds block information of each document. The user designates a document before printing a page for replacement. In the third embodiment, such document designation is done by OCR processing.

Other Embodiment

The embodiments have been described above in detail. The present invention can also have an embodiment of, e.g., a system, apparatus, method, program, or storage medium. More specifically, the present invention is applicable to a system including a plurality of devices or an apparatus including a single device.

The present invention also incorporates an arrangement in which a software program is supplied to the system or apparatus directly or from a remote site, and the computer of the system or apparatus reads out and executes the supplied program codes to implement the functions of the above-described embodiments. In this case, the supplied program corresponds to the flowcharts illustrated in the embodiments.

Hence, the program codes themselves which are installed in a computer to implement the functional processing of the present invention also implement the present invention. That is, the present invention also incorporates the computer program itself to implement its functional processing.

In this case, the program can take any form such as an object code, a program to be executed by an interpreter, or script data to be supplied to the OS as long as the functions of the program are available.

Examples of a recording medium to supply the program are a floppy® disk, hard disk, optical disk, magnetooptical disk, MO, CD-ROM, CD-R, CD-RW, magnetic tape, nonvolatile memory card, ROM, and DVD (DVD-ROM and DVD-R).

To supply the program, a client computer may connect to a homepage on the Internet via a browser to download the computer program of the present invention from the homepage to a recording medium such as a hard disk. The downloaded program may be a compressed file including an automatic installation function. The program codes contained in the program of the present invention may be divided into a plurality of files so that the user can download the files from different homepages. That is, a WWW server which causes a plurality of users to download the program file to make the computer implement the functional processing of the present invention is also incorporated in the present invention.

The program of the present invention may be encrypted, stored in a storage medium such as a CD-ROM, and distributed to users. Any user who satisfies predetermined conditions can download key information to decrypt the program from a homepage through the Internet. The user can execute the encrypted program by using the key information and install the program in the computer.

The functions of the above-described embodiments are implemented when the computer executes the readout program. The functions of the above-described embodiments may also be implemented in cooperation with, e.g., the OS running on the computer on the basis of the instructions of the program. In this case, the OS partially or wholly executes actual processing to implement the functions of the above-described embodiments.

The program read out from the recording medium may be written in the memory of a function expansion board inserted into the computer or a function expansion unit connected to the computer to implement some or all functions of the above-described embodiments. In this case, the program is written in the function expansion board or function expansion unit, and the CPU of the function expansion board or function expansion unit partially or wholly executes actual processing on the basis of the instructions of the program.

According to the present invention, it is possible to automatically create a page composition that minimizes replacement from a paper document. According to the present invention, it is possible to easily determine, on the basis of a page number assigned to a print out of a newly updated part, the insert position of the new print out in an existing paper document. This facilitates the replacing operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A document management apparatus comprising:
    an acquisition unit adapted to acquire first block information of blocks segmented for each page of document data of a first version, which is obtained by executing block segmentation processing for each page of document data of the first version, and adapted to acquire second block information of blocks segmented for each page of document data of a second version, which is obtained by executing block segmentation processing for each page of document data of the second version;
a discrimination unit adapted to discriminate a matched block and a mismatched block between the blocks segmented for each page of document data of the first version and the blocks segmented for each page of document data of the second version on the basis of the first and second block information acquired by said acquisition unit;
an extraction unit adapted to extract a block that is determined as a matched block and exists in a page containing a block determined as a mismatched block in the document data of the first version and a block that is determined as a mismatched block in the document data of the second version;
a generation unit adapted to generate a page by laying out the blocks extracted by said extraction unit while maintaining a block sequence in the whole document data of the second version; and
an output unit adapted to output the page generated by said generation unit.

2. The apparatus according to claim 1, wherein said generation unit determines the layout, in a page, of the blocks extracted by said extraction unit to minimize the number of generated pages.

3. The apparatus according to claim 1, wherein
the first and second block information contain, for each block, attached information representing a type and size of an image content, and
said discrimination unit compares the attached information between the blocks segmented for each page of document data of the first version and the blocks segmented for each page of document data of the second version in a discrimination process.

4. The apparatus according to claim 1, wherein said acquisition unit acquires the first block information by executing block segmentation processing for an image of each page obtained by optically reading a print output of the document data of the first version.

5. The apparatus according to claim 1, further comprising:
a storage unit adapted to store block information for each version of the document data; and
a designation unit adapted to designate the second version,
wherein the block information of the second version is acquired by reading out, from said storage unit, the block information of the version designated by said designation unit.

6. The apparatus according to claim 1, further comprising:
a determining unit adapted to determine, on the basis of the block sequence in the document data of the first version and the second version, an insert position of the page generated by said generation unit in the document of the first version without a page containing a block that is determined as a mismatched block by said discrimination unit; and
an assigning unit adapted to assign, to the generated page, a page number indicating the insert position and a page sequence on the basis of the page numbers of pages before and after the insert position determined by said determining unit.

7. The apparatus according to claim 6, wherein said acquisition unit acquires the block information by executing block segmentation processing for an image of each page obtained by optically reading a print output of the document data of the first version and acquires the page number of each page by character recognition processing for use by said assigning unit.

8. The apparatus according to claim 6, further comprising a display unit adapted to display a relationship between the generated page and the insert position in the document of the first version.

9. The apparatus according to claim 1, further comprising:
a storage unit adapted to store block information representing a block contained in each page for each version of the document data; and
a designation unit adapted to designate the first version and the second version,
wherein the acquisition unit acquires, from said storage unit, block information of each page of document data of a version designated by said designation unit as the first version, and
said discrimination unit reads out, from said storage unit, block information of a version designated by said designation unit as the second version and uses the readout block information as the block information of the second version.

10. The apparatus according to claim 9, wherein said designation unit executes character recognition processing for a part designated in advance in a printed document to recognize the version of the document and defines the version as the first version.

11. A document management method comprising steps of:
acquiring first block information of blocks segmented for each page of document data of a first version, which is obtained by executing block segmentation processing for each page of document data of the first version, and adapted to acquire second block information of blocks segmented for each page of document data of a second version, which is obtained by executing block segmentation processing for each page of document data of the second version;
discriminating a matched block and a mismatched block between the blocks segmented for each page of document data of the first version and the blocks segmented for each page of document data of the second version on the basis of the first and second block information acquired in the acquiring step;
extracting a block that is determined as a matched block and exists in a page containing a block determined as a mismatched block in the document data of the first version and a block that is determined as a mismatched block in the document data of the second version;
generating a page by laying out the blocks extracted in the extracting step while maintaining a block sequence in the whole document data of the second version; and
outputting the page generated in the generating step.

12. The method according to claim 11, wherein in the generating step, the layout, in a page, of the blocks extracted in the extraction step is determined to minimize the number of generated pages.

13. The method according to claim 11, wherein
the first and second block information contain, for each block, attached information representing a type and size of an image content, and
in the discriminating step, the attached information is compared between the blocks segmented for each page of document data of the first version and the block segmented for each page of document data of the second version in a discrimination process.

14. The method according to claim 11, wherein in the acquiring step, the first block information is acquired by executing block segmentation processing for an image of each page obtained by optically reading a print output of the document data of the first version.

15. The method according to claim 11, further comprising steps of:
- storing, in a storage unit, block information for each version of the document data; and
- designating the second version,
- wherein the block information of the second version is acquired by reading out, from the storage unit, the block information of the version designated in the designating step.

16. The method according to claim 11, further comprising steps of:
- determining, on the basis of the block sequence in the document data of the first version and the second version, an insert position of the page generated in the generating step in the document of the first version without a page containing a block that is determined as a mismatched block in the discriminating step; and
- assigning, to the generated page, a page number indicating the insert position and a page sequence on the basis of the page numbers of pages before and after the insert position determined in the determining step.

17. The method according to claim 16, wherein in the acquiring step, the block information is acquired by executing block segmentation processing for an image of each page obtained by optically reading a print output of the document data of the first version, and the page number of each page is acquired by character recognition processing for use in the assigning step.

18. The method according to claim 16, further comprising a step of causing a display unit to display a relationship between the generated page and the insert position in the document of the first version.

19. The method according to claim 11, further comprising steps of:
- storing, in a storage unit, block information representing a block contained in each page for each version of the document data; and
- designating the first version and the second version,
- wherein in the acquiring step, block information of each page of document data of a version designated in the designating step as the first version is acquired from the storage unit, and
- in the discriminating step, block information of a version designated in the designating step as the second version is read out from the storage unit and used as the block information of the second version.

20. The method according to claim 19, wherein in the designating step, character recognition processing is executed for a part designated in advance in a printed document to recognize the version of the document, and the version is defined as the first version.

21. A computer-readable storage medium storing a computer program which causes a computer to execute steps of a document management method of claim 11.

* * * * *